US010629982B2

United States Patent
Kim et al.

(10) Patent No.: US 10,629,982 B2
(45) Date of Patent: Apr. 21, 2020

(54) ELECTRONIC DEVICE WITH MULTI-SLOT ANTENNA

(71) Applicant: Samsung Electronics Co., Ltd., Gyeonggi-do (KR)

(72) Inventors: Hosaeng Kim, Gyeonggi-do (KR);
Hongil Kwon, Gyeonggi-do (KR);
Seonil Kim, Gyeonggi-do (KR);
Jae-Ho Lim, Gyeonggi-do (KR);
Seongeun Kim, Gyeonggi-do (KR);
Seunghwan Kim, Seoul (KR);
Younghoon Kim, Gyeonggi-do (KR);
Kicheol Sung, Seoul (KR);
Kyung-Jong Lee, Gyeonggi-do (KR);
Young-Min Joo, Seoul (KR)

(73) Assignee: Samsung Electronics Co., Ltd (KR)

( * ) Notice: Subject to any disclaimer, the term of this patent is extended or adjusted under 35 U.S.C. 154(b) by 93 days.

(21) Appl. No.: 15/585,550

(22) Filed: May 3, 2017

(65) Prior Publication Data

US 2017/0346164 A1    Nov. 30, 2017

(30) Foreign Application Priority Data

May 27, 2016 (KR) .......................... 10-2016-0065454

(51) Int. Cl.
*H01Q 1/24* (2006.01)
*H01Q 5/10* (2015.01)
(Continued)

(52) U.S. Cl.
CPC .............. *H01Q 1/243* (2013.01); *H01Q 1/48* (2013.01); *H01Q 5/10* (2015.01); *H01Q 13/10* (2013.01);
(Continued)

(58) Field of Classification Search
CPC .......... H01Q 13/10; H01Q 1/24; H01Q 1/243; H01Q 1/38; H01Q 1/48; H01Q 5/10; H94B 1/3888; H04M 1/02; H04M 1/0266
See application file for complete search history.

(56) References Cited

U.S. PATENT DOCUMENTS

| 6,282,433 | B1 | 8/2001 | Holshouser |
| 7,889,139 | B2* | 2/2011 | Hobson ................. H01Q 1/243 343/702 |

(Continued)

FOREIGN PATENT DOCUMENTS

| CN | 104821428 | 8/2015 |
| WO | WO 2011/073506 | 6/2011 |

OTHER PUBLICATIONS

European Search Report dated Nov. 23, 2017 issued in counterpart application No. 17169988.7-1927, 19 pages.

(Continued)

*Primary Examiner* — Tho G Phan
(74) *Attorney, Agent, or Firm* — The Farrell Law Firm, P.C.

(57) ABSTRACT

An electronic device with a multi-slot antenna is provided. The electronic device includes a first housing including a first side, a second side facing in a second direction opposite to the first direction, and a first lateral side surrounded by a portion of a space between the first and second sides, a second housing including a third side facing in a third direction and a fourth side facing in a fourth direction opposite to the third direction, a first conductive member forming at least a portion of the first lateral side and including a slot, an intermediate plate located inside the first housing and including a portion adjacent to a slot of the first conductive member, wherein the portion comprises or forms an opening facing in the first or second direction, and a (Continued)

wireless communication circuit electrically coupled to a portion of the first conductive member around the slot.

11 Claims, 44 Drawing Sheets

(51) Int. Cl.
*H01Q 1/48* (2006.01)
*H01Q 13/10* (2006.01)
*H04B 1/3888* (2015.01)
*H04M 1/02* (2006.01)

(52) U.S. Cl.
CPC ........ *H04B 1/3888* (2013.01); *H04M 1/0266* (2013.01)

(56) References Cited

U.S. PATENT DOCUMENTS

| | | | |
|---|---|---|---|
| 8,638,265 B2 | 1/2014 | Mahanfar | |
| 9,041,606 B2* | 5/2015 | Faraone | H01Q 13/10 |
| | | | 343/702 |
| 9,160,075 B2* | 10/2015 | Tsai | H01Q 5/371 |
| 9,190,713 B2* | 11/2015 | Eom | H01Q 1/243 |
| 9,647,320 B2* | 5/2017 | Lin | H01Q 1/243 |
| 2002/0021250 A1* | 2/2002 | Asano | H01Q 1/2266 |
| | | | 343/702 |
| 2005/0146475 A1 | 7/2005 | Bettner et al. | |
| 2011/0001673 A1 | 1/2011 | You et al. | |

OTHER PUBLICATIONS

Chinese Office Action dated Nov. 4, 2019 issued in counterpart application No. 201710388182.8, 22 pages.

* cited by examiner

ELECTRONIC DEVICE WITH MULTI-SLOT ANTENNA

PRIORITY

This application claims priority under 35 U.S.C. § 119(a) to Korean Patent Application Serial No. 10-2016-0065454, which was filed in the Korean Intellectual Property Office on May 27, 2016, the entire disclosure of which is incorporated herein by reference.

BACKGROUND

1. Field of the Disclosure

The present disclosure generally relates to an electronic device, and more particularly, to an electronic device having a multi-slot antenna utilizing a metal frame.

2. Description of the Related Art

Electronic devices have become increasingly slimmer to satisfy the needs of consumers, and metallic materials may be used as exterior materials to increase rigidity of the electronic devices and to enhance design aspects.

However, such an electronic device may have a structural problem in that it is difficult to prevent deterioration in antenna radiation performance while ensuring a space for at least one antenna device.

In an electronic device in which an external metal frame construction is applied, a metal frame structure may be utilized as a radiator due to a limitation of radiation performance improvement when an antenna is designed to avoid the metal frame structure. However, it may be difficult to form a multi-band resonance because of an insufficient mounting space caused by the metal frame construction.

SUMMARY

An aspect of the present disclosure provides an electronic device which may utilize a slot of a metal frame of the electronic device as an antenna radiator, when the exterior of the electronic device is constructed of a conductive member (e.g., a metal bezel, etc.).

In accordance with another aspect of the present disclosure, an electronic device is provided which includes a first housing having a first side facing in a first direction, a second side facing in a second direction opposite to the first direction, and a first lateral side surrounded by at least a portion of a space between the first and second sides, a second housing including a third side facing in a third direction and a fourth side facing in a fourth direction opposite to the third direction, a first display located in the first housing and exposed through the first side, a connecting member for coupling the first and second housings to fold the first and second housings together, and for allowing the first and third sides or the second and fourth sides to face each other when the first and second housings are folded together, a first conductive member forming at least a portion of the first lateral side and including a slot facing in a fifth direction substantially perpendicular to the first or second direction, an intermediate plate located inside the first housing and including a portion adjacent to the slot of the first conductive member, wherein the portion comprises an opening facing in the first or second direction, and a wireless communication circuit electrically coupled to a portion of the first conductive member.

In accordance with another aspect of the present disclosure, an electronic device is provided which includes a housing having a first side and a second side opposite to the first side, a rear case coupled to face the second side, a first display exposed at the first side, a ground plane disposed parallel to the first display, a first conductive housing structure disposed to surround at least a portion of a lateral boundary of the housing, a first slot formed in the first conductive housing structure to operate as an antenna, a second slot formed between the first conductive housing structure and the ground plane to operate as an antenna, a third slot disposed at the rear case to face the second slot to operate as an antenna, a feeding portion formed in the first conductive housing structure to feed each of the first slot, the second slot, and the third slot, and an impedance matching circuit connected to the feeding portion.

In accordance with another aspect of the present disclosure, an electronic device is provided which includes a first display disposed to face in a first direction, a second display disposed to face in a second direction, a ground plane disposed parallel to the first display, a first conductive housing structure surrounding at least a portion of the first display, a first slot formed in a first side of at least a portion of the first conductive housing structure, a second slot formed in a second side of the at least a portion of the first conductive housing structure having a specific angle with respect to the first side on which the first slot is formed, a feeding portion for feeding each of the first slot and the second slot, and an impedance matching circuit connected to the feeding portion, wherein the first display and the second display are connected to each other, and are disposed to overlap with each other.

In accordance with another aspect of the present disclosure, an electronic device is provided which includes a first housing having a first side facing in a first direction, a second side facing in a second direction opposite to the first direction, and a first lateral side surrounded by at least a portion of a space between the first and second sides and facing in a third direction perpendicular to each of the first and second directions, a metal frame disposed to surround at least a portion of the first lateral side; and at least one slot antenna formed in at least a portion of the metal frame facing the first lateral side, and facing the third direction.

In accordance with another aspect of the present disclosure, an electronic device is provided which includes a housing having a first side facing in a first direction, a second side facing in a second direction opposite to the first direction, a first lateral side surrounded by at least a portion of a space between the first and second sides and facing in a third direction perpendicular to each of the first and second side, and a substrate disposed between the first and second sides and having a ground plane disposed to face each of the first and second side, a rear case coupled to a second side of the housing, a metal frame disposed to surround at least a portion of the first side of the housing, a first slot antenna disposed between the substrate and the metal frame and having a first length and a first thickness, and a second slot disposed adjacent to the first slot antenna, formed in at least a region of the external metal frame facing the first side, facing in the third direction, and having a second length and a second thickness.

BRIEF DESCRIPTION OF THE DRAWINGS

The above and other aspects, features and advantages of the present disclosure will become more apparent from the following detailed description, taken in conjunction with the accompanying drawings, in which.

DETAILED DESCRIPTION

Figure 1:
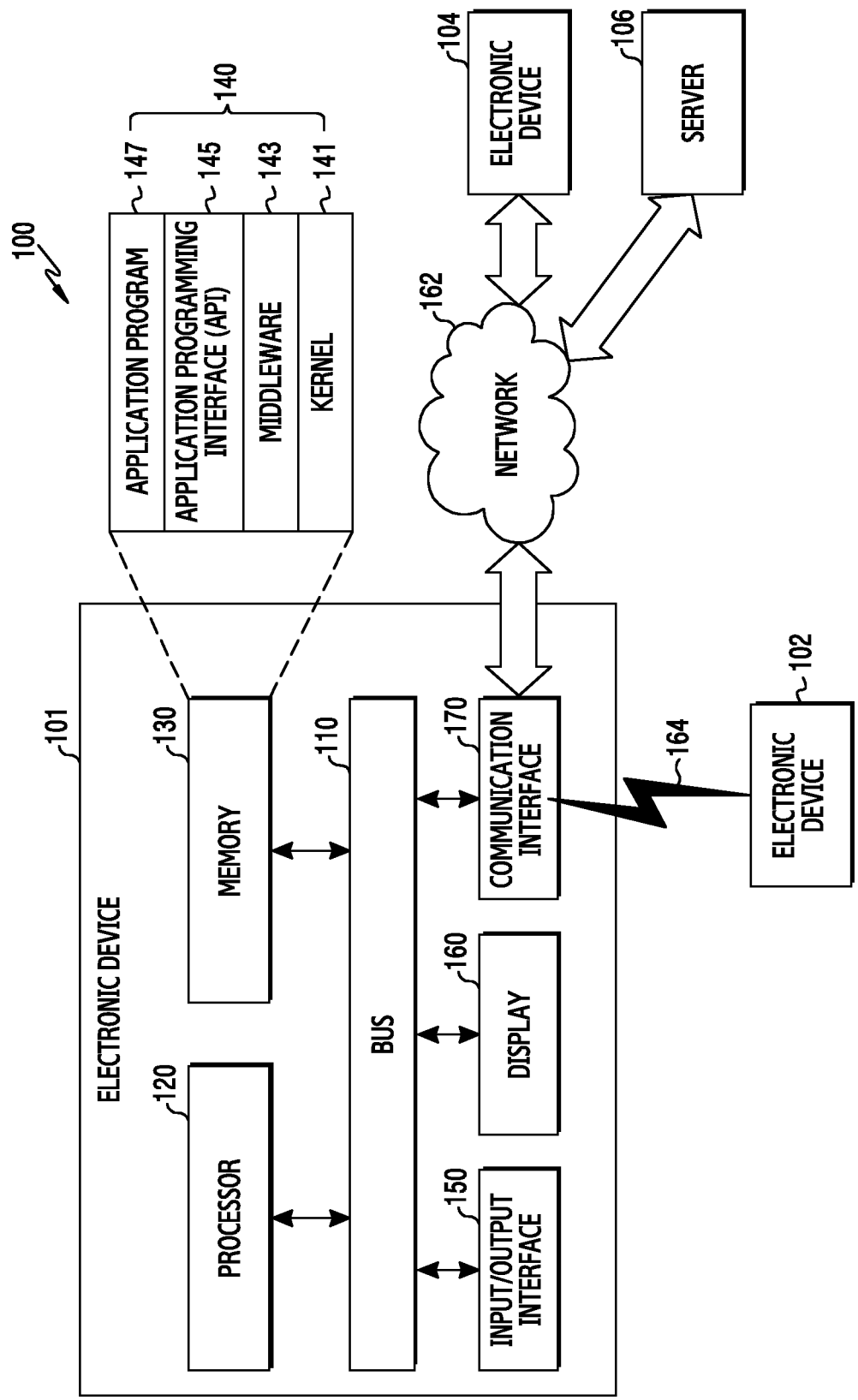
FIG. 1 is a block diagram illustrating an electronic device in a network environment according to an embodiment of the present disclosure.

Hereinafter, various embodiments of the present disclosure will be described with reference to the accompanying drawings. However, it should be understood that there is no limiting the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expressions "have", "may have", "include", or "may include" refer to the existence of a corresponding feature (e.g., numeral, function, operation, or constituent element such as component), and do not exclude one or more additional features.

In the present disclosure, the expressions "A or B", "at least one of A or/and B", or "one or more of A or/and B" may include all possible combinations of the items listed. For example, the expressions "A or B", "at least one of A and B", or "at least one of A or B" refer to all of (1) including at least one A, (2) including at least one B, or (3) including all of at least one A and at least one B.

The expressions such as "first", "second", and the like as used in various embodiments of the present disclosure may modify various elements regardless of order or importance, and do not limit corresponding elements. The above-described expressions may be used to distinguish an element from another element. For example, a first user device and a second user device indicate different user devices although both of them are user devices. For example, a first element may be referred to as a second element, and similarly, a second element may be referred to as a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there are no elements (e.g., third element) interposed between them.

The expression "configured to" as used in the present disclosure may be used interchangeably with, for example, "suitable for", "having the capacity to", "designed to", "adapted to", "made to", or "capable of" according to the situation. The expression "configured to" may not necessarily mean "specially designed to" in terms of hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a general-purpose processor (e.g., central processing unit (CPU) or application processor (AP)) that may perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical terms and scientific terms, may have the same meaning as commonly understood by a person of ordinary skill in the art to which the present disclosure pertains. Terms, such as those defined in commonly used dictionaries, should be interpreted as having a meaning that is the same or similar to their meaning in the context of the relevant art and will not be interpreted in an idealized or overly formal sense unless expressly so defined herein. In some cases, even the terms defined in the present disclosure should not be interpreted to exclude embodiments of the present disclosure.

Hereinafter, various embodiments of the present disclosure will be described with reference to the accompanying drawings.

FIG. 1 is a block diagram illustrating an electronic device in a network environment, according to an embodiment of the present disclosure.

Referring to FIG. 1, an electronic device 101 includes at least one of a bus 110, a processor 120, a memory 130, an input/output interface 150, a display 160, and a communication interface 170. At least one of the components of the electronic device 101 may be omitted, or other components may be additionally included in the electronic device 101.

The bus 110 is a circuit that interconnects the aforementioned elements and transmits communication signals (e.g., control messages) between the aforementioned elements.

The processor 120 carries out operations or data processing related to control and/or communication of at least one other component (for example, the memory 130, the input/output interface 150, the display 160, or the communication interface 170) of the electronic device 101.

The memory 130 stores commands or data (e.g., a reference pattern or a reference touch area) associated with one or more other components of the electronic device 101. According to an embodiment of the present disclosure, the memory 130 stores software and/or a program 140. For example, the program 140 includes a kernel 141, a middleware 143, an application programming interface (API) 145, an application program or application 147, and the like, with one or more of the kernel 141, the middleware 143, and the API 145 being referred to as an operating system (OS).

The kernel 141 controls or manages system resources (e.g., the bus 110, the processor 120, or the memory 130) used for performing an operation or function implemented by the other programs (e.g., the middleware 143, the API 145, or the application 147). Furthermore, the kernel 141 provides an interface through which the middleware 143, the API 145, or the application 147 may access the individual elements of the electronic device 101 to control or manage the system resources.

The middleware 143, for example, functions as an intermediary for allowing the API 145 or the application 147 to communicate with the kernel 141 to exchange data. In addition, the middleware 143 processes one or more task requests received from the application 147 according to priorities thereof. For example, the middleware 143 assigns priorities for using the system resources (e.g., the bus 110, the processor 120, the memory 130, and the like) of the electronic device 101, to at least one application of the application 147. For example, the middleware 143 performs scheduling or loading balancing on the one or more task requests by processing the one or more task requests according to the priorities assigned thereto.

The API 145 is an interface through which the application 147 controls functions provided from the kernel 141 or the middleware 143, and may include, for example, at least one interface or function (e.g., instruction) for file control, window control, image processing, or text control.

The input/output interface 150 forwards instructions or data input from a user through an input/output device (e.g., various sensors, such as an acceleration sensor or a gyro sensor, and/or a device such as a keyboard or a touch screen), to the processor 120, the memory 130, or the communication interface 170 through the bus 110. For example, the input/output interface 150 provides the processor 120 with data on a user's touch entered on a touch screen. Furthermore, the input/output interface 150 outputs instructions or data, received from, for example, the processor 120, the memory 130, or the communication interface 170 via the bus 110, through an output unit (e.g., a speaker or the display 160).

The display 160 includes, for example, a liquid crystal display (LCD), a light emitting diode (LED) display, an organic LED (OLED) display, a micro electro mechanical system (MEMS) display, an electronic paper display, and the like. The display 160, for example, displays various types of content (e.g., a text, images, videos, icons, symbols, and the like) for the user. The display 160 may include a touch screen and receive, for example, a touch, a gesture, proximity, a hovering input, and the like, using an electronic pen or the user's body part. According to an embodiment of the present disclosure, the display 160 may display a web page.

The communication interface 170, for example, sets communication between the electronic device 101 and a first external electronic device 102, a second external electronic device 104, or a server 106. For example, the communication interface 170 connects to a network 162 through wireless or wired communication to communicate with the second external electronic device 104 or the server 106.

The wireless communication may use at least one of, for example, long term evolution (LTE), LTE-advance (LTE-A), code division multiple access (CDMA), wideband CDMA (WCDMA), universal mobile telecommunications system (UMTS), wireless broadband (WiBro), and global system for mobile communications (GSM), as a cellular communication protocol. In addition, the wireless communication may include, for example, a short range communication 164. The short-range communication 164 may include at least one of, for example, wireless fidelity (Wi-Fi), Bluetooth™ (BT), near field communication (NFC), and global positioning system (GPS).

Each of the first external electronic device 102 and the second external electronic device 104 may be a device which is the same as, or different from, the electronic device 101. According to an embodiment of the present disclosure, the server 106 may include a group of one or more servers. All or a part of operations performed in the electronic device 101 may be performed in the other electronic device or the first external electronic device 102 or the second external electronic device 104 or the server 106. When the electronic device 101 should perform some functions or services automatically or by a request, the electronic device 101 may make a request for performing at least some functions related to the functions or services by the first external electronic device 102, the second external electronic device 104, or the server 106 instead of performing the functions or services by itself. The first external electronic device 102, the second external electronic device 104, or the server 106 may perform a function requested from the electronic device 101 or an additional function and transfer the performed result to the electronic device 101. The electronic device 101 may provide the requested function or service to another electronic device by processing the received result as it is or additionally. To this end, for example, cloud computing, distributed computing, or client-server computing technology may be used.

Figure 2:
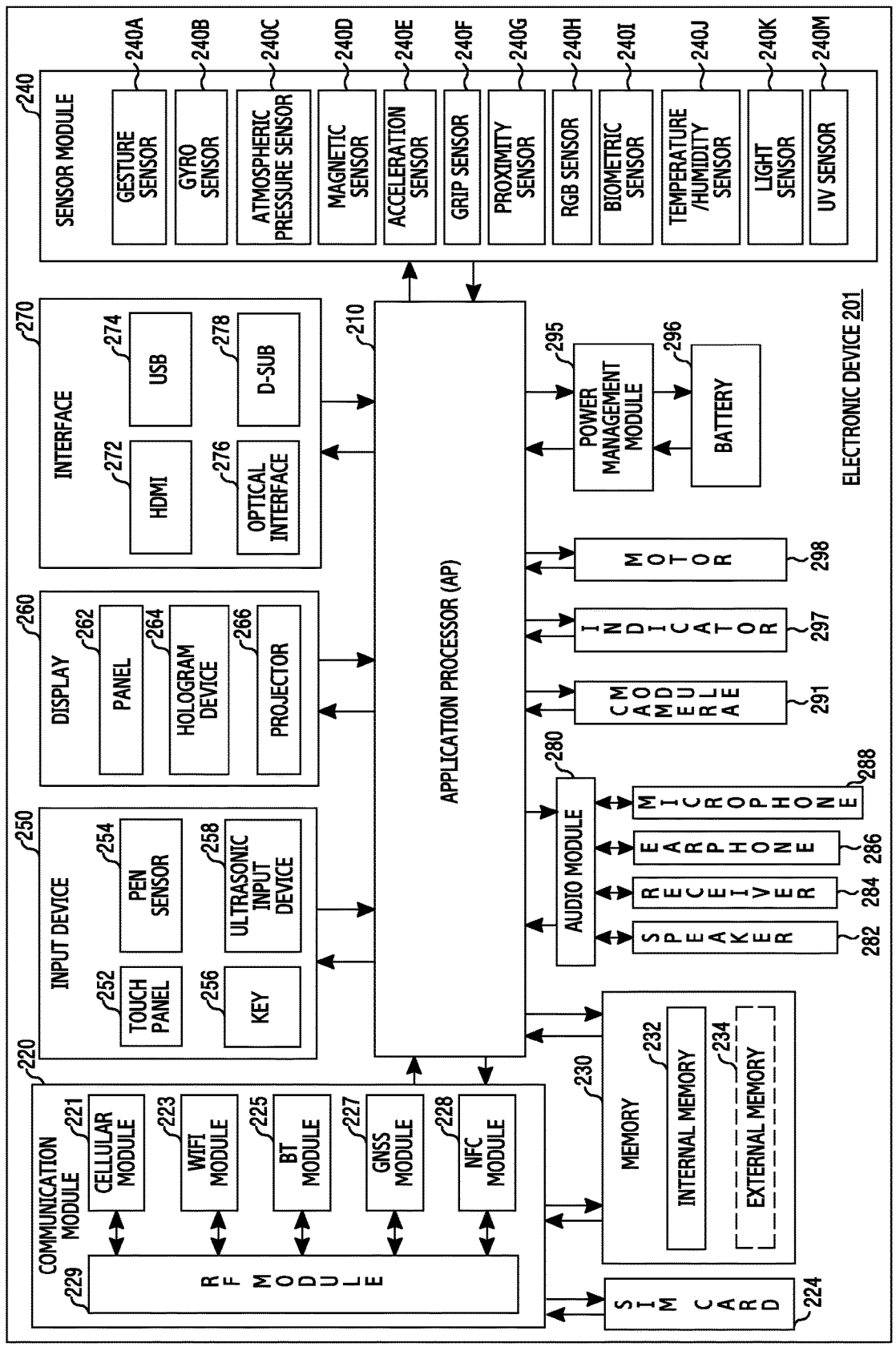
FIG. 2 is a block diagram illustrating an electronic device according to an embodiment of the present disclosure.

FIG. 2 is a block diagram of an electronic device, according to an embodiment of the present disclosure.

The electronic device 201 may constitute, for example, the entirety or a part of the electronic device 101 illustrated in FIG. 1, or may expand all or some elements of the electronic device 101. Referring to FIG. 2, the electronic device 201 includes an application processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 runs an operating system or an application program to control a plurality of hardware or software constituent elements connected to the AP 210, and may perform processing and operation of various data including multimedia data. The AP 210 may be, for example, implemented as a system on chip (SoC). According to an embodiment of the present disclosure, the AP 210 further includes a graphical processing unit (GPU). The AP 210 further includes at least one of other constitute elements (e.g., a cellular module 221). The AP 210 loads an instruction or data, which is received from a non-volatile memory connected to each or at least one of other constituent elements, to a volatile memory and processes the loaded instruction or data. In addition, the AP 210 stores in the non-volatile memory, data received from at least one of the other constituent elements or generated by at least one of the other constituent elements.

The communication module 220 (e.g., the communication interface 170) performs data transmission/reception in communication between the electronic device 201 (e.g., the electronic device 101) and other electronic devices connected through a network. According to an embodiment of the present disclosure, the communication module 220 includes cellular module 221, a Wi-Fi module 223, a BT module 225, a GPS module 227, an NFC module 228, and a radio frequency (RF) module 229.

The cellular module 221 provides a voice telephony, a video telephony, a text service, an Internet service, and the like, through a telecommunication network (e.g., LTE, LTE-A, CDMA, WCDMA, UMTS, WiBro, GSM, and the like). In addition, the cellular module 221 may, for example, use a SIM card 224 to perform electronic device distinction and authorization within the telecommunication network. According to an embodiment of the present disclosure, the cellular module 221 may perform at least some of functions that the AP 210 may provide. For example, the cellular module 221 performs at least one part of a multimedia control function.

The WiFi module 223, the BT module 225, the GPS module 227 and the NFC module 228 each may include, for example, a processor for processing data transmitted/received through the corresponding module. According to an embodiment of the present disclosure, at least some (e.g., two or more) of the cellular module 221, the WiFi module 223, the BT module 225, the GPS module 227 and the NFC module 228 are included within one integrated circuit (IC) or IC package.

The RF module 229 performs transmission/reception of data, for example, transmission/reception of an RF signal. The RF module 229 may include, for example, a transceiver, a power amplifier module (PAM), a frequency filter, a low noise amplifier (LNA), an antenna and the like. According to an embodiment of the present disclosure, at least one of the cellular module 221, the WiFi module 223, the BT module 225, the GPS module 227 or the NFC module 228 may perform transmission/reception of an RF signal through a separate RF module.

The SIM card 224 includes a SIM, and may be inserted into a slot provided in a specific position of the electronic device 201. The SIM card 224 includes unique identification information (e.g., an integrated circuit card ID (ICCID)) or subscriber information (e.g., an international mobile subscriber identity (IMSI)).

The memory 230 includes an internal memory 232 or an external memory 234. The internal memory 232 includes, for example, at least one of a volatile memory (e.g., a dynamic random access memory (DRAM), a static RAM (SRAM) and a synchronous DRAM (SDRAM)) or a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a not and (NAND) flash memory, and a not or (NOR) flash memory).

According to an embodiment of the present disclosure, the internal memory 232 may be a solid state drive (SSD). The external memory 234 may further include a flash drive, for example, compact flash (CF), secure digital (SD), micro-SD, mini-SD, extreme digital (xD), a memory stick, and the like. The external memory 234 may be operatively connected with the electronic device 201 through various interfaces.

The sensor module 240 measures a physical quantity or detects an activation state of the electronic device 101, and converts measured or detected information into an electric signal. The sensor module 240 includes, for example, at least one of a gesture sensor 240A, a gyro sensor 240B, an air pressure sensor 240C, a magnetic sensor 240D, an acceleration sensor 240E, a grip sensor 240F, a proximity sensor 240G, a color sensor 240H (e.g., a red, green, blue (RGB) sensor), a bio-physical sensor 240I, a temperature/humidity sensor 240J, an illumination sensor 240K, a ultraviolet (UV) sensor 240M, and the like. Additionally or alternatively, the sensor module 240 may also include, for example, an E-nose sensor, an electromyography (EMG) sensor, an electroencephalogram (EEG) sensor, an electrocardiogram (ECG) sensor, an infrared (IR) sensor, an iris sensor, a fingerprint sensor, and the like. The sensor module 240 may further include a control circuit for controlling at least one or more sensors belonging therein.

The input device 250 includes a touch panel 252, a (digital) pen sensor 254, a key 256, an ultrasonic input device 258, and the like. The touch panel 252 may, for example, detect a touch input in at least one of a capacitive overlay scheme, a pressure sensitive scheme, an infrared beam scheme, and an acoustic wave scheme. The touch panel 252 may also include a control circuit. In a case of the capacitive overlay scheme, physical contact or proximity detection is possible. The touch panel 252 may further include a tactile layer, to provide a tactile response to a user.

The (digital) pen sensor 254 may be implemented in the same or similar method to receiving a user's touch input or by using a separate sheet for detection. The key 256 may include, for example, a physical button, an optical key, or a keypad. The ultrasonic input device 258 is capable of identifying data by detecting a sound wave in the electronic device 201 through an input tool generating an ultrasonic signal, and enables wireless detection. According to an embodiment of the present disclosure, the electronic device 201 may also use the communication module 220 to receive a user input from a connected external device (e.g., a computer or a server).

The display 260 (e.g., the display 160) includes a panel 262, a hologram device 264, or a projector 266. The panel 262 may be, for example, an LCD, an active-matrix organic LED (AMOLED), and the like. The panel 262 may be, for example, implemented to be flexible, transparent, or wearable. The panel 262 may be constructed as one module along with the touch panel 252 as well. The hologram device 264 may use interference of light to show a three-dimensional image in the air. The projector 266 may project light to a screen to display an image. The screen may be, for example, located inside or outside the electronic device 201. According to an embodiment of the present disclosure, the display 260 may further include a control circuit for controlling the panel 262, the hologram device 264, or the projector 266.

The interface 270 includes, for example, a high-definition multimedia interface (HDMI) 272, a universal service bus (USB) 274, an optical interface 276, or a D-subminiature (D-sub) 278. Additionally or alternatively, the interface 270 includes, for example, a mobile high-definition link (MHL) interface, an SD card/multimedia card (MMC) interface or an infrared data association (IrDA) standard interface.

The audio module 280 converts a voice and an electric signal interactively. The audio module 280 may, for example, process sound information which is inputted or outputted through a speaker 282, a receiver 284, an earphone 286, a microphone 288, and the like.

The camera module 291 takes still pictures and moving pictures. According to an embodiment of the present disclosure, the camera module 291 includes one or more image sensors (e.g., a front sensor or a rear sensor), a lens, an image signal processor (ISP), or a flash (e.g., an LED or a xenon lamp).

The power management module 295 manages electric power of the electronic device 201. The power management module 295 includes, for example, a power management integrated circuit (PMIC), a charger IC, a battery, a battery gauge, and the like.

The PMIC may be, for example, mounted within an integrated circuit or an SoC semiconductor. A charging scheme may be divided into a wired charging scheme and a wireless charging scheme. The charger IC charges the battery 296, and prevents the inflow of overvoltage or overcurrent from an electric charger. According to an embodiment of the present disclosure, the charger IC includes a charger IC for at least one of the wired charging scheme or the wireless charging scheme. The wireless charging scheme may, for example, be a magnetic resonance scheme, a magnetic induction scheme, an electromagnetic wave scheme, and the like. A supplementary circuit for wireless charging, for example, a circuit, such as a coil loop, a resonance circuit, a rectifier, and the like, may be added.

The battery gauge may, for example, measure a charge level of the battery 296, a voltage during charging, a current or a temperature. The battery 296 generates or stores electricity, and uses the stored or generated electricity to supply power to the electronic device 201. The battery 296 may include, for example, a rechargeable battery or a solar battery.

The indicator 297 displays a specific status of the electronic device 201 or one part (e.g., the AP 210) thereof, for example a booting state, a message state, a charging state, and the like. The motor 298 may convert an electric signal into a mechanical vibration. The electronic device 101 may include a processing device (e.g., a GPU) for mobile TV support. The processing device for mobile TV support may, for example, process media data according to the standards of digital multimedia broadcasting (DMB), digital video broadcasting (DVB), MediaFlo™, and the like.

Each of the above-described elements of the electronic device may include one or more components, and the name of a corresponding element may vary according to the type of electronic device. The electronic device according to an embodiment of the present disclosure may include at least one of the above-described elements and may exclude some of the elements or further include other additional elements. Further, some of the elements of the electronic device according to an embodiment of the present disclosure may be coupled to form a single entity while performing the same functions as those of the corresponding elements before the coupling.

Figure 3A:
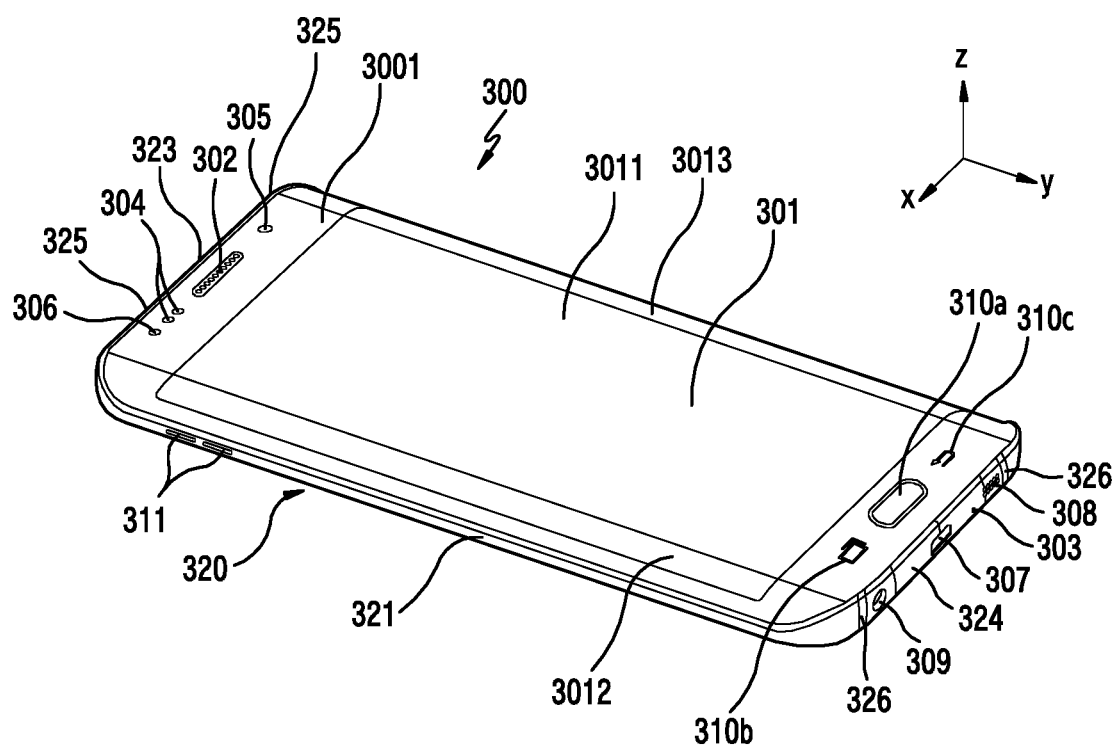
FIG. 3A is a perspective view illustrating a front side of an electronic device according to an embodiment of the present disclosure.

FIG. 3A is a perspective view illustrating a front side of an electronic device according to an embodiment of the present disclosure.

Figure 3B:
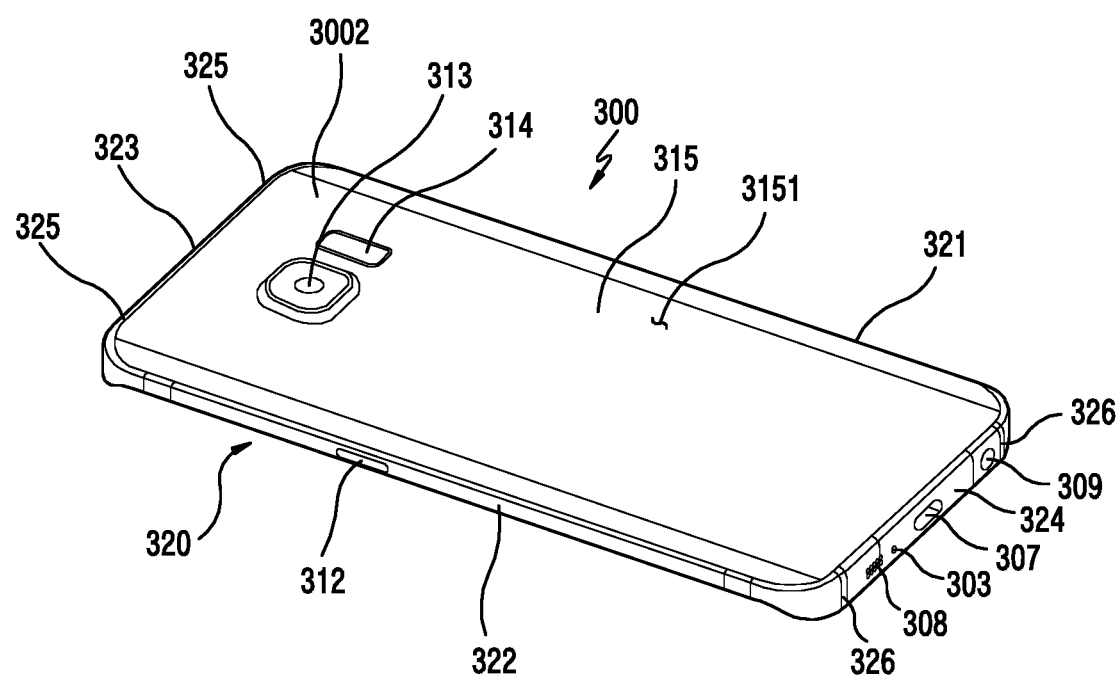
FIG. 3B is a perspective view illustrating a rear side of an electronic device according to an embodiment of the present disclosure.

FIG. 3B is a perspective view illustrating a rear side of the electronic device according to an embodiment of the present disclosure.

Figure 3C:
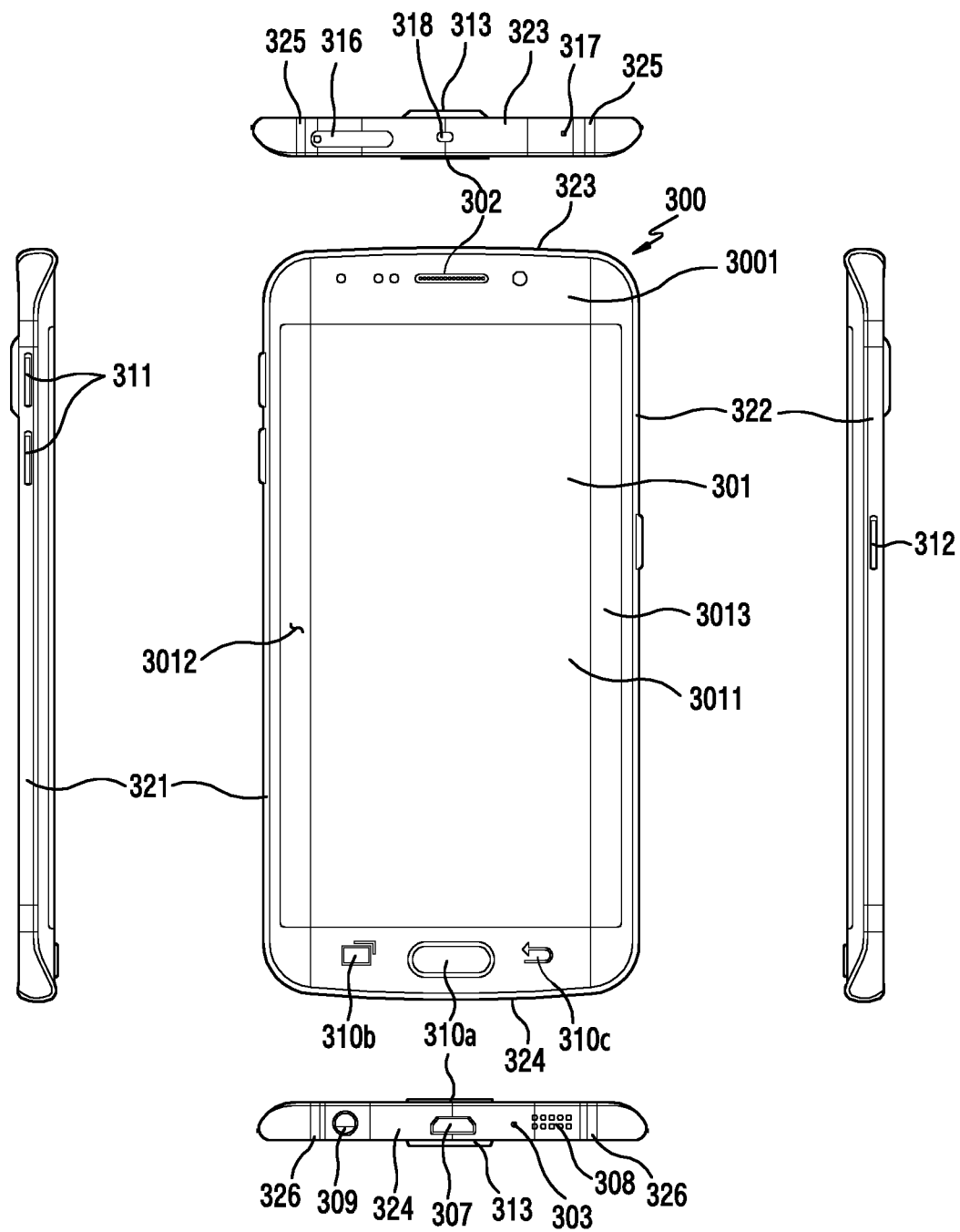
FIG. 3C illustrates an electronic device viewed from five directions, according to an embodiment of the present disclosure.

FIG. 3C illustrates an electronic device viewed from five sides according to an embodiment of the present disclosure.

Referring to FIG. 3A to FIG. 3C, an electronic device 300 according to an embodiment of the present disclosure includes a display 301 (alternatively, referred to as a touch screen) installed on a front side 3001. A microphone 302 for receiving a voice of a peer user may be disposed at an upper side of the display 301. A microphone 303 for transmitting a voice of a user of the electronic device 300 to the peer user may be disposed at a lower side of the display 301.

The electronic device 300 according to an embodiment of the present disclosure may have components disposed to perform various functions of the electronic device 300 in a surrounding area where the microphone 302 is installed. The components include at least one sensor module 304. The sensor module 304 may include, for example, at least one of an illumination sensor (e.g., a light sensor), a proximity sensor (e.g., a light sensor), an infrared sensor, and an ultrasonic sensor. The component includes a front camera 305. The component includes an indicator 306 for informing the user of status information of the electronic device 300.

The display 301 according to an embodiment of the present disclosure may be formed as a large screen to occupy most of the front side of the electronic device 300. A main home screen may be a first screen displayed on the display 301 when the electronic device 300 is powered on. As another example, if the electronic device 300 has different home screens of several pages, the main home screen may be a first home screen among the home screens of several pages. Shortcut icons for executing frequently used applications, a main menu switching key, time, weather, and the like may be displayed on the home screen. The main menu switching key may display a menu screen on the display 301. In addition, a status bar may be formed at an upper end of the display 301 to indicate a status of the device 300 such as a battery charging status, received signal strength, and a current time. A home key 310a, a menu key 310b, and a back key 310c may be formed at a lower portion of the display 301. The keys 310a to 310c are not necessarily limited to being physically visible, and thus may be constructed to be physically invisible.

The home key 310a according to an embodiment of the present disclosure may provide an input for displaying the main home screen on the display 301. For example, when the home key 310a is touched in a state where a home screen, different from the main home screen, is displayed or the menu screen is displayed on the display 301, the main home screen may be displayed on the display 301. Further, when the home key 310a is touched while applications are running on the display 301, the main home screen may be displayed on the display 301. As another example, the home key 310a may be used to display recently used applications on the display 301, or to display a task manager. The home key 310a may be deleted from a front portion of the electronic device 300. A fingerprint recognition sensor device may be disposed at an upper side of the home key 310a. The home key 310a may be configured to perform a first function (a home screen return function, a wake up/sleep function, etc.) by a physical push operation, and to perform a second function (e.g., a fingerprint recognition function, etc.) by an operation of swiping the upper side of the home key 310a. As another example, the home key 310a may be configured to perform a function for executing a camera, a function of executing S-voice, and the like. The menu key 310b according to an embodiment of the present disclosure may provide an input for displaying a running multi-window or a connection menu which may be used on the display 301. For example, the connection menu may include a widget add menu, a background change menu, a search menu, an edit menu, a configuration menu, and the like. When the back key 310c is short-pressed, a screen executed immediately before the currently running screen may be displayed, or a most recently used application may be finished. As another example, when the back key 310c is long-pressed, a multi-window tray may be displayed.

The electronic device 300 according to an embodiment of the present disclosure includes a metal frame 320 as a metal housing. The metal frame 320 may be disposed along a boundary of the electronic device 300, and may be displayed by being extended up to at least a region of the rear side of the electronic device 300 extended from the boundary. The metal frame 320 may be at least a portion of a thickness of the electronic device 300 along the boundary of the electronic device, and may be formed in a closed-loop shape. The metal frame 320 according to an embodiment of the present disclosure may be disposed only at the boundary of the electronic device 300. When the metal frame 320 is a portion of the housing of the electronic device 300, the remaining portions of the housing may be constructed of a non-metallic member. In this case, the housing may be formed in such a manner that the non-metallic member is insert-injected to the metal frame 320. The metal frame 320 includes at least one segment portion 325 or 326 so that a metal frame separated by the segment portion 325 or 326 is utilized as an antenna radiator. An upper frame 323 may be a unit frame separated by a pair of segmentation portions 325 formed by a regular interval. A lower frame 324 may be a frame separated by a pair of segment portions 326 formed by a regular interval. The segment portions 325 and 326 may be formed together when the non-metal member is insert-injected to the metal member. The metal frame 320 according to an embodiment of the present disclosure may have a closed-loop shape along the boundary. The metal frame 320 includes a left frame 321, a right frame 322, the upper frame 323, and the lower frame 324 when the electronic device 300 is viewed from the front side.

Various electronic components may be disposed at the lower frame 324 according to an embodiment of the present disclosure. A speaker 308 may be disposed at one side of the microphone 303. An interface connector 307 may be disposed at the other side of the microphone 303 to charge the battery of the electronic device 300 by using a data transmission/reception function provided by an external device or by receiving external power. An ear jack 309 may be disposed at one side of the interface connector 307. The aforementioned microphone 303, speaker 308, interface connector 307, and ear jack 309 may be all disposed within a region of a frame formed by the pair of segment portions 326 disposed at the lower frame 324. However, the present disclosure is not limited thereto, and thus at least one of the aforementioned electronic components may be disposed at a region including the segment portion 326 or may be disposed outside the frame. Various electronic components may also be disposed at the upper frame 323 according to an embodiment of the present disclosure. A socket device 316 for inserting a card-type external device may be disposed at the upper frame 323. The socket device 316 may accommodate at least one of a unique ID card (e.g., a SIM card, a UIM card, etc.) for the electronic device and a memory card for expanding a storage space. An infrared sensor module 318 may be disposed at one side of the socket device 316, and an auxiliary microphone device 317 may be disposed at one side of the infrared sensor module 318. The socket device 316, the infrared sensor module 318, and the auxiliary microphone device 317 may all be disposed at the region of the frame formed by the pair of segment portions 325 disposed at the upper frame 323. However, the present disclosure is not limited thereto, and thus at least one of the aforementioned electronic components may be disposed at a region including the segment portion 325 or may be disposed outside the segment portion 325.

At least one first side key button 311 may be disposed at the left frame 321 according to an embodiment of the present disclosure. The at least one first side key button 311 may be disposed at the left frame 321 in pairs to perform a volume up/down function, a scroll function, and the like.

At least one second side key button 312 according to an embodiment of the present disclosure may be disposed at the right frame 322. The second side key button 312 may perform a power on/off function, a wake up/sleep function of the electronic device, and the like.

A rear camera 313 may be disposed at a rear side 3002 of the electronic device 300 according to an embodiment of the present disclosure, and at least one electronic component 314 may be disposed at one side of the rear camera 313. For example, the electronic component 314 may include at least one of an illumination sensor (e.g., a light sensor), a proximity sensor (e.g., a light sensor), an infrared sensor, an ultrasonic sensor, a heart rate sensor, and a flash device.

The front side 3001 including the display 301 according to an embodiment of the present disclosure includes a flat portion 3011 and a left curved portion 3012 and right curved portion 3013 which are formed on both left and right sides of the flat portion 3011. The front side 3001 of the electronic device 300 may include a region of the display 301 and other regions (e.g., a BM (Black Matrix) region) by using one window. The left and right curved portions 3012 and 3013 may be formed by being extended in an X-axis direction of the electronic device 300 on the flat portion 3011. The left and right curved portions 3012 and 3013 may be a lateral side of the electronic device 300. In this case, the left and right curved portions 3012 and 3013 and the left and right frames 321 and 322 of the metal frame 320 may be lateral sides of the electronic device 300 together. However, the present disclosure is not limited thereto, and thus the front side 3001 including the display 301 includes at least one of the left and right curved portions 3012 and 3013. The front side 3001 may include only the left curved portion 3012 along the flat portion 3011, or may include only the right curved portion 3013 along the flat portion 3011.

The front side 3001 according to an embodiment of the present disclosure includes a window 440 (shown in FIG. 4) including the curved portions 3012 and 3013 on the left and right sides and a flexible display module applied to at least a region of a lower side of the window. The window may be formed in such a manner that an upper side and a rear side are bent at the same time (hereinafter, referred to as a '3-D type'). However, the present disclosure is not limited thereto, and thus the window may be formed in such a manner that left and right portions of the upper side are formed in a curved shape and the rear side is formed to be flat (hereinafter, referred to as '2.5D type'). The window may be formed of a transparent glass material (e.g., sapphire glass) or a transparent synthetic resin material.

The electronic device 300 according to an embodiment of the present disclosure may control the display module to selectively display information. The electronic device 300 may control the display module to configure a screen only on the flat portion 3011. The electronic device 300 may control the display module to configure the screen by including any one of the left and right curved portions 3012 and 3013 together with the flat portion 3011. The electronic device 300 may control the display module to configure the screen by using only at least one curved portion of the left and right curved portions 3012 and 3013 except for the flat portion 3011.

The rear side 3002 of the electronic device 300 according to an embodiment of the present disclosure may be formed by at least one rear exterior surface mounting member 315. The rear side 3002 includes a flat portion 3151 formed substantially around a center, and may include, a left curved portion and a right curved portion to both left/right sides of the flat portion 3151.

Figure 4:
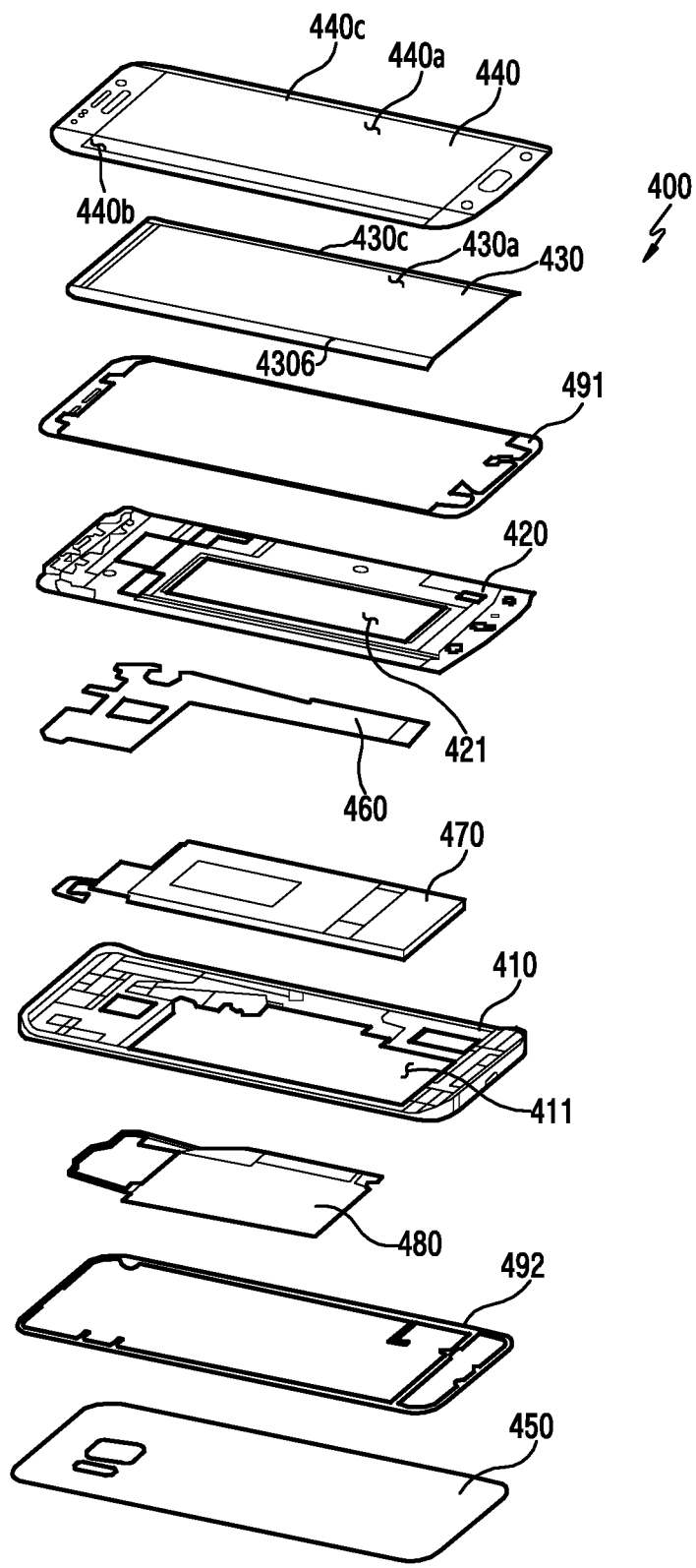
FIG. 4 is an exploded perspective view of an electronic device according to an embodiment of the present disclosure.

FIG. 4 is an exploded perspective view of an electronic device according to an embodiment of the present disclosure.

An electronic device 400 according to an embodiment of the present disclosure may be the same electronic device as the aforementioned electronic device 300.

Referring to FIG. 4, the electronic device 400 according to an embodiment of the present disclosure may be disposed in such a manner that a printed circuit board (PCB) 460, an inner support structure 420, a display module 430, and a front window 440 (which may be referred to as a first plate facing substantially in a first direction) are sequentially laminated above a housing 410.

The electronic device 400 according to an embodiment of the present disclosure may be disposed in such a manner that a wireless power transmitting/receiving member 480 (which may include a flexible printed circuit board having an antenna pattern) and a rear window 450 (which may be referred to as a second plate facing substantially in a second direction opposite to the first direction) are sequentially laminated below the housing 410.

A battery pack 470 according to an embodiment of the present disclosure may be accommodated in an accommodation space 411 of the battery pack 470 formed in the housing 410 and may be disposed to avoid the PCB 460. The battery pack 470 and the PCB 460 may be disposed in a parallel manner without overlapping.

The display module 430 according to an embodiment of the present disclosure may be fixed to the inner support structure 420, and the front window 440 may be attached to the inner support structure 420 by means of a first adhesive member 491. The rear window 450 may be attached to the housing 410 by means of a second adhesive member 492. The electronic device according to an embodiment of the present disclosure may include a side member which at least partially surrounds a space between the first plate and the second plate.

The front window 440 according to an embodiment of the present disclosure includes a flat portion 440a and a left bending portion 440b and right bending portion 440c which are bent in both directions at the flat portion 440a. For example, the front window 440 located in an upper portion of the electronic device 400 may form a front side and display a screen on the display module 430 by using a transparent material, and may provide an input/output window of various sensors. Although it is illustrated that the left and right bending portions 440b and 440c have a shape formed in a 3D type, a shape of not only left and right but also up and down single-refraction type or a shape of up, down, left, and right double-refraction type may also be applied. A touch panel may be further disposed at a rear side of the front window 440, and thus a touch input signal may be received from the outside.

The display module 430 according to an embodiment of the present disclosure may be formed in a shape corresponding to the front window 440 (a shape having a corresponding curvature). The display module 430 includes left and right bending portions 430b and 430c around a flat portion 430a. The display module 430 may be a flexible display module. If the rear side of the front window 440 has a window form of a planar type (hereinafter, referred to as a 2D type or 2.5D type), since the rear side of the front window 440 is flat, a normal liquid crystal display (LCD) or an on-cell tsp (touch sensitive panel) AMOLED (OCTA) may also be applied.

The first adhesive member 491 according to an embodiment of the present disclosure is a component for fixing the front window 440 to the inner support structure (e.g., bracket) 420 disposed inside the electronic device, and may be a tape such as a double-sided tape and a liquid adhesive layer such as a bonding agent. For example, when the double-sided tape is applied as the first adhesive member 491, an internal material may be a general polyethylene terephthalate (PET) material, and a functional material may also be applied. For example, a foam tape or a material using an impact-resistant fabric may be used to strengthen impact resistance, thereby preventing the front window from being damaged by an external impact.

The inner support structure 420 according to an embodiment of the present disclosure may be disposed inside the electronic device 400 and used as a component to strengthen overall rigidity of the electronic device. For example, at least one of metallic materials, i.e., Al, Mg, and STS (stainless steel), may be used for the inner support structure 420. The inner support structure 420 may be formed by using highly rigid plastic containing glass fiber, or a may be formed by using metal and plastic together. As a material of the inner support structure 420, when a metal member and a non-metal member are used together, the inner support structure 420 may be formed in such a manner that the non-metal member is insert-injected to the metal member. The inner support structure 420 may be disposed at a rear side of the display module 430, may have a shape (curvature) similar to that of the rear side of the display module 430, and may support the display module 430. An elastic member such as a sponge or a rubber or an adhesive layer such as a double-sided tape or a single-sided tape may be further disposed between the inner support structure 220 and the display module 430 to protect the display module 430.

The electronic device 400 according to an embodiment of the present disclosure may be formed optionally by adding a plate-shaped metallic material or a composite material to a hole region 421 to reinforce internal rigidity, or may further include an auxiliary device to improve a thermal characteristic, an antenna characteristic, and the like.

The inner support structure 420 according to an embodiment of the present disclosure may be joined to the housing (e.g., rear case) 410 to create an inner space in which at least one electronic component may be disposed. The electronic component may include the PCB 460. However, the present disclosure is not limited thereto, and thus, in addition to the PCB 460, may include an antenna device, a sound device, a power supply device, a sensor device, and the like.

The battery pack 470 according to an embodiment of the present disclosure may supply power to the electronic device 400. One side of the battery pack 470 is adjacent to the display module 430 and the other side thereof is adjacent to the rear window 450, which may cause deformation and breakage of a counterpart object when the battery pack 470 is swollen at the time of charging. In order to prevent this, a swelling gap may be provided between the battery pack 470 and the counterpart object (e.g., the display module 430 and the rear window 450) to prevent deformation and breakage. The battery pack 470 may be disposed in an integral form with respect to the electronic device 400. However, the present disclosure is not limited thereto, and thus when the rear window 450 is implemented in a detachable manner in the electronic device 400, the battery pack 470 may be implemented in a detachable manner.

The housing 410 according to an embodiment of the present disclosure may form an outer portion (e.g., a lateral side including a metal bezel) of the electronic device 400, and may be combined with the inner support structure 420 to create an inner space. The front window 440 may be disposed at the front side of the housing 410, and the rear window 450 may be disposed at the rear side thereof. However, the present disclosure is not limited thereto, and thus the rear side may be implemented in various ways such as injection molding using synthetic resin, metal, composite of metal and synthetic resin, and the like. A gap between the housing 410 and an inner construction formed by the rear window 450 may prevent breakage of the rear window 450 from a secondary blow caused by an internal structure when an external impact such as dropping the electronic device occurs.

The wireless power transmitting/receiving member 480 according to an embodiment of the present disclosure may be disposed at the rear side of the housing 410. The wireless power transmitting/receiving member 480 formed of a thin film is disposed in such a manner that it is attached to one side of an internal mounting component or a region of an inner lateral side of the housing 410, in particular, a region mostly adjacent to the rear window 450, and includes a construction which forms a contact point with the internal PCB 460. The wireless power transmitting/receiving member 480 may be embedded or attached as a component such as the battery pack 470 and the like, or as a portion of the housing 410, and may be provided in such a manner that it is simultaneously attached to the component and the housing 410.

The second adhesive member 492 according to an embodiment of the present disclosure may be applied in a similar manner to the aforementioned first adhesive member 491 as a component for fixing the rear window 450 to the housing 410.

Figure 5:
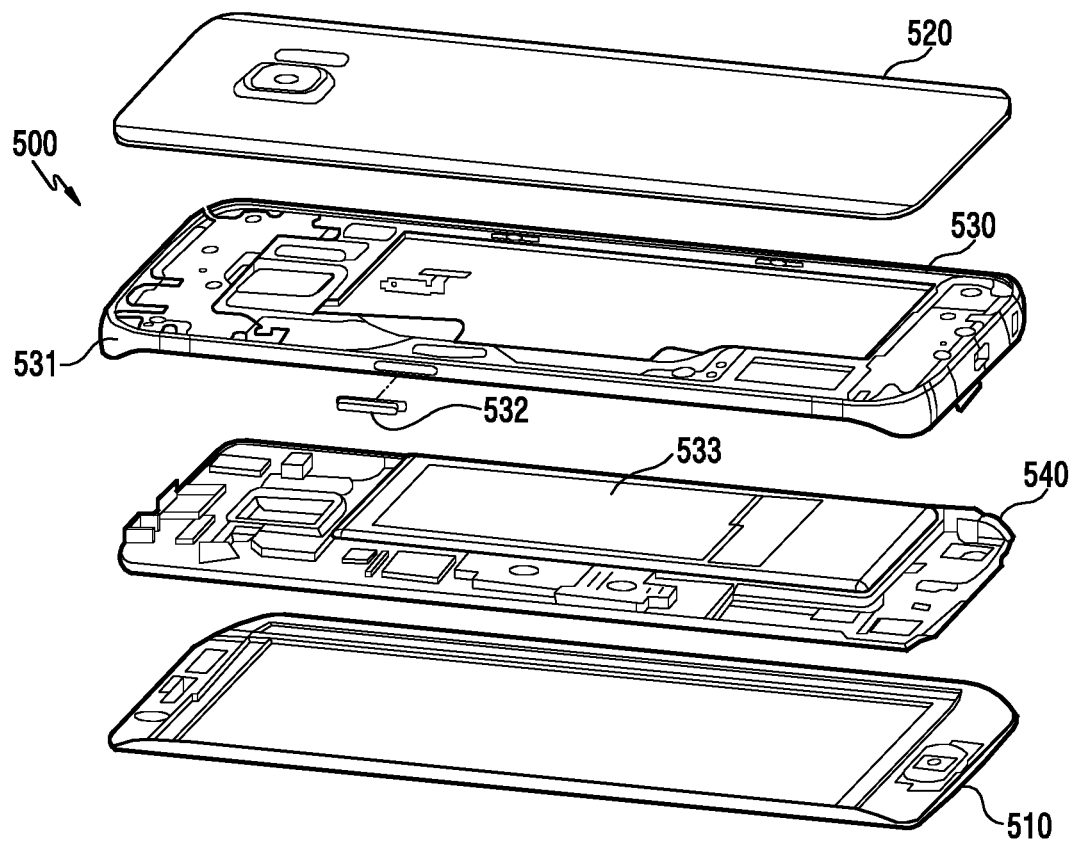
FIG. 5 is an exploded perspective view of an electronic device according to another embodiment of the present disclosure.

According to an embodiment of the present disclosure, the rear window 450 may be applied in a similar manner to the aforementioned front window 440. The front side (a side exposed to the outside) of the rear window 450 may have a curvature inclined toward both ends of the left and right sides. The rear side of the rear window 450 may be formed to be flat and may be bonded to the housing 410 by means of the second adhesive member 492. FIG. 5 is an exploded perspective view of an electronic device according to an embodiment of the present disclosure.

Referring to FIG. 5, an electronic device 500 according to an embodiment of the present disclosure may have at least one member related to an exterior appearance and disposed at an outer surface. For example, a rear case 530, a front cover 510, a rear cover 520, and a sidewall 531 located at lateral sides may comprise most of the exterior appearance of the electronic device 500. The exterior member such as the housing may be referred to as a case, a cover, and the like. As another example, the exterior appearance of the electronic device 500 may have a home key, a receiver, and the like disposed at a front side, may have a member such as a rear camera or flash, or a speaker disposed at a rear side, and may have a plurality of physical keys, a connector, or a microphone hole, and the like disposed at the sidewall 531.

The electronic device 500 according to an embodiment of the present disclosure may require a configuration for preventing, for example, a foreign material such as water, from penetrating into members disposed at the exterior appearance. The electronic device 500 includes the front cover 510, the rear cover 520, the housing 530, a structure 540, and a waterproof construction.

The front cover 510 according to an embodiment of the present disclosure may form the front side of the electronic device 500, and may serve as a front exterior. The front cover of the electronic device 500 may be constructed of a transparent member. For example, the transparent member may include transparent synthetic resin or glass. A display supported by the structure may include a screen region exposed through the front cover.

The rear cover 520 according to an embodiment of the present disclosure may form a rear side of the electronic device 500, and may serve as a rear exterior. The rear cover 520 of the electronic device 500 may be constructed of a transparent or opaque member. For example, the transparent member may include transparent synthetic resin or glass, and the opaque member may be constructed of a material such as translucent/opaque synthetic resin or metal.

The sidewall 531 of the rear case 530 according to an embodiment of the present disclosure may form a lateral side of a boundary of the electronic device 500, and may serve as a lateral exterior. The sidewall 531 of the electronic device may be constructed of a conductive material, that is, a conductive sidewall. For example, the sidewall may be constructed of a metallic material, and may operate as an antenna radiator. The sidewall 531 may surround at least a portion of a space provided by the front cover 510 and the rear cover 520. The sidewall 531 may be formed in an integral manner with respect to a conductive structure or a non-conductive structure. The rear case 530 may form at least one slot between the sidewall 531 and the printed circuit board, and thus may be used as a main antenna radiator or an auxiliary antenna radiator. As another example, the sidewall 531 of the rear case 530 may be constructed of a conductive structure, for example, a conductive member. In this case, at least one slot (shown in FIG. 11A) may be formed in the conductive member so as to be utilized as the main antenna radiator or the auxiliary antenna radiator.

In the electronic device 500 according to an embodiment of the present disclosure, an inner space formed by the front cover 510, the rear cover 520 and the side wall 531 may be divided into a first space and a second space by the rear case 530. The first space may be a space towards the rear cover 520 with respect to the rear case 530, and the second space may be a space towards the front cover 510.

The inner support structures 540 according to an embodiment of the present disclosure may be plural in number. A first structure for supporting a display, a substrate, and the like may be constructed, and a second structure for supporting an exterior member may be constructed. For example, a structure capable of supporting and protecting other components such as a battery 533 may be constructed. The inner support structure 540 may be constructed of synthetic resin, metal, or a combination thereof, and may be constructed of a metal alloy containing magnesium.

Figure 6:
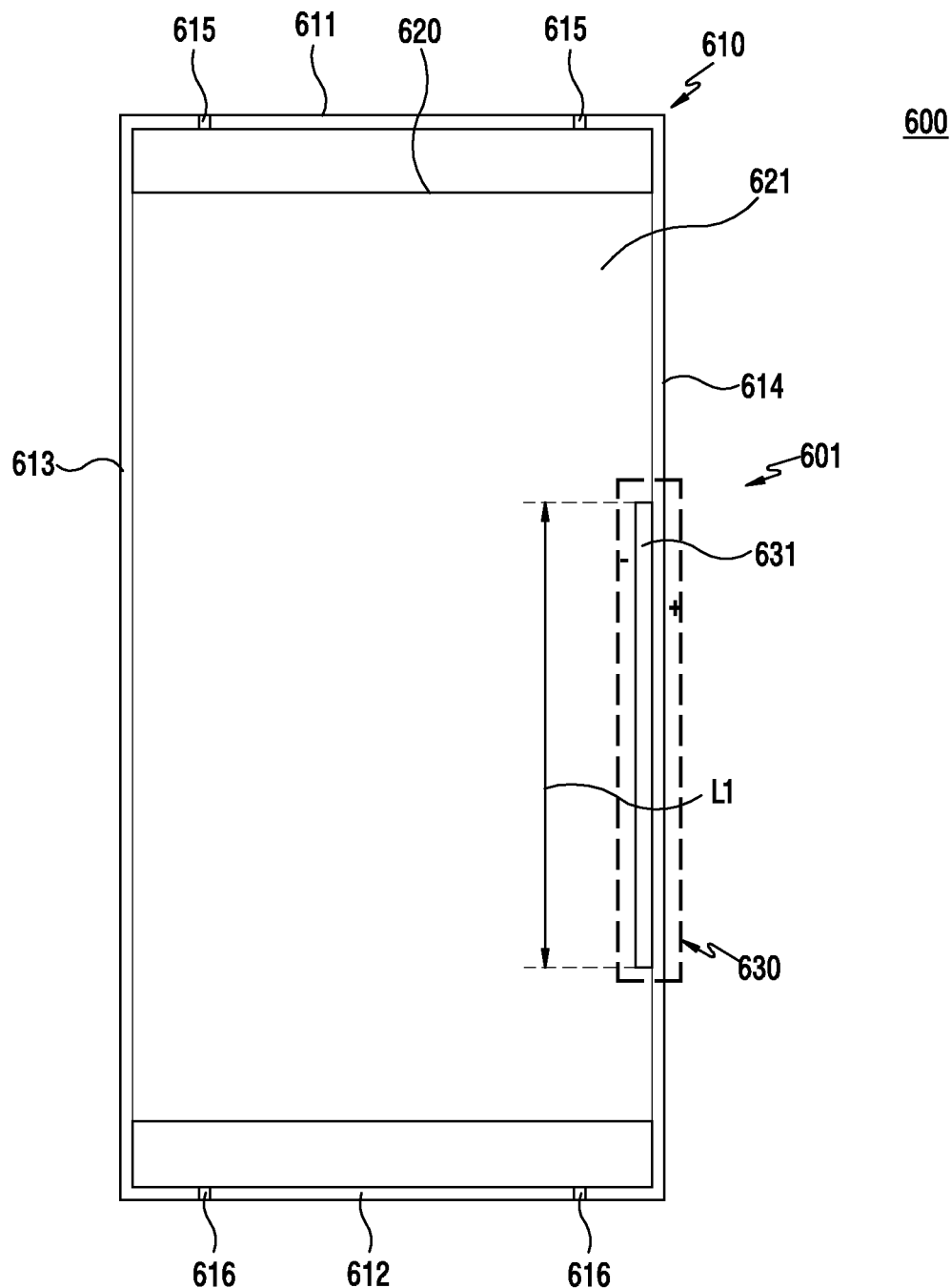
FIG. 6 illustrates an electronic device having a slot antenna disposed at a front side according to an embodiment of the present disclosure.

FIG. 6 illustrates an electronic device having a slot antenna disposed at a front side according to an embodiment of the present disclosure. Referring to FIG. 6, an electronic device 600 according to an embodiment of the present disclosure may be the same electronic device 300 as the electronic device of FIG. 3A to FIG. 3C. The electronic device 600 is a bar-type electronic device, and includes a housing 601, a substrate 620, and a slot antenna 630. The housing 601 may have a conductive housing structure 610 disposed along a boundary of the electronic device 600.

The conductive housing structure 610 according to an embodiment of the present disclosure includes a metal frame which surrounds the boundary of the electronic device 600. For example, the conductive housing structure 610 may be referred to as an exterior metal frame because it serves as at least a portion of an exterior appearance of the electronic device 600. The conductive housing structure 610 may be substantially rectangular, and includes an upper metal frame 611, a lower metal frame 612, and left and right metal frames 613 and 614 with respect to the substrate 620. The upper metal frame 611 and the lower metal frame 612 may be constructed as a segment-type frame having segment portions 615 and 616, respectively, and may operate as an antenna radiator. For example, if the segment portion is provided in the left and right metal frames 613 and 614, each of the left metal frame 613 and the right metal frame 614 may operate as the antenna radiator. At least one antenna using the metal frame according to an embodiment of the present disclosure may be formed in the electronic device 600. The antenna may be constructed by using single-band and/or multi-band antenna constructions. As examples of communication bands that may be covered by the antenna, a general antenna used in a portable electronic device has a basic construction of a planar inverted F antenna (PIFA) or monopole radiator, and a volume and the number of antennas to be mounted may be determined according to a service frequency, bandwidth, and type.

Although service frequencies are different in each region around the world, a low band of 700 MHz to 900 MHz, a mid band of 1700 MHz to 2100 MHz, a high band of 2300 MHz to 2700 MHz, and the like are used as a primary communication band in general. In addition, various wireless communication services such as BT, GPS, and WiFi may be used. As another example, it is designed such that service bands with similar frequency bands are grouped together and separated into several antennas.

For example, in the case of a main antenna which is responsible for voice/data communication (GPRS, WCDMA, LTE, etc.) as main communication of the device, the antenna is located at a lower end of the electronic device since there are metal components which hinder performance of the antenna. For European standards, a the following bands may be required: 2G (GSM850, EGSM, DCS, PCS), WCDMA (B1, B2, B5, B8), LTE (B1, B2, B3, B4, B5, B7, B8, B12, B17, B18, B19, B20, B26, B38, B39, B40, B41), and the like may implement 24 bands.

The electronic device 600 according to an embodiment of the present disclosure may implement an antenna by grouping service bands having similar frequency bands across two regions. For example, 2G (GSM850, EGSM, DCS, PCS), WCDMA (B1, B2, B5, B8), and LTE (B1, B2, B3, B4, B5, B8, B12, B17, B18, B19, B20, B26, B39) may be implemented in a main1 antenna, and an antenna of LTE (B7, B38, B40, B41) may be designed for a main2 antenna.

The substrate 620 according to an embodiment of the present disclosure may include a first side and a second side opposite to the first side. A ground plane 621 may be constructed on at least a portion of the first side. For example, the ground plane 621 may be coated with a metallic material in a shape of a layer on the first side, or may be disposed in a plate shape.

The slot antenna 630 according to an embodiment of the present disclosure includes a slot 631 formed between the ground plane 621 and the right metal frame 614 of the conductive housing structure and a feeding portion for feeding the slot 631. The slot antenna 630 may have a first length L1 and a first thickness. The slot antenna 630 may resonate at a point where the first length L1 of the slot 431 is λ/2, where λ is the wavelength of the service frequency.

Figure 7:
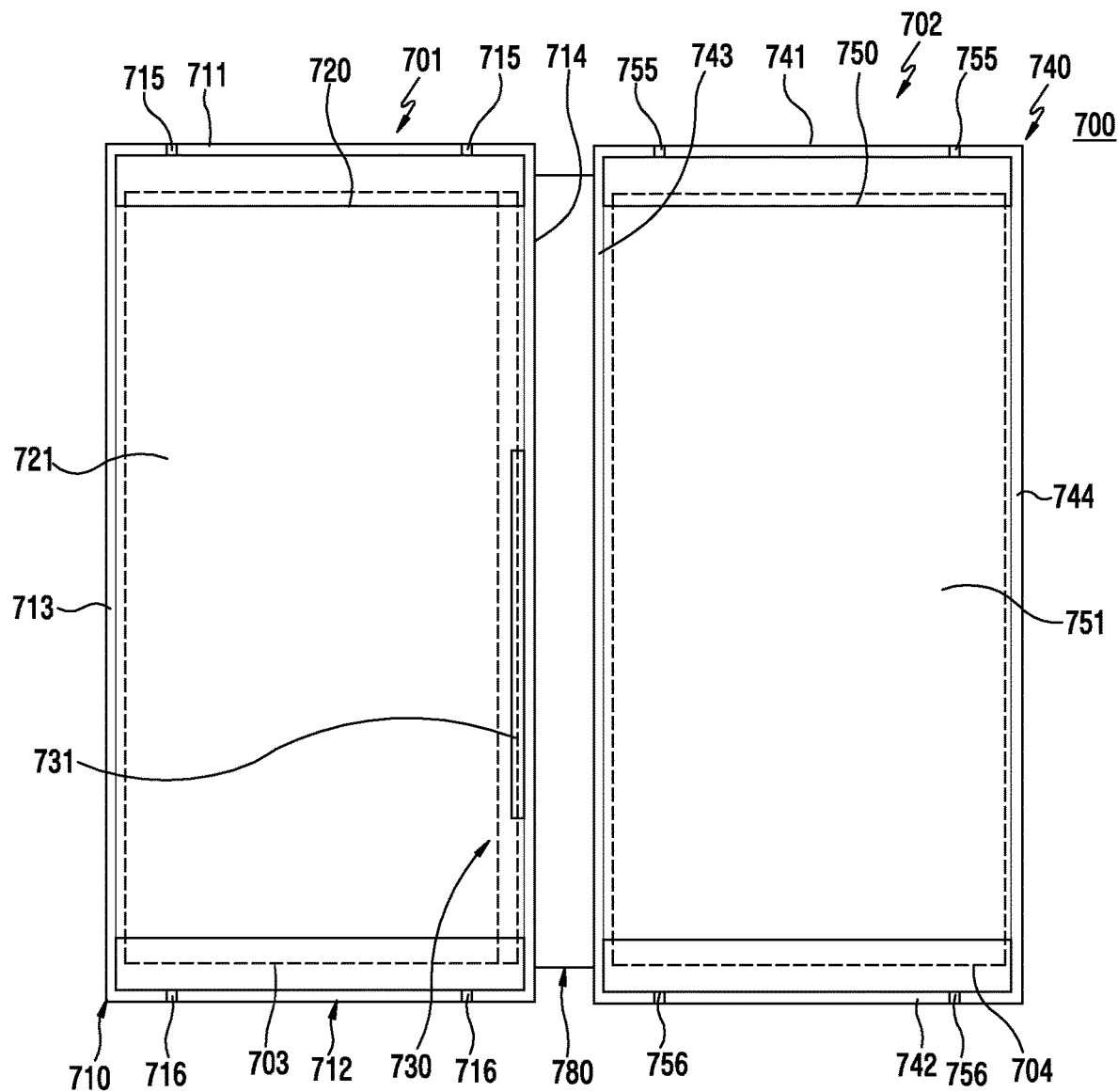
FIG. 7 illustrates a folding-type electronic device having a slot antenna disposed at a front side in an open mode according to an embodiment of the present disclosure.

FIG. 7 illustrates a folding-type electronic device having a slot antenna disposed at a front side in an open mode according to an embodiment of the present disclosure.

Referring to FIG. 7, an electronic device 700 according to an embodiment of the present disclosure is a folding-type electronic device including first and second housings 701 and 702. The first housing 701 may be the electronic device 700 which is the same as the electronic device 300 of FIG. 3A to FIG. 3C. In addition, the first housing 701 may be the same as the electronic device 600 of FIG. 6.

The electronic device 700 according to an embodiment of the present disclosure is a folding-type electronic device, and includes the first housing 701 and the second housing 702. The first and second housings 701 and 702 may be physically or electrically connected by a connecting member 780. The electronic device 700 may be disposed such that the first and second housings 701 and 702 are laminated in an up/down direction in a folded state. The first housing 701 includes a first display 703, a first substrate 720, and a slot antenna 730. The first housing 701 may have a first conductive housing structure 710 disposed along an outer boundary. The first display 703 according to an embodiment of the present disclosure may be disposed at a first side of the first housing 701 so that at least a portion thereof is exposed to the outside.

The first conductive housing structure 710 according to an embodiment of the present disclosure includes a metal frame which surrounds the outer boundary of the electronic device 700. For example, the first conductive housing structure 710 may be referred to as an exterior metal frame because it serves as at least a portion of an exterior appearance of the electronic device 700. The first conductive housing structure 710 may be substantially rectangular, but is not limited thereto. The first conductive housing structure 710 includes an upper metal frame 711, a lower metal frame 712, and left and right metal frames 713 and 714 with respect to the first substrate 720. For example, the upper metal frame 711 and the lower metal frame 712 may be constructed as a segment-type frame having segment portions 715 and 716, respectively, and may operate as an antenna radiator. For example, if the segment portion is provided in the left and right metal frames 713 and 714, each of the left metal frame 713 and the right metal frame 714 may operate as the antenna radiator. The first substrate 720 according to an embodiment of the present disclosure may include a first side and a second side opposite to the first side. A ground plane 721 may be constructed on at least a portion of the first side. For example, the ground plane 721 may be coated with a metallic material in a shape of a layer on the first side, or may be disposed in a plate shape.

The slot antenna 730 according to an embodiment of the present disclosure includes a slot 731 formed between the ground plane 721 and the right metal frame 714 of the first conductive housing structure 710 and a feeding portion for feeding the slot 731. The slot antenna 730 may have a first length L1 and a first thickness. The slot antenna 730 may resonate at a point where the first length L1 of the slot 731 is λ/2, and thus may operate as at least a portion of the antenna.

The electronic device 700 according to an embodiment of the present disclosure includes the second housing 702 disposed to be substantially aligned or overlap with the first housing 710. The second housing 702 includes a second display 704, a second substrate 750, and a second conductive housing structure 740.

The second display 704 according to an embodiment of the present disclosure may be disposed at a third side of the second housing 702 such that at least a portion thereof is exposed to the outside.

The second conductive housing structure 740 according to an embodiment of the present disclosure includes a metal frame which surrounds an outer boundary of the electronic device 700. For example, the second conductive housing structure 740 may be referred to as an exterior metal frame because it serves as at least a portion of an exterior appearance of the electronic device 700. The second conductive housing structure 740 may be substantially rectangular, and includes an upper metal frame 741, a lower metal frame 742, and left and right metal frames 743 and 744 with respect to the substrate 720. For example, the upper metal frame 741 and the lower metal frame 742 may be constructed as a segment-type frame having segment portions 745 and 746, respectively, and may operate as an antenna radiator. For example, the left metal frame 743 and the right metal frame 744 may be constructed as a segment-type frame having a segment portion, and may operate as the antenna radiator.

The connecting member 780 according to an embodiment of the present disclosure is constructed of a flexible material for physically and electrically connecting the first and second housings 701 and 702, and may be a foldable portion. For example, the connecting member 780 may be a hinge unit which provides a rotation axis, and may be a folding unit which is foldable.

Figure 8A:
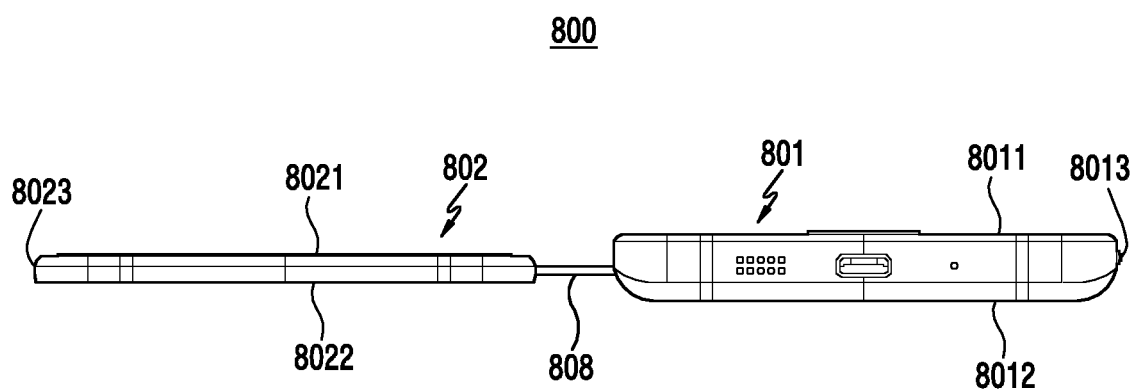
FIG. 8A illustrates an electronic device in an open mode according to an embodiment of the present disclosure.

FIG. 8A illustrates an electronic device in an open mode according to an embodiment of the present disclosure.

Figure 8B:
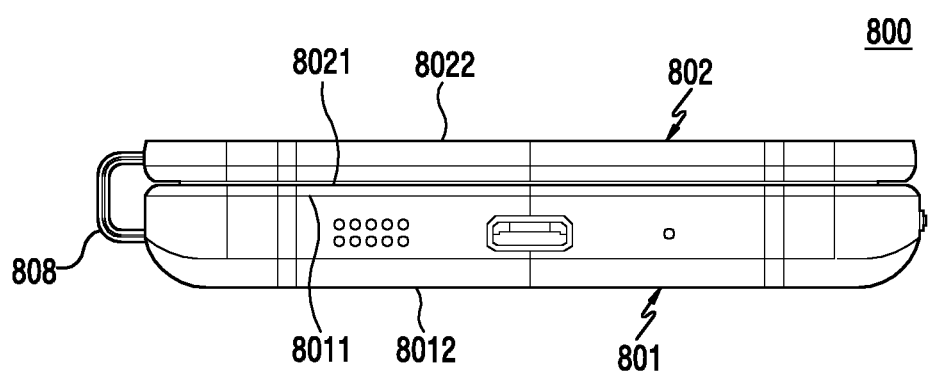
FIG. 8B illustrates an electronic device in a front folding mode when in a closed mode according to an embodiment of the present disclosure.

FIG. 8B illustrates a front folding electronic device in a closed mode according to an embodiment of the present disclosure.

Figure 8C:
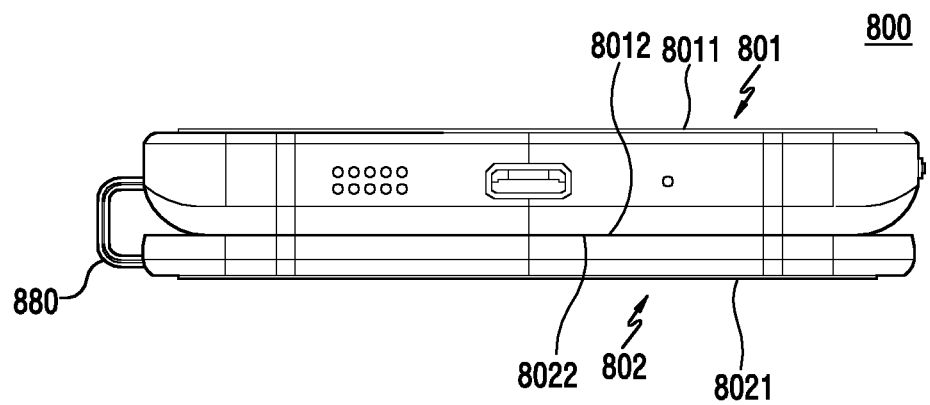
FIG. 8C illustrates an electronic device in a back folding mode when in a closed mode according to an embodiment of the present disclosure.

FIG. 8C illustrates a back folding electronic device in a closed mode according to an embodiment of the present disclosure. An electronic device 800 of FIG. 8A to FIG. 8C may be the same as the electronic device 700 of FIG. 7.

Referring to FIG. 8A to FIG. 8C, the electronic device 800 according to an embodiment of the present disclosure includes first and second housings 801 and 802 and a connecting member 880. The first housing 801 includes a first side 8011 facing in a first direction, a second side 8012 facing in a second direction opposite to the first direction, and a first lateral side 8013 surrounded by at least a portion of a space between the first and second sides 8011 and 8012. The second housing includes a third side 8021 facing in a third direction, a fourth side 8022 facing in a fourth direction opposite to the third direction, and a second lateral side 8023 surrounded by at least a portion of a space between the third and fourth sides 8021 and 8022.

Figure 9A:
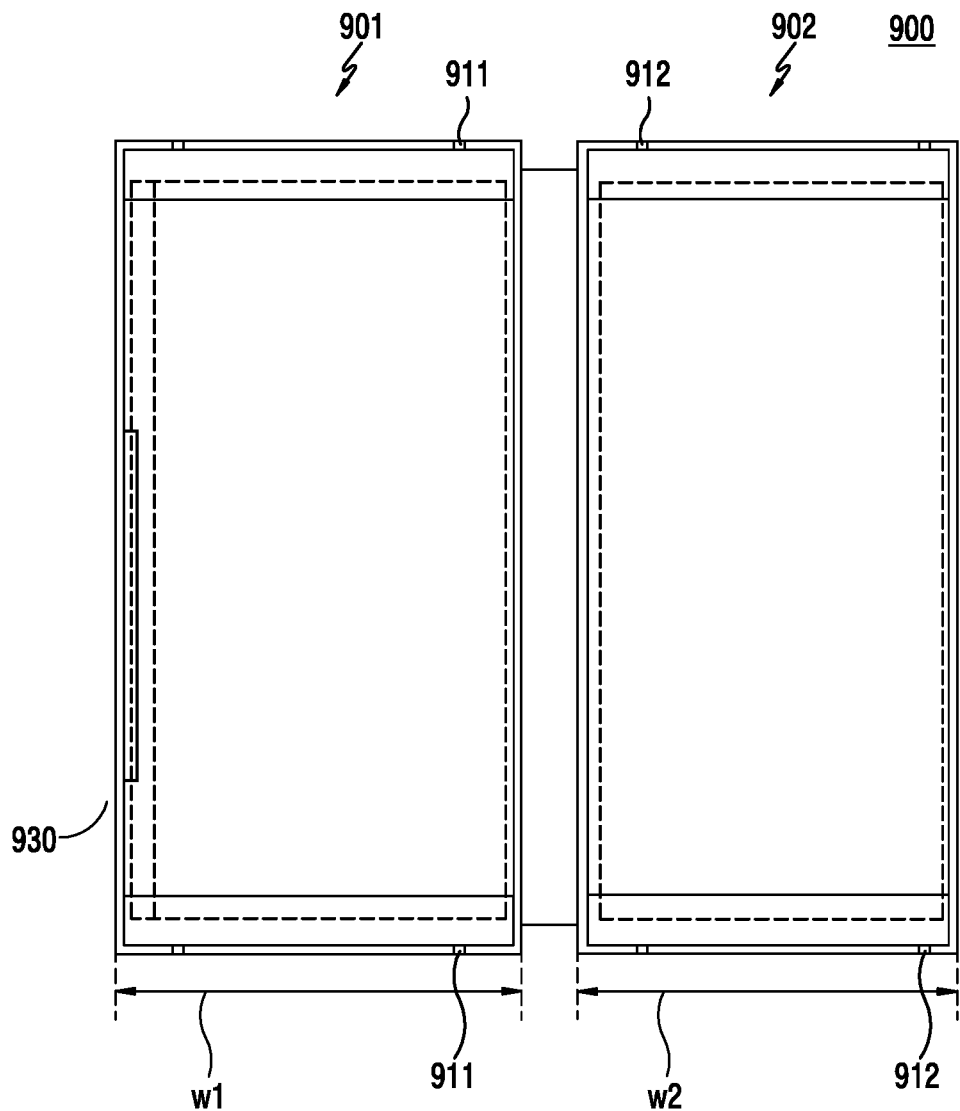
FIG. 9A illustrates a folding-type electronic device having a single slot antenna disposed at a front side in an open mode according to an embodiment of the present disclosure.

FIG. 8A illustrates the electronic device 800 in an open mode, and FIG. 8B and FIG. 8C illustrate the electronic device in a closed mode. In this case, FIG. 8B illustrates the electronic device 800 in a front folding mode, and FIG. 8C illustrates the electronic device 800 in a back folding mode. The electronic device 800 in the front folding mode may mean a folded state where the first side 8011 of the first housing may be disposed to face the third side 8021 of the second housing. The electronic device in the back folding mode may mean a folded state where the second side 8012 of the first housing may be disposed to face the fourth side 8022 of the second housing. FIG. 9A illustrates a front folding electronic device having a single slot antenna disposed at a front side in an open mode according to an embodiment of the present disclosure.

Figure 9B:
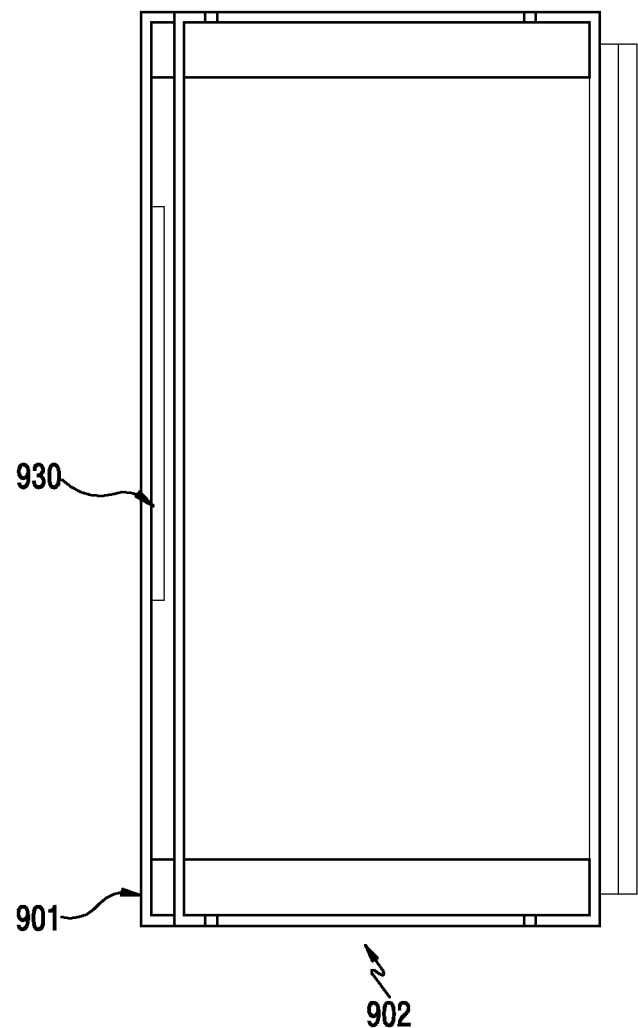
FIG. 9B illustrates an electronic device in a front folding mode according to an embodiment of the present disclosure.

FIG. 9B illustrates a front folding electronic device in a closed mode according to an embodiment of the present disclosure.

Referring to FIG. 9A and FIG. 9B, in order to prevent deterioration in antenna performance of a slot antenna 930 disposed at a first housing 901 in the front folding mode, an electronic device 900 according to an embodiment of the present disclosure may allow the first and second housings 901 and 902 to have different widthwise lengths. For example, the widthwise length of the first housing 901 having the slot antenna 930 may be longer than the widthwise length of the second housing 902 having the slot antenna, so as not to hide a region where the slot antenna 930 is present in an overlapping state of the first and second housings 901 and 902 when the electronic device 900 is in a closed mode.

The first housing 901 according to an embodiment of the present disclosure includes the slot antenna 930 between a left exterior metal frame and a ground plane. As another example, the slot antenna 930 may be disposed between the left exterior metal frame and a display. The slot antenna 930 may be disposed in proximity to the exterior metal frame by avoiding a region where the display is disposed. Since a configuration of the slot antenna 930 has already been described, a description thereof will be omitted. The first housing 901 may have a first horizontal width w1 and a first vertical length. The second housing 902 may have a second horizontal width w2 and a second vertical length. The first horizontal width w1 may be greater than the second horizontal width w2. According to such a configuration, the electronic device 900 when in a front folding closed mode is disposed such that the slot antenna 930 is not hidden by the second housing 902, thereby preventing deterioration of antenna performance. The electronic device 900 may be in a state where a segment portion 911 provided in the first housing 901 and a segment portion 912 provided in the second housing 902 are aligned. In this state, since the slot antenna 930 is open to the outside without being hidden by the second housing 902, an influence of the second housing 902, in particular, a conductive member of the second housing 902, is avoided, and thus a radiation characteristic of the slot antenna 930 may not be deteriorated by the second housing 902.

Figure 10A:
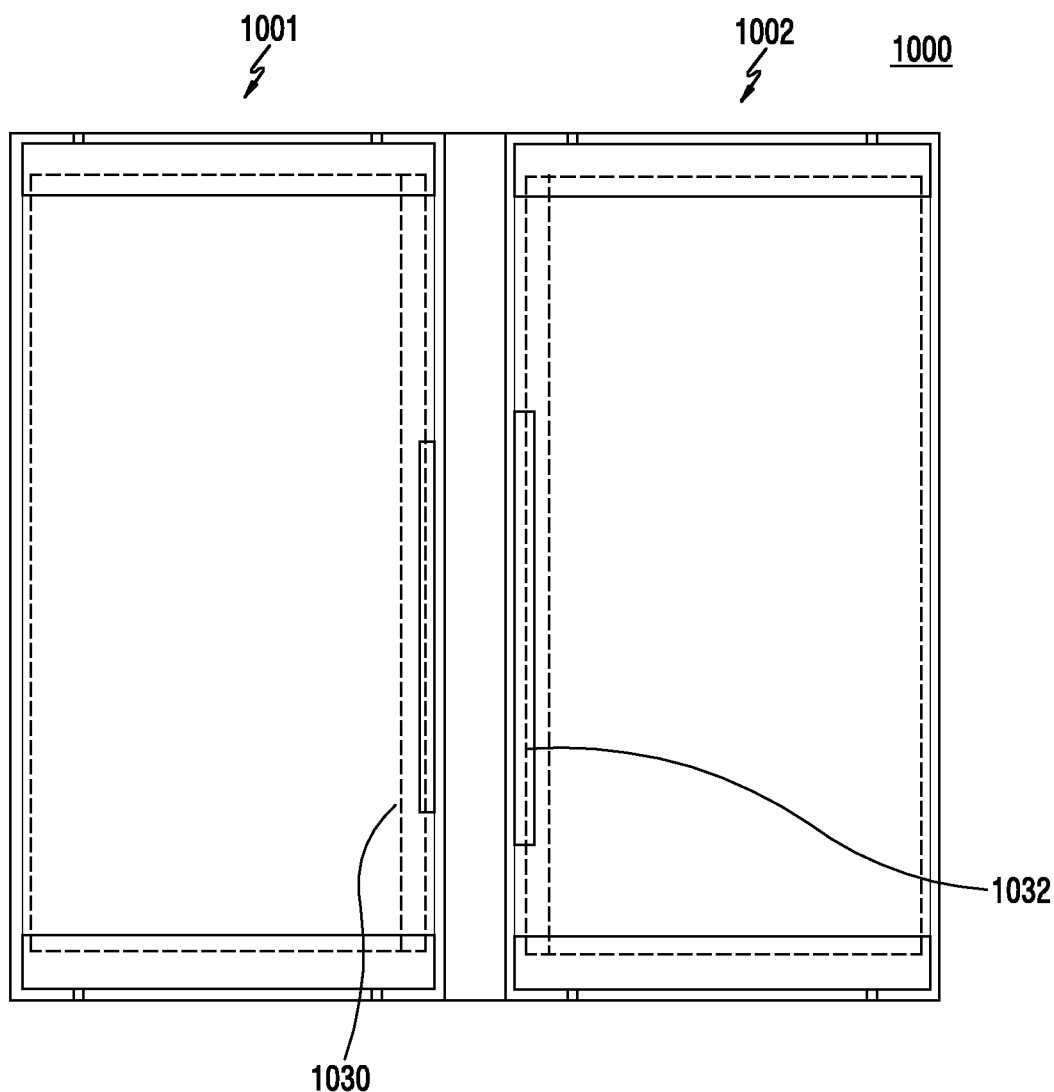
FIG. 10A illustrates a folding-type electronic device having a single slot antenna disposed at a front side in an open mode according to an embodiment of the present disclosure.

FIG. 10A illustrates a folding-type electronic device having a single slot antenna disposed at a front side in an open mode according to an embodiment of the present disclosure.

Figure 10B:
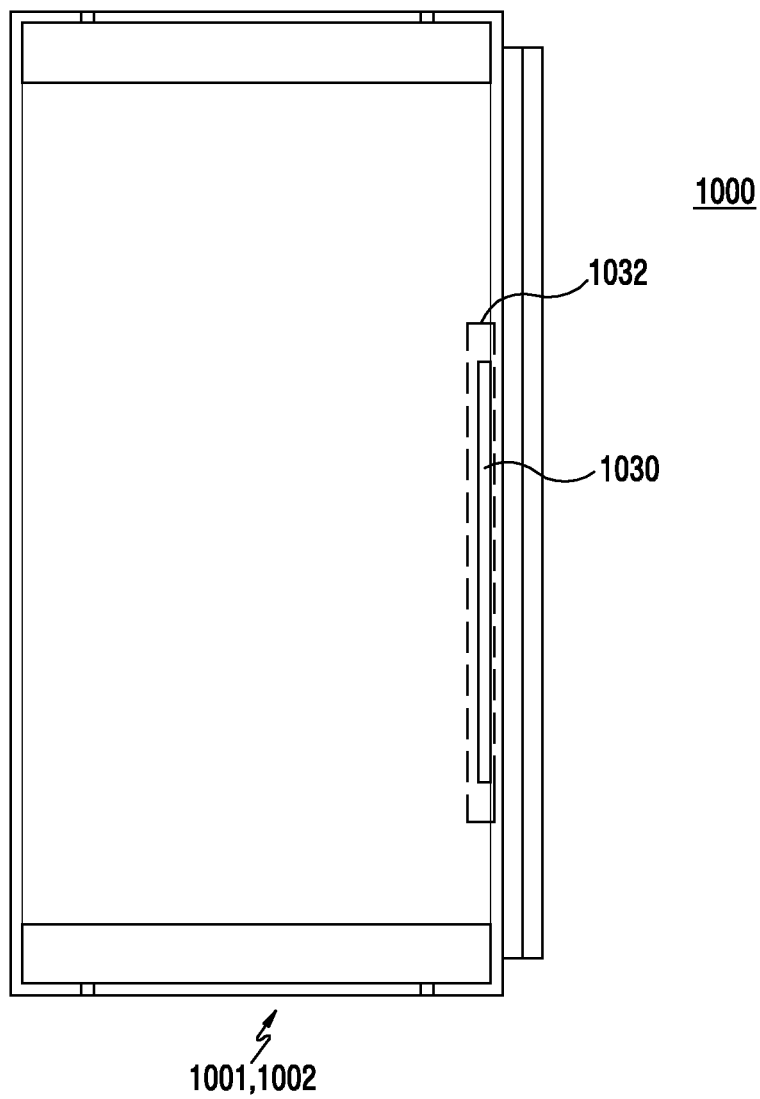
FIG. 10B illustrates an electronic device in a front folding mode according to an embodiment of the present disclosure.

FIG. 10B illustrates a front folding electronic device according to an embodiment of the present disclosure.

Since a configuration of a plurality of conductive members disposed at an outer boundary of the electronic device and a configuration of a plurality of non-conductive members have already been described in FIG. 7, a detailed description thereof will be omitted.

Referring to FIG. 10A and FIG. 10B, in a front folding mode, an electronic device 1000 according to an embodiment of the present disclosure may have a dummy opening 1032 formed in a second housing 1002 corresponding to a slot antenna 1030 disposed at a first housing 1001.

The first housing 1001 according to an embodiment of the present disclosure includes the slot antenna 1030 between an exterior metal frame and a ground plane. Since a configuration of the slot antenna 1030 has already been described, a description thereof will be omitted. The dummy opening 1032 may have a size sufficient to accommodate a slot of the slot antenna 1030. The dummy opening 1032 may be formed between the exterior metal frame and the ground plane. For example, the dummy opening 1032 may be extended to a predetermined length along a vertical direction of the second housing 1002. When the first and second housings 1001 and 1002 overlap with each other, the slot antenna 1030 and the dummy opening 1032 may be disposed at positions overlapping in an up/down direction. In this state, a radiation operation may be achieved by the slot antenna 1030 through the dummy opening 1032.

As another example, if the slot antenna 1030 is disposed at an upper end or lower end or another region of the first housing 1001, the dummy opening 1032 may also be disposed at an upper end or lower end or another corresponding region of the second housing 1002, respectively, so as to be disposed at a position corresponding to the slot antenna 1030.

Figure 11A:
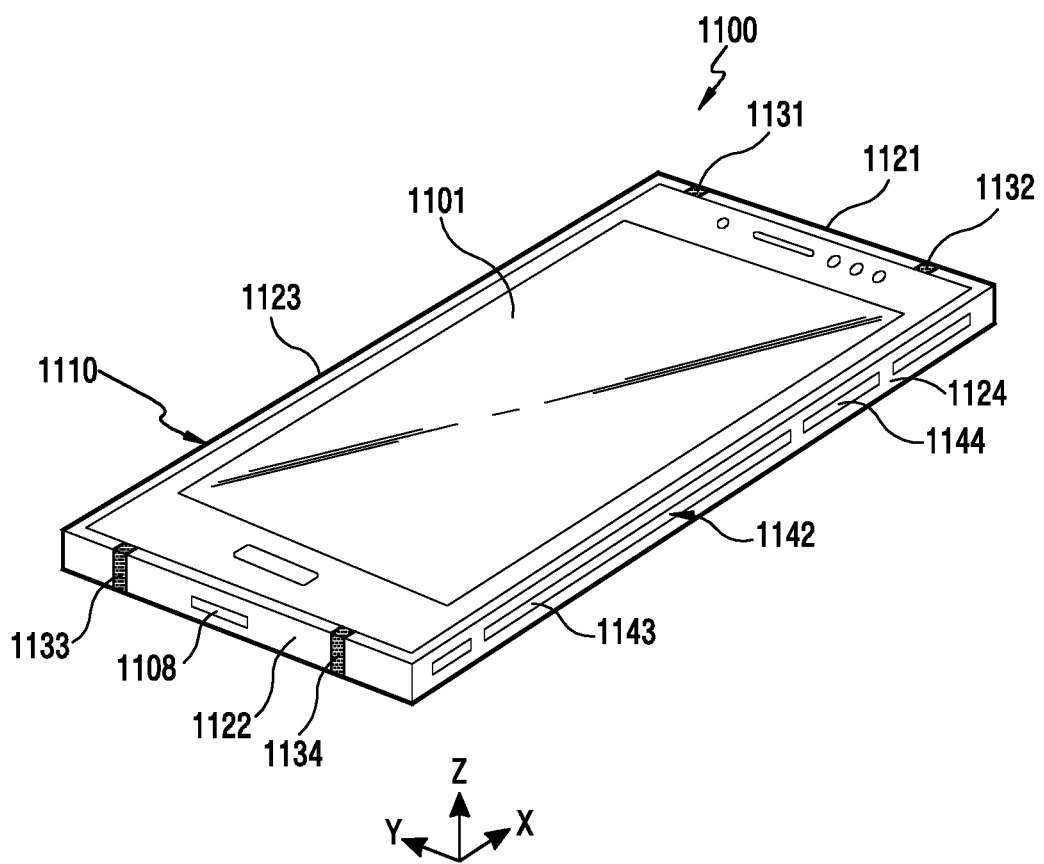
FIG. 11A is a perspective view illustrating an electronic device according to an embodiment of the present disclosure.

FIG. 11A is a perspective view illustrating an electronic device according to an embodiment of the present disclosure.

Figure 11B:
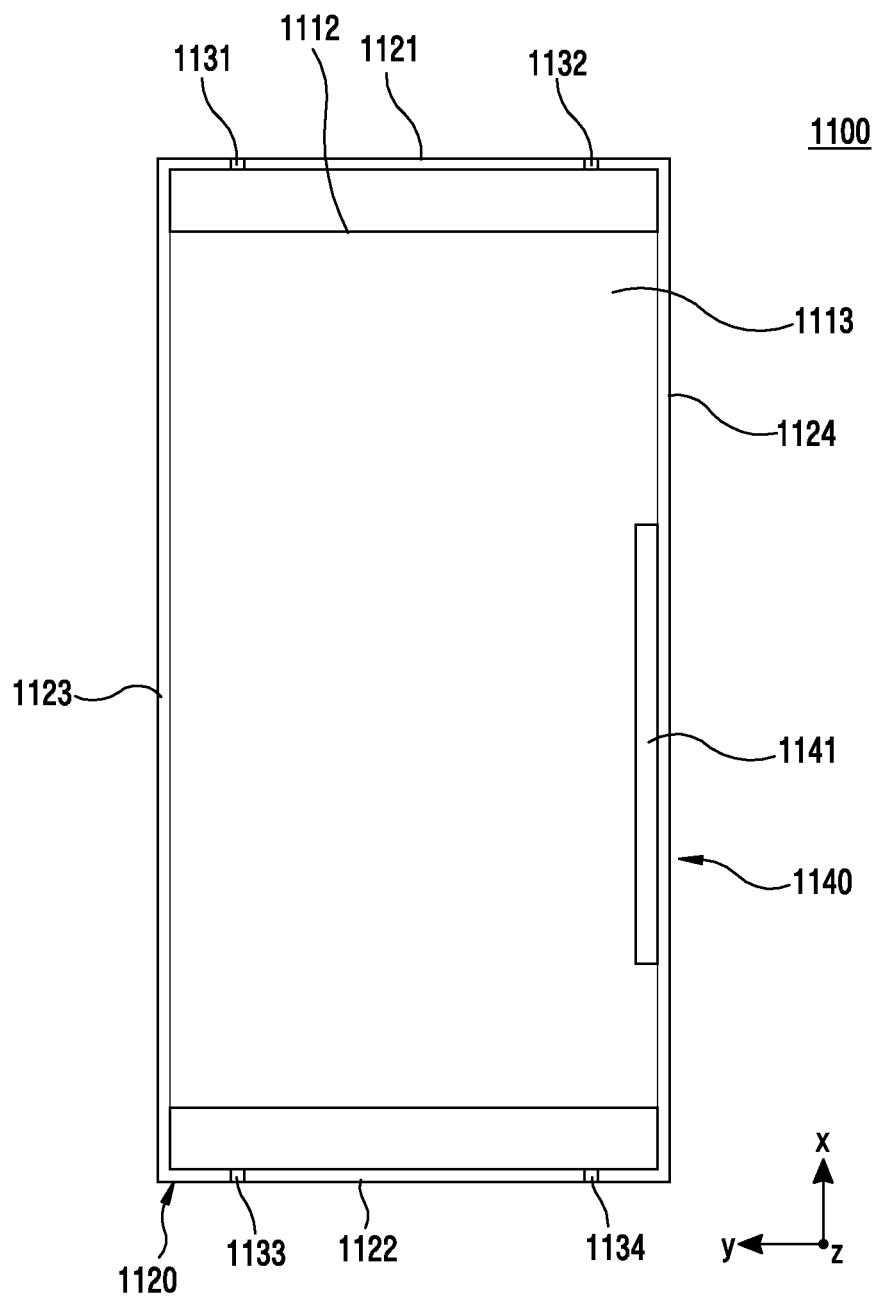
FIG. 11B is a front view illustrating an interior of an electronic device according to an embodiment of the present disclosure.

FIG. 11B is a front view illustrating an interior of an electronic device according to an embodiment of the present disclosure.

Figure 11C:
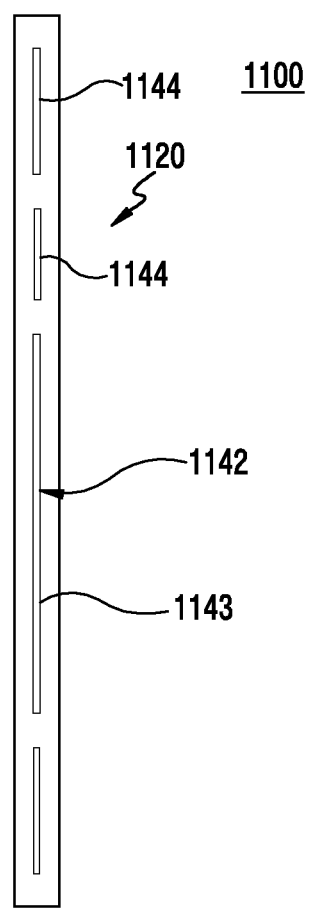
FIG. 11C is a lateral view illustrating a slot antenna disposed at one lateral side of an electronic device according to an embodiment of the present disclosure.

FIG. 11C is a lateral view illustrating a slot antenna disposed at one lateral side of an electronic device according to an embodiment of the present disclosure.

Figure 11D:
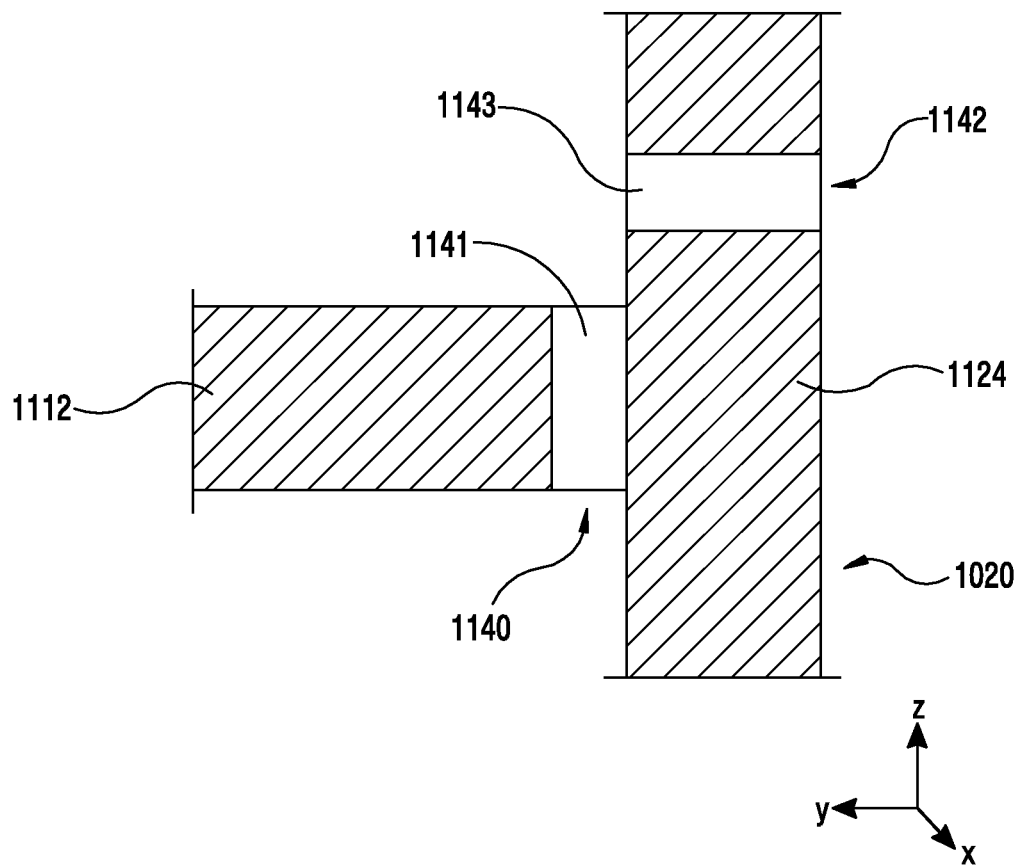
FIG. 11D is a cross-sectional view illustrating a multi-slot antenna according to an embodiment of the present disclosure.

FIG. 11D is a cross-sectional view illustrating a multi-slot antenna according to an embodiment of the present disclosure.

An orthogonal coordinate system may be used in FIG. 11A to FIG. 11D. An X-axis may imply a vertical direction of an electronic device 1100, a Y-axis may imply a horizontal direction of the electronic device 1100, and a Z-axis may imply an up/down direction (a thickness direction) of the electronic device 1100.

FIG. 11A to FIG. 11D illustrate an example in which at least a portion of a housing 1110 forms at least a portion of a slot antenna in an electronic device 1100 according to an embodiment of the present disclosure of the present disclosure.

Referring to FIG. 11A and FIG. 11B, the electronic device 1100 according to an embodiment of the present disclosure includes housing structures 1121 to 1124 disposed along an outer boundary of the housing. For example, the conductive housing structures 1121 to 1124 disposed at a boundary of the electronic device 1100 may be a portion of an exterior appearance, and may operate as an antenna device. For example, the conductive housing structures 1121 to 1124 disposed along the outer boundary of the housing 1110 may partially operate as at least one or more antenna radiators, or may be partially utilized as a portion of at least one slot antenna. In the present disclosure, the conductive housing structures 1121 to 1124 may be interchangeably described as being a conductive member, a conductive frame, a metal frame, or an exterior metal frame. Hereinafter, the conductive housing structures 1121 to 1124 will be referred to as metal frames. The metal frames 1121 to 1124 which at least partially serve as an exterior appearance of the housing may include first to fourth metal frames. The electronic device 1100 according to an embodiment of the present disclosure may have at least one or more non-conductive members 1131 to 1134 disposed at the housing 1110.

The non-conductive member according to an embodiment of the present disclosure may be disposed at the first and second metal frames 1121 and 1122 of the first housing 1110. A disposition configuration of the non-conductive member disposed at the electronic device 1100 may be formed not only in a region of the first and second frames 1121 and 1122 but also in a region of the third metal frame 1123 or the fourth metal frame 1124, and may be disposed with the same configuration.

The electronic device 1100 according to an embodiment of the present disclosure includes the housing 1110. The housing 1110 may be connected to another housing by means of a connecting member. For example, the housing 1110 may form the entirety, or at least a portion, of an overall exterior appearance of the electronic device 1100. The housing 1110 may be formed of plastic, metal, carbon fiber and other fiber composites, materials such as ceramics, glass, wood, or combinations of these materials.

The housing 1110 according to an embodiment of the present disclosure may have a first side (an upper side), a second side (a lower side) opposite to the first side, and a plurality of lateral sides between the first and second sides. For example, the upper side, lower side, and plurality of lateral sides of the housing 1110 may be formed of the same material, or may be formed of materials having different physical properties. The housing 1110 includes a display 1101 (or a touch panel may be mounted thereon and thus may be referred to as a touch screen) on the upper side. When the electronic device 1100 according to an embodiment of the present disclosure is viewed from the front side, a metal frame on the upper side of the housing 1110 may be referred to as the first metal frame 1121. A metal frame on the lower side of the housing 1110 may be referred to as the second metal frame 1122. A metal frame on the left side of the housing 1110 may be referred to as the third metal frame 1123. A metal frame on the right side of the housing 1110 may be referred to as the fourth metal frame 1124.

The first metal frame 1121 or the second metal frame 1122 according to an embodiment of the present disclosure may include at least one non-conductive member. For example, the first metal frame 1121 and the second metal frame 1122 may respectively include the non-conductive members 1131 and 1132 and the non-conductive members 1133 and 1134. For example, the non-conductive members 1131 and 1132 and the non-conductive members 1133 and 1134 may be formed of an insulating material and may be referred to as an insulating portion, and may be referred to as a segment portion by separating one metal frame from another.

The non-conductive member according to an embodiment of the present disclosure may be disposed at the first metal frame 1121, or may be disposed at the second metal frame 1122, or may be disposed at both first metal frame 1121 and the second metal frame 1122. For example, the pair of non-conductive members 1131 and 1132 disposed at both ends of the first metal frame 1121 may be defined as a first non-conductive member, and the pair of the non-conductive members 1131 and 1132 disposed at both ends of the second metal frame 1122 may be defined as a second non-conductive member. At least a portion of the metal frames 1121 and 1122 separated by the at least one non-conductive member according to an embodiment of the present disclosure may operate as at least a portion of an antenna radiator. For example, at least a portion of the metal frame 1121 and 1122 separated respectively by the first non-conductive members 1131 and 1132 and the second non-conductive members 1133 and 1134 may be utilized as the antenna radiator.

When operating as at least a portion of the antenna radiator by being fed to one of the first metal frame 1121 or the second metal frame 1122 according to an embodiment of the present disclosure, at least one of the third metal frame 1123 or the fourth metal frame 1124 may be electrically coupled to at least one of the first metal frame 1121 or the second metal frame 1122, and thus may operate as at least a portion of the antenna radiator. The pair of first non-conductive members 1131 and 1132 according to an embodiment of the present disclosure may be configured by allowing at least one gap between the metal frames to be filled with at least a portion of the non-conductive material. The pair of second non-conductive members 1133 and 1134 according to an embodiment of the present disclosure may be configured by allowing the gap between the metal frames to be filled with a non-conductive material. For example, the first non-conductive members 1131 and 1132 and the second non-conductive members 1133 and 1134 may be disposed in an up-down symmetric/asymmetric manner and/or a left-right symmetric/asymmetric manner with respect to the display 1101. At least some of various electronic components may be disposed at the first metal frame 1121 according to an embodiment of the present disclosure. For example, the first metal frame 1121 may accommodate at least one of a socket device for inserting a card-type external device and a memory card for expanding a storage space. For example, an earphone jack connector may be disposed at the first metal frame 1121 to connect an earphone jack. However, the disposition of the socket device or the memory card is not limited thereto.

An interface connector 1108 for charging the battery of the electronic device 1100 may be disposed at the second metal frame 1122 according to an embodiment of the present disclosure to charge the battery of the electronic device 1100 by using a data transmitting/receiving function provided by an external device and/or by receiving external power. An ear jack hole may be disposed at one side of the interface connector 1108. However, the present disclosure is not limited thereto, and thus at least one of the aforementioned electronic components may be disposed outside the metal frame. At least one side key button may be disposed at the third metal frame 1123 according to an embodiment of the present disclosure to perform a volume up/down function, a scroll function, and the like.

The fourth metal frame 1124 according to an embodiment of the present disclosure includes at least one slot antenna 1140 or 1142 and/or at least one connection opening 1144. The slot antenna 1142 includes the first slot antenna 1140 disposed between an exterior metal frame 1120 and a ground plane 1113 formed to an inner support structure 1112 (e.g., an inner support bracket or a substrate) and the second slot antenna 1142 disposed at the exterior metal frame 1120. The first slot antenna 1140 may face in a front direction of the electronic device 1100, and the second slot antenna 1142 may face in a lateral direction of the electronic device 1100. That is, the first slot antenna 1140 may be disposed at the front side of the electronic device 1100 and thus radiation distribution may be achieved in the front direction, and the second slot antenna 1142 may be disposed at the lateral side of the electronic device 1100 and thus radiation distribution may be achieved in the lateral direction.

The exterior metal frame 1120 according to an embodiment of the present disclosure includes the first to fourth exterior metal frames 1121 to 1124. The first and second metal frames 1121 and 1122 may operate as main antenna radiators. The third and fourth exterior metal frames 1123 and 1124 may operate as auxiliary radiators (coupling radiators) of the main antenna radiator, or may be utilized as a portion of a slot antenna. For example, the first exterior metal frame 1121 may be disposed between the non-conductive members 1131 and 1132, and may include a feeding portion of a substrate and a ground portion of a substrate separated from the feeding portion. A slot 1141 may have a length in a direction of the feeding portion in the conductive member 1124. The slot 1141 is not in contact with the conductive member which operates as an antenna radiator, but may be disposed at a position where electrical coupling is possible.

According to an embodiment of the present disclosure, the slot 1141 may have a first electrical length in a direction from the conductive member 1124 to the feeding portion. In this case, the conductive member 1124 may operate at a first operating frequency band corresponding to the first electrical length of the slot. When the electrical length of the slot 1141 is shortened, the operating frequency band at which the antenna device operates may be shifted from a low frequency band to a relatively high frequency band.

The first slot antenna 1140 according to an embodiment of the present disclosure includes the first slot 1141 formed between the ground plane 1113 and the exterior metal frame 1120 and a feeding portion for supplying current to the external metal frame 1120. The first slot 1141 may have a first length and a first thickness. The first slot 1141 may have an opening shape, and may be extended linearly (an X-axis direction) between the ground plane 1113 and the exterior metal frame 1120. For example, the first slot antenna 1140 is not necessarily limited to being disposed between the ground plane 1113 and the fourth metal frame 1124. The first slot antenna 1140 may configured at various locations if a slot is formed between the ground plane 1113 and any one of the first to third metal frames 1121 to 1123. A width of the first slot 1141 may be determined by a metallic component of the display 1101 located in the ground plane 1113.

Referring to FIG. 11C and FIG. 11D, the electronic device 1100 according to an embodiment of the present disclosure includes a plurality of connection openings 1143 and 1144 formed in the fourth metal frame 1124 in order to be connected to another member by means of a connecting member. One of the plurality of openings 1143 and 1144 may be the second slot 1143 and the remaining opening 1144 may be an opening through which the connecting member passes. The second slot 1143 may be at least a portion of the second slot antenna 1142, and may be an opening through which the connecting member passes. The second slot 1143 is extended along a direction in which the fourth metal frame 1124 is extended, and may be extended linearly. A bandwidth of the second slot antenna 1142 may be adjusted according to a position of a feeding portion and a length of the second slot 1143. The first slot 1141 and the second slot 1143 may be connected spatially. At least one second slot 1143 may be formed in the metal frame, and the second slot 1143 may have an electrical length depending on a bandwidth. The second slot 1143 is formed in the metal frame, but is not necessarily limited to being formed in the exterior metal frame exposed to the outside. For example, the second slot 1143 may be configured to not be visible, but may be configured to be hidden when the rear side of the electronic device is constructed of glass or an injection cover.

The disposition of the second slot 1143 according to an embodiment of the present disclosure is not necessarily limited to the position of the fourth metal frame 1124, and thus it may be disposed at the first to third metal frames 1121 to 1123 to operate as a slot antenna radiator. For example, at least one second slot 1143 may operate as an antenna radiator. A plurality of second slots 1143 may be disposed at one metal frame, or may be disposed at two or more metal frames. A bandwidth of the second slot 1143 may be adjusted according to a distance to the feeding portion, and the bandwidth may be adjusted according to its length. As another example, when the second slot 1143 is formed in the metal frame, it may be formed in proximity to the front side of the electronic device, and may be formed to be open laterally. As another example, the second slot 1143 may be extended to have a predetermined length along a lengthwise direction of the metal frame, and may be extended in a direction parallel to the first slot 1141.

Figures 12A, 12B:
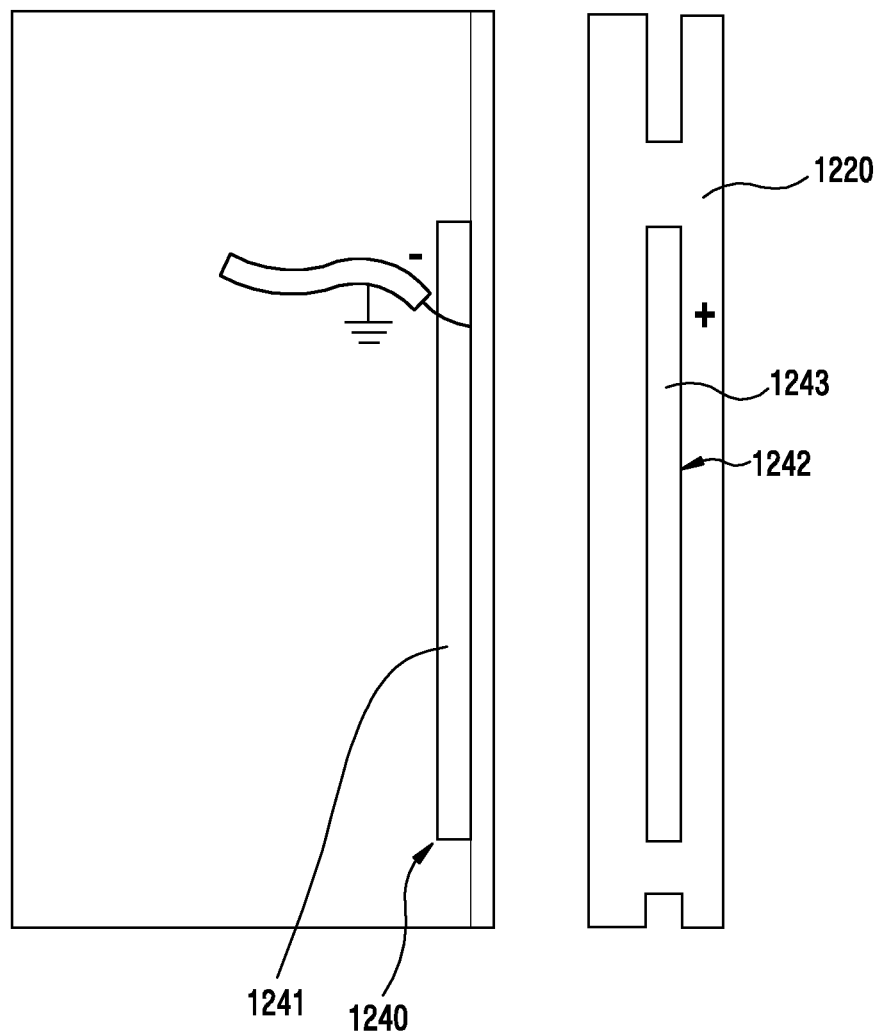
FIG. 12A illustrates a multi-slot antenna according to an embodiment of the present disclosure.
FIG. 12B illustrates a multi-slot antenna according to another embodiment of the present disclosure.

FIG. 12A illustrates a multi-slot antenna according to an embodiment of the present disclosure of the present disclosure.

FIG. 12B illustrates a multi-slot antenna according to another embodiment of the present disclosure of the present disclosure.

Referring to FIG. 12A and FIG. 12B, first and second slot antennas 1240 and 1242 according to an embodiment of the present disclosure may have the same configuration as the first and second slot antennas 1140 and 1142 of FIG. 11A to FIG. 11D. The second slot antenna 1242 according to an embodiment of the present disclosure includes a second slot 1243 formed in an exterior metal frame 1220, a feeding portion (shown in FIG. 13) for supplying current to the exterior metal frame 1220, and a communication circuit (an impedance matching circuit). The second slot 1243 has a second length and a second thickness, and may be configured in an opening shape on a lateral side of the exterior metal frame 1220. The second slot 1243 has an electrical length, and may be extended linearly to have a length along the exterior metal frame 1220. The second slot 1243 is configured in an open shape which is open to the outside, and a non-conductive material may be filled inside the second slot 1243.

The second slot 1243 according to an embodiment of the present disclosure may have a shape similar to the first slot 1241. A length and size of the second slot 1243 may be determined primarily by considering a length and width of the first slot 1241 and secondarily by considering a frequency band of operation. A length of the second slot 1243 may be substantially equal to the length of the first slot 1241.

Figure 13:
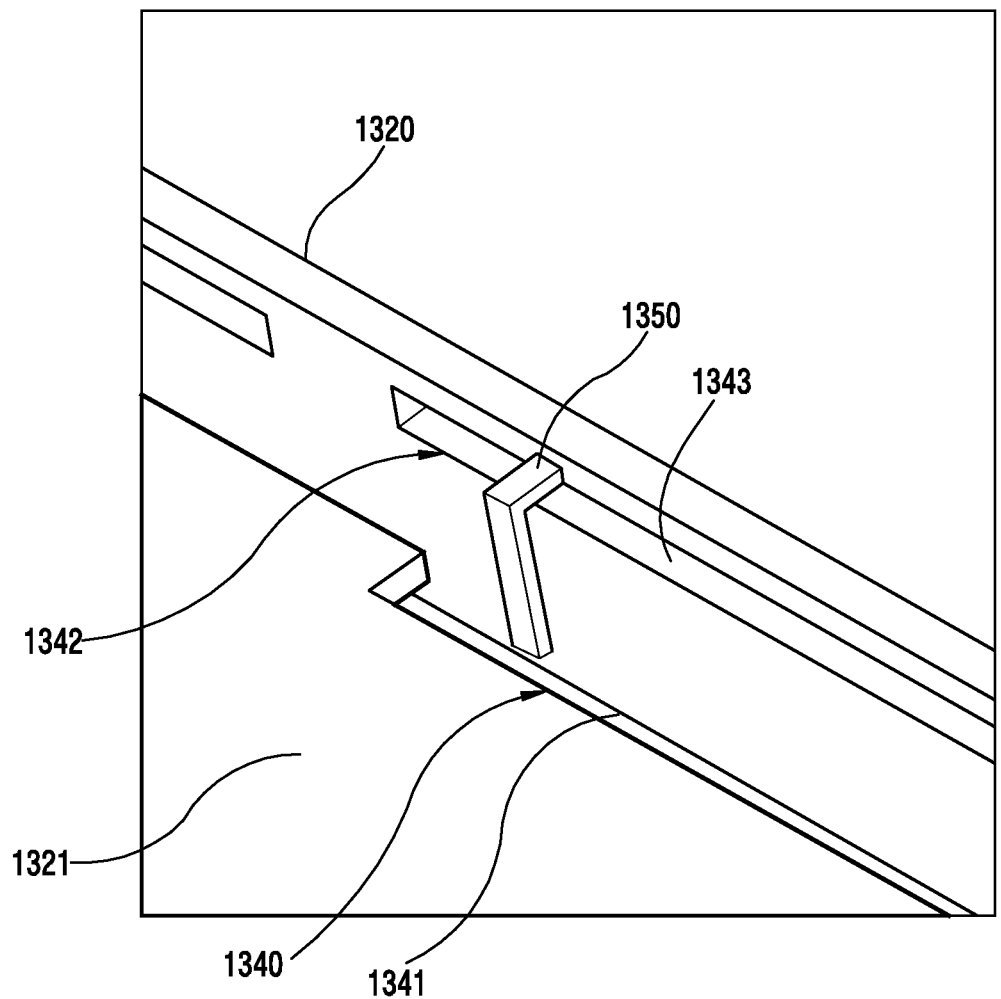
FIG. 13 is a perspective view illustrating a feeding portion of a multi-slot antenna according to an embodiment of the present disclosure.

FIG. 13 is a perspective view illustrating a feeding portion of a multi-slot antenna according to an embodiment of the present disclosure.

Referring to FIG. 13, first and second slot antennas 1340 and 1342 according to an embodiment of the present disclosure may have the same configuration as the first and second slot antennas 1140 and 1142 of FIG. 11A to FIG. 11D. A feeding flange 1350 having a protruding shape may be used to feed both a first slot 1341 disposed in a front direction and a second slot 1343 disposed in a lateral direction. Feeding may be achieved between a ground plane 1321 and an outer portion of the first slot, that is, an inner portion of the metal frame 1320, by the feeding flange.

Figure 14:
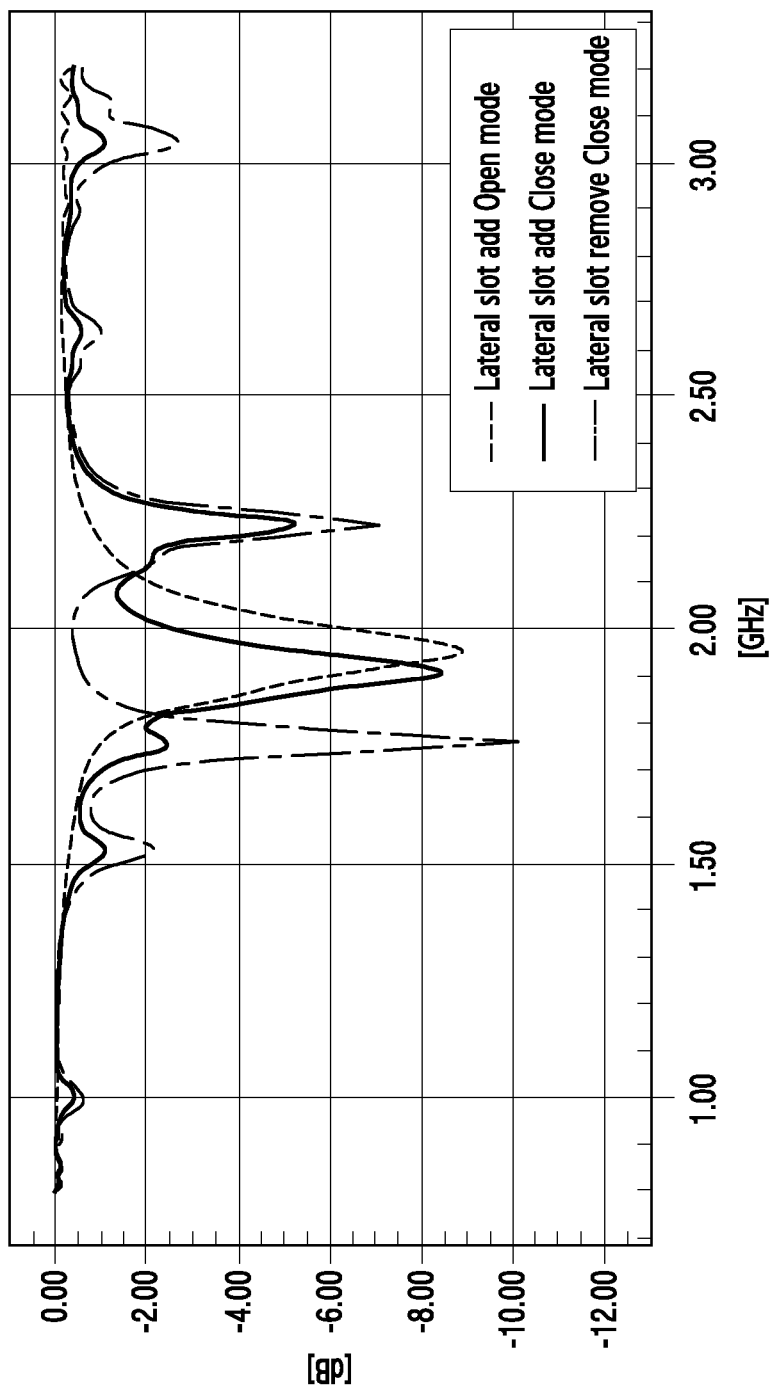
FIG. 14 is a graph illustrating a resonance characteristic for a case where an electronic device having a multi-slot antenna is in an open mode in comparison with a case of a closed mode and a case without a second slot antenna according to an embodiment of the present disclosure.

For example, the feeding flange 1350 may be extended from the first slot 1341 to the second slot 1343. The feeding flange 1350 may be electrically connected to a substrate. The feeding flange 1350 includes a conductive material, and may be formed of the same material as an exterior metal frame 1320. FIG. 14 is a graph illustrating a resonance characteristic for a case where an electronic device having a multi-slot antenna is in an open mode in comparison with a case of a closed mode and a case without a second slot antenna according to an embodiment of the present disclosure.

Referring to FIG. 14, it may be seen that a loss (10.00 dB) of a slot antenna without a lateral slot (a second slot) occurs at a band of approximately 1.75 GHz, a loss (8 dB) of a slot antenna with a lateral slot occurs at a band of approximately 1.9 GHz, and a loss (9 dB) of the slot antenna with the side lateral occurs at a band of approximately 2.0 GHz.

Figure 15:
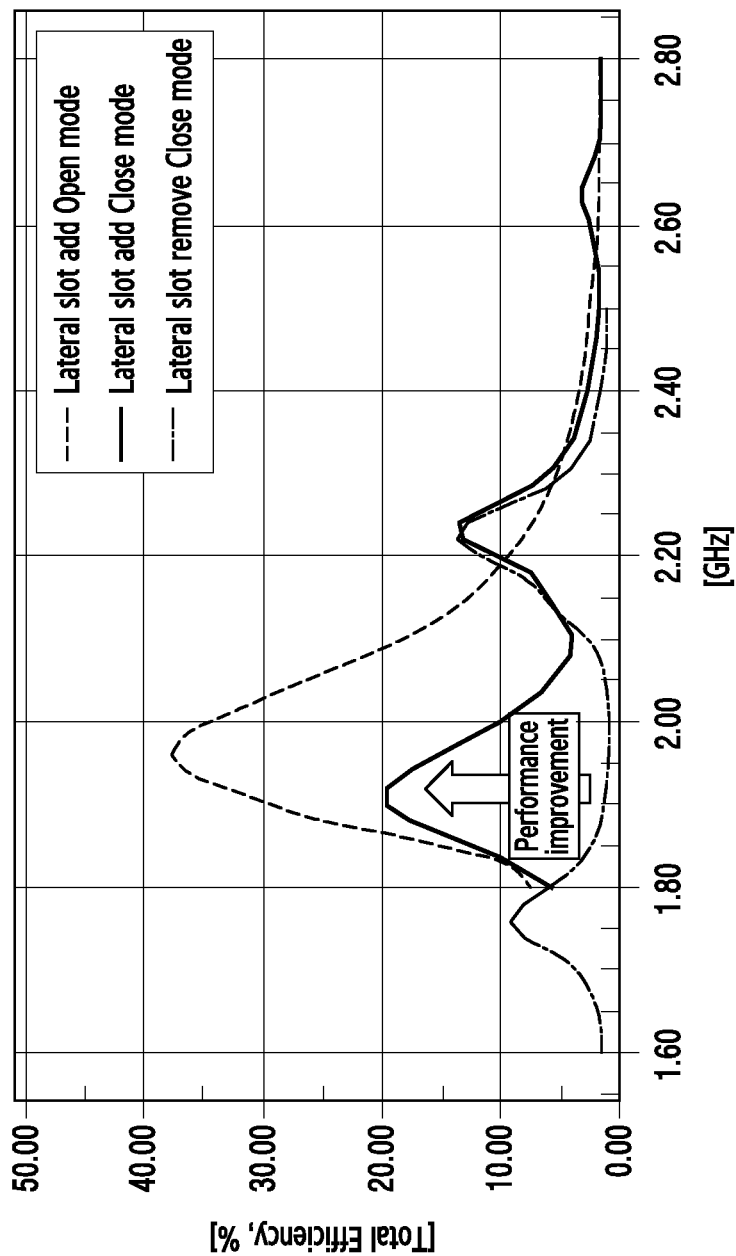
FIG. 15 is a graph illustrating an efficiency characteristic for a case where an electronic device having a multi-slot antenna is in an open mode in comparison with a case of a closed mode and a case without a second slot antenna according to an embodiment of the present disclosure.

FIG. 15 is a graph illustrating an efficiency characteristic for a case where an electronic device having a multi-slot antenna is in an open mode in comparison with a case of a closed mode and a case without a second slot antenna according to an embodiment of the present disclosure.

Referring to FIG. 15, an electronic device according to an embodiment of the present disclosure experiences antenna performance degradation in a closed mode in comparison with an open mode (as shown in FIG. 8A). However, in the case of an electronic device in the closed mode, it may be seen that performance of an antenna in which the second slot antenna is disposed is improved in comparison with performance of an antenna in which the second slot antenna is not disposed.

Figure 16:
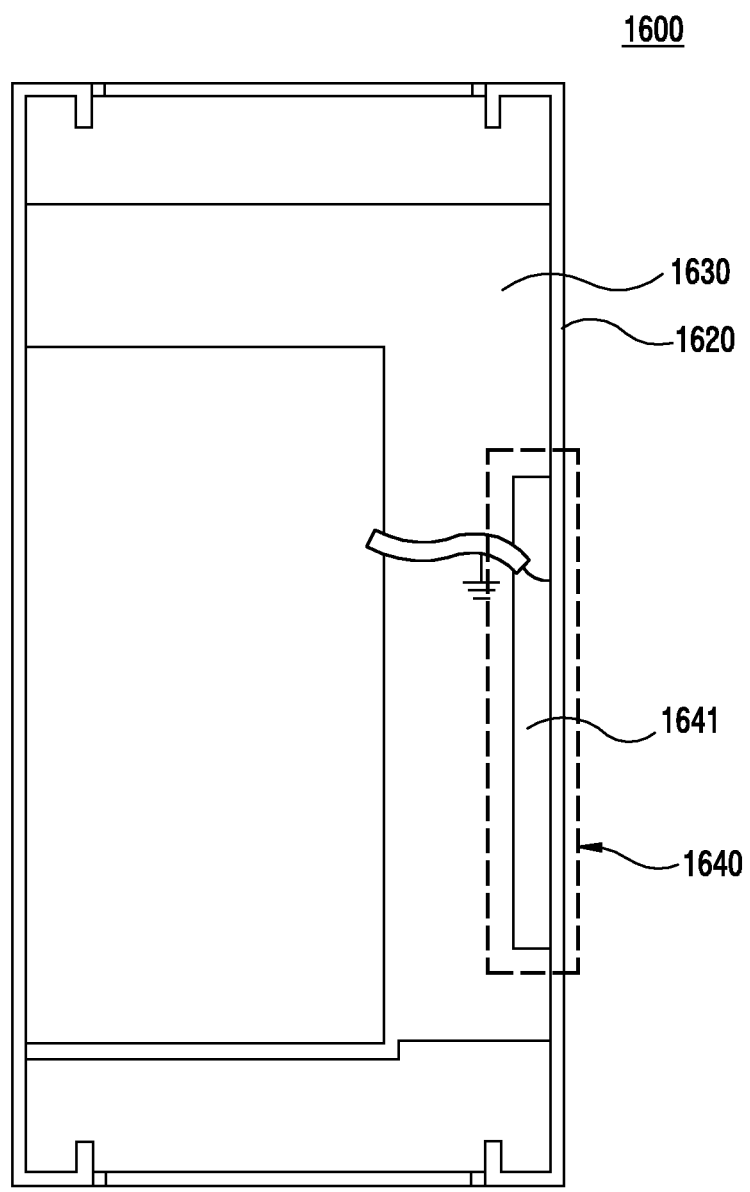
FIG. 16 illustrates a state where a slot antenna is disposed at a rear case according to an embodiment of the present disclosure.

A slot antenna without a lateral slot (a second slot) at the band of approximately 1.75 GHz has approximately 10.00% efficiency. A slot antenna with a lateral slot at the band of the approximately 1.9 GHz has approximately 20.00% efficiency in the closed mode. A slot antenna with a lateral slot at the band of approximately 2.0 GHz has approximately 39.00% efficiency in the open mode. FIG. 16 illustrates a state where a slot antenna is disposed at a rear case according to an embodiment of the present disclosure.

Referring to FIG. 16, an electronic device 1600 according to an embodiment of the present disclosure includes a third slot antenna 1640 disposed at a rear case 1630. The third slot antenna 1640 includes a third slot 1641 formed between a portion of the rear case 1630 which is formed of a metallic material and an exterior metal frame 1620, a feeding portion (as shown in FIG. 13) for supplying current to the exterior metal frame 1620, and a communication circuit (impedance matching circuit). The third slot 1641 may have a certain length and a thickness.

The third slot 1641 formed in the rear case 1630 according to an embodiment of the present disclosure may have a shape similar to a first slot. A length and width of the third slot 1641 of the rear case may be determined in consideration of a length and width of the first and second slots (the first and second slots of FIG. 11A to FIG. 11D) and in consideration of a frequency band of operation.

The third slot 1641 according to an embodiment of the present disclosure may be disposed to substantially face the first slot, and may be disposed at a position adjacent to the second slot.

Figures 17A, 17B, 17C:
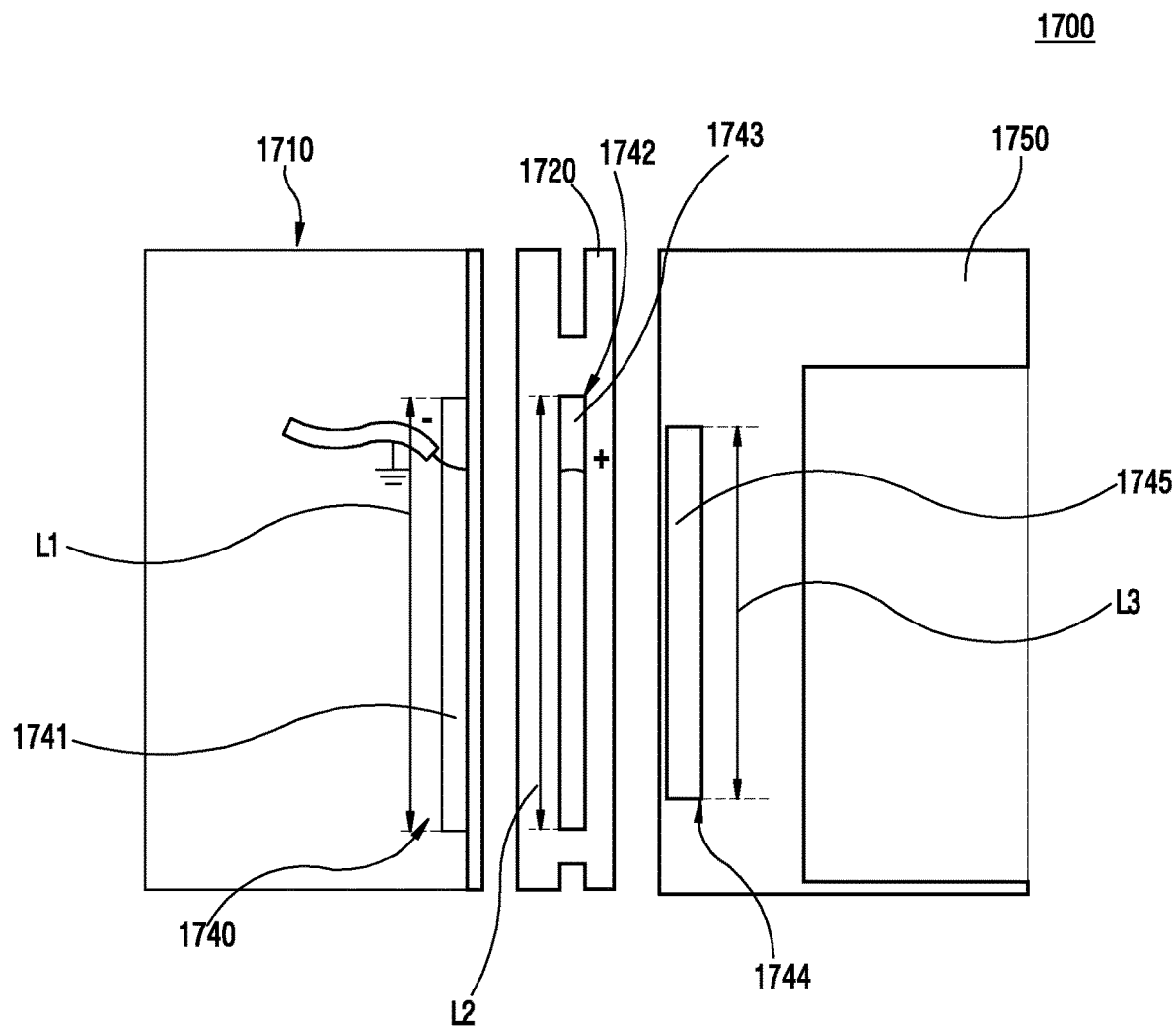
FIG. 17A illustrates a first slot antenna according to an embodiment of the present disclosure.
FIG. 17B illustrates a second slot antenna according to an embodiment of the present disclosure.
FIG. 17C illustrates a third slot antenna according to an embodiment of the present disclosure.

FIG. 17A illustrates a first slot antenna according to an embodiment of the present disclosure.

FIG. 17B illustrates a second slot antenna according to an embodiment of the present disclosure.

FIG. 17C illustrates a third slot antenna according to an embodiment of the present disclosure.

FIG. 17A illustrates a first slot antenna 1740, FIG. 17B illustrates a second slot antenna 1742, and FIG. 17C illustrates a third slot antenna 1744. The first and second slot antennas 1740 and 1742 may be the same as the first and second slot antennas 1140 and 1142 of FIG. 11A to FIG. 11D, and the third slot antenna 1744 may be the same as the third slot antenna 1640 of FIG. 16.

Referring to FIG. 17A to FIG. 17C, a slot antenna employed in an electronic device 1700 according to an embodiment of the present disclosure includes the first slot antenna 1740 formed between a ground plate 1710 (an inner support structure, e.g., an inner bracket) and an exterior metal frame 1720 and disposed in a front direction, the second slot antenna 1742 formed in the exterior metal frame 1720 and disposed to be open in a lateral direction, and the third slot antenna 1744 formed in a rear case 1750. The first slot antenna 1740 includes a first slot 1741, the second slot antenna 1742 includes a second slot 1743, and the third slot antenna 1744 includes a third slot 1745. The first slot 1741 may have a first length L1, the second slot 1743 may have a second length L2, and the third slot 1745 may have a third length L3. Each of the first, second, and third slot antennas 1740, 1742, and 1744 may be fed by a feeding portion to operate as an antenna device.

The first slot antenna 1740 according to an embodiment of the present disclosure may face the third slot antenna 1744, and may be positioned at an angle with respect to the second slot antenna 1742, for example, may direct in a vertical direction each other. Further, the first slot antenna 1740 may be disposed in proximity to the second slot antenna 1742, and the second slot antenna 1742 may be disposed in proximity to the third slot antenna 1744.

The third slot 1745 of the third slot antenna 1744 according to an embodiment of the present disclosure may be adjustable in length and may have a wider slot width than the first and second slots 1742 and 1743 resulting in excellent performance.

Figure 18:
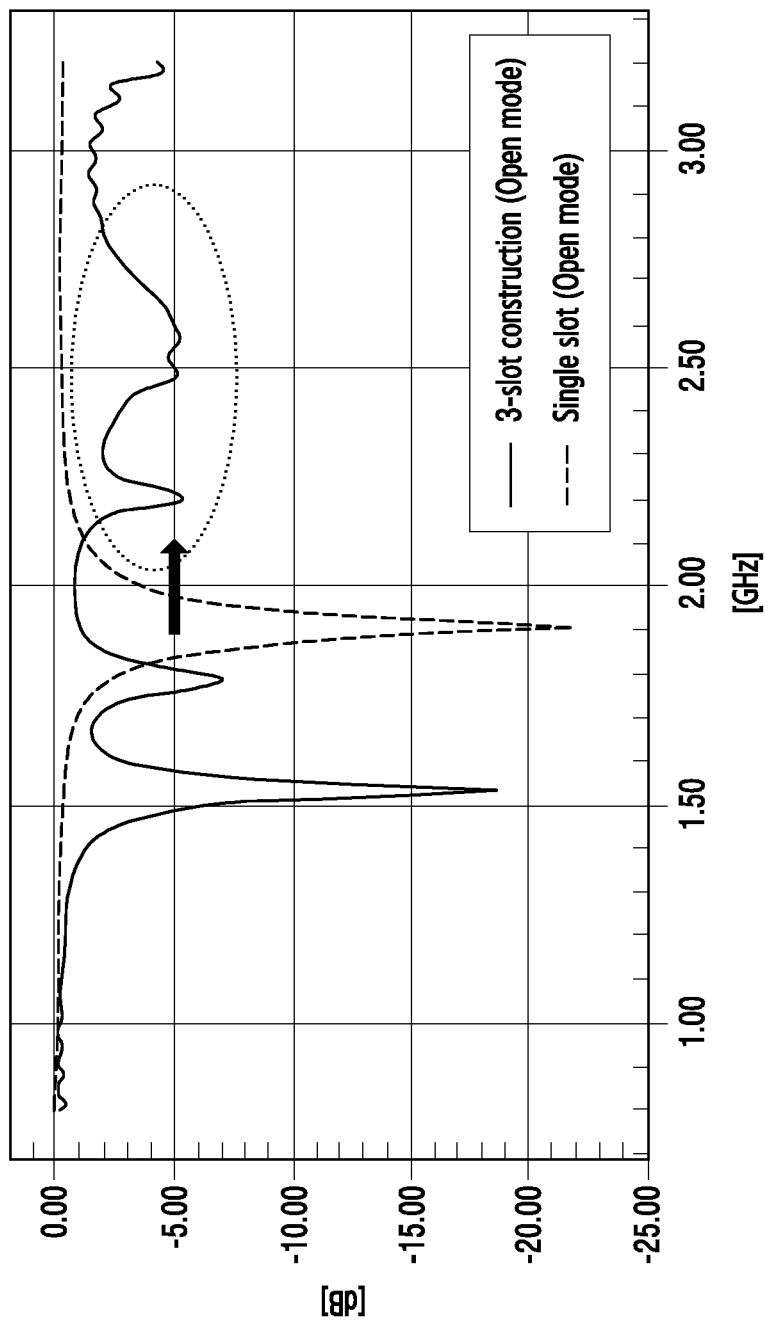
FIG. 18 is a graph illustrating a resonance characteristic for a case where an electronic device having three slot antennas is in an open mode in comparison with a case where an electronic device having a single slot antenna is in an open mode according to an embodiment of the present disclosure.

FIG. 18 is a graph illustrating a resonance characteristic for a case where an electronic device having three slot antennas is in an open mode in comparison with a case where an electronic device having a single slot antenna is in an open mode according to an embodiment of the present disclosure.

Figure 19:
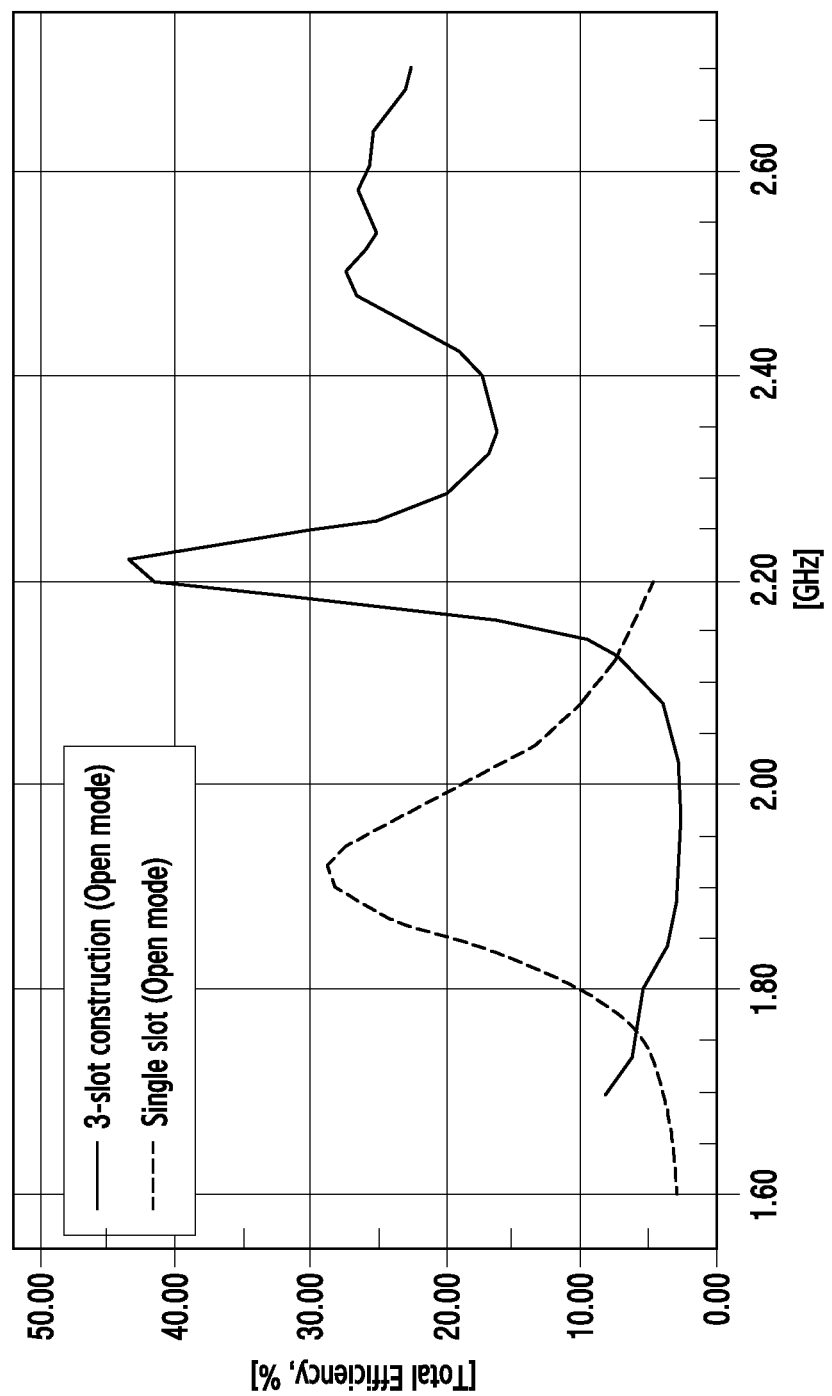
FIG. 19 is a graph illustrating an efficiency characteristic for a case where an electronic device having three slot antennas is in an open mode in comparison with a case where an electronic device having a single slot antenna is in an open mode according to an embodiment of the present disclosure.

FIG. 19 is a graph illustrating an efficiency characteristic for a case where an electronic device having three slot antennas is in an open mode in comparison with a case where an electronic device having a single slot antenna is in an open mode according to an embodiment of the present disclosure.

Referring to FIG. 17 to FIG. 19, an electronic device 1700 having first, second, and third slot antennas (a three-slot construction) according to an embodiment of the present disclosure provides a wider bandwidth at approximately 2 GHz to 3 GHz as shown in FIG. 18 and better performance in terms of radiation efficiency (approximately 40% radiation efficiency at approximately 2.2 GHz as shown in FIG. 19) in an open mode in comparison with the electronic device having the single slot antenna in an open mode.

Figure 20:
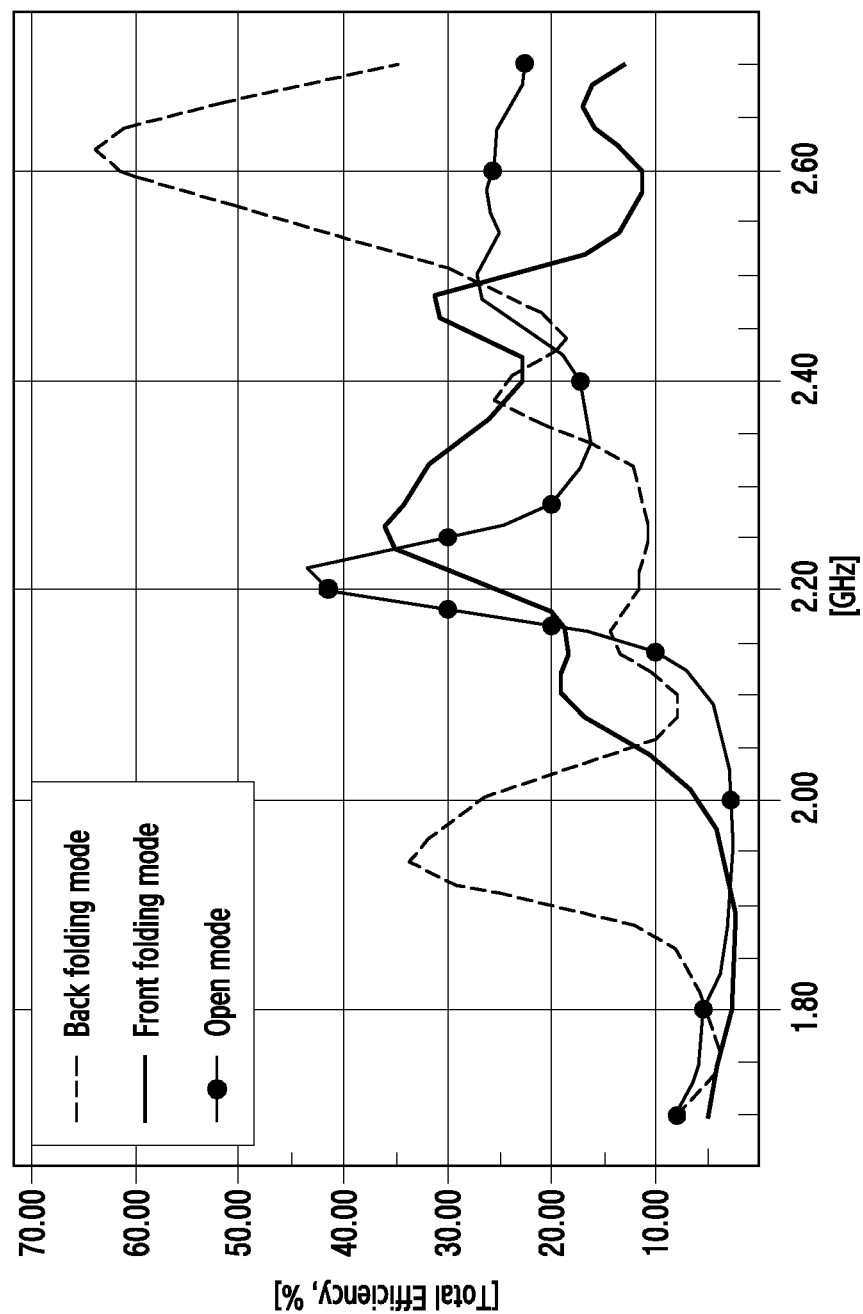
FIG. 20 is a graph illustrating an efficiency characteristic for a case where an electronic device having a triple slot antenna is in an open mode, a front folding mode, and a back folding mode according to an embodiment of the present disclosure.

FIG. 20 is a graph illustrating an efficiency characteristic for a case where an electronic device having a triple slot antenna is in an open mode, a front folding mode, and a back folding mode according to an embodiment of the present disclosure.

Referring to FIG. 20, in an electronic device in the closed mode, since second and third slot antennas primarily operate, there is no significant performance degradation in comparison with antenna performance in the open mode.

In an electronic device in the back folding mode, since the first and second slot antennas primarily operate, performance degradation occurs in comparison with antenna performance in the open mode. However, even if the degradation in antenna performance occurs in the electronic device in the back folding mode, it is improved in comparison with the performance of the electronic device having the single slot antenna as shown in FIG. 7.

Figure 21:
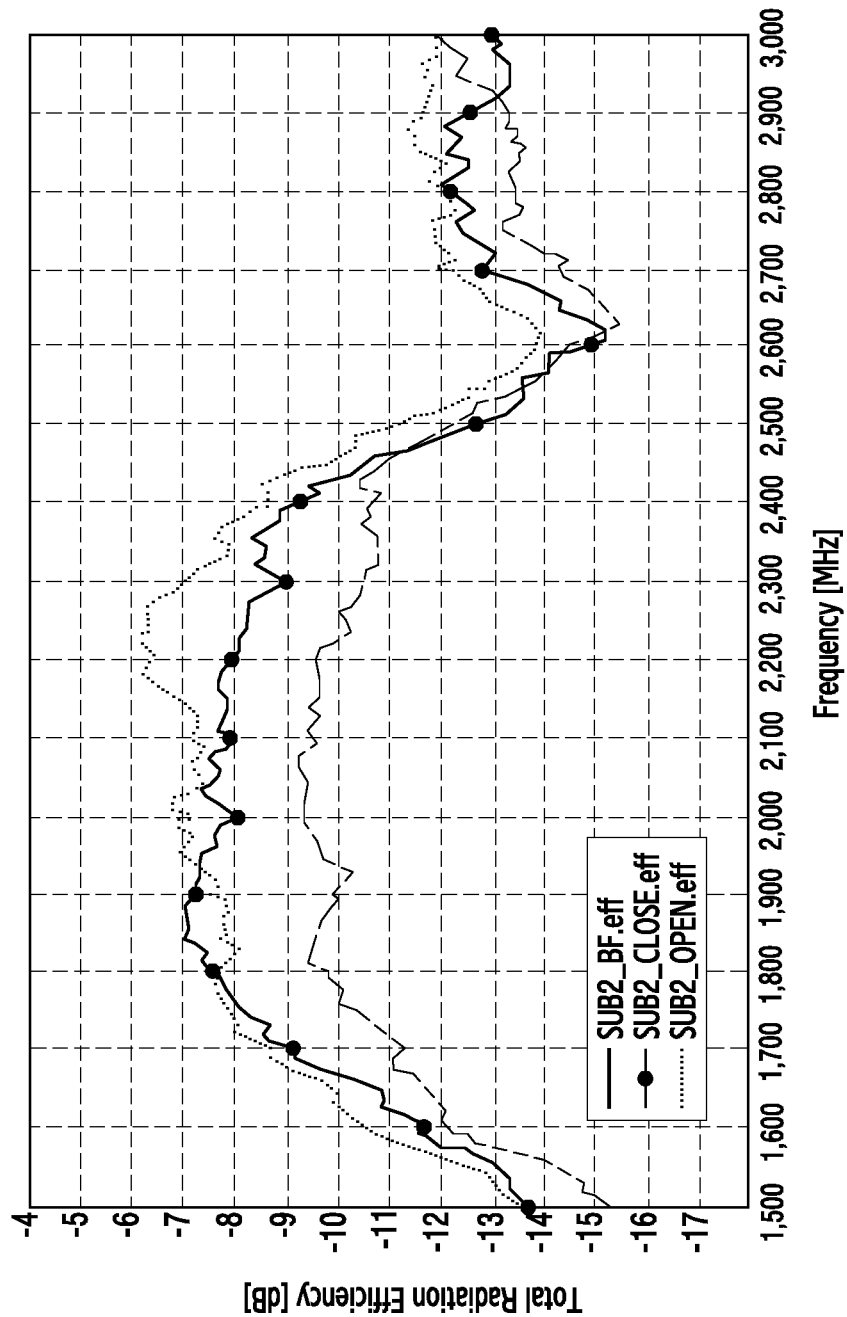
FIG. 21 is a graph illustrating an efficiency characteristic for a case where an electronic device having a triple slot antenna is in an open mode, a front folding mode, and a back folding mode according to an embodiment of the present disclosure.

FIG. 21 is a graph illustrating an efficiency characteristic for a case where an electronic device having a triple slot antenna is in an open mode, a front folding mode, and a back folding mode according to an embodiment of the present disclosure.

Referring to FIG. 21, an electronic device having first, second, and third slot antennas as shown in FIG. 17, may have efficiency characteristics corresponding to the curves in the open mode (curve labeled SUB2_OPEN.eff), the back folding mode (curve labeled SUB2_BF.Eff), and the front folding mode (curve labeled SUB2_CLOSE.eff). The back folding mode and the front folding mode may both be considered a closed mode.

Figure 22:
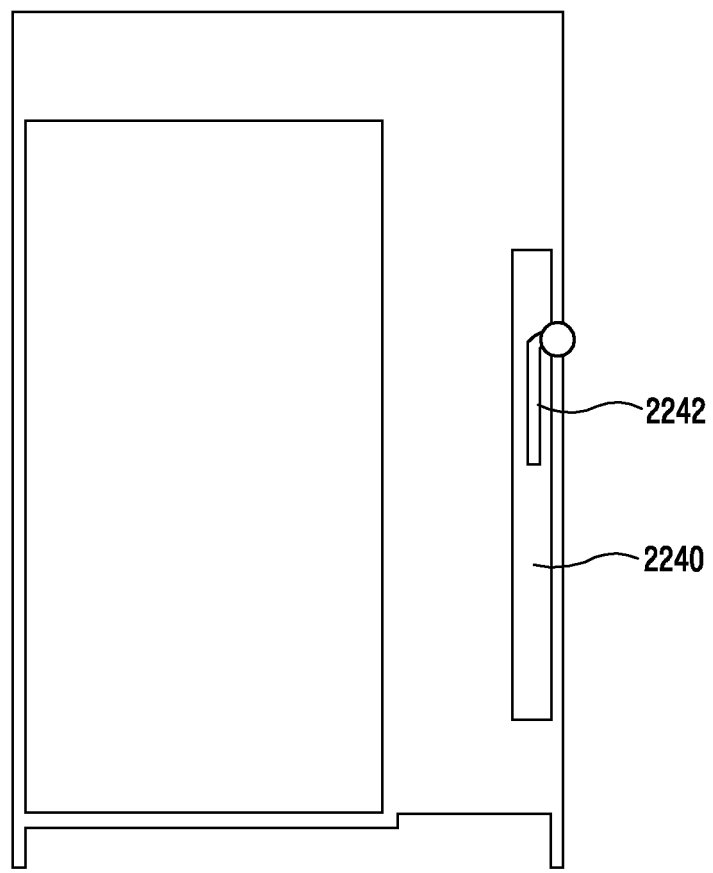
FIG. 22 illustrates a slot antenna having an additional pattern according to an embodiment of the present disclosure.

The electronic device having the first, second, and third slot as shown in FIG. 17, has a similar antenna radiation efficiency in the front folding mode in comparison with the open mode. Referring to the curves of FIG. 21, it may be seen that performance is degraded by about 2 to 3 dB in the back folding mode in comparison with the open mode. FIG. 22 illustrates a slot antenna having an additional pattern according to an embodiment of the present disclosure.

Referring to FIG. 22, an electronic devices 2200 according to an embodiment of the present disclosure may enhance antenna resonance by using a plurality of slots, but may further enhance antenna resonance by forming an additional pattern 2242 in a slot 2240. For example, the additional pattern 2242 may be utilized to adjust a bandwidth of the slot antenna. The additional pattern 2242 may operate as an auxiliary radiator.

Figure 23:
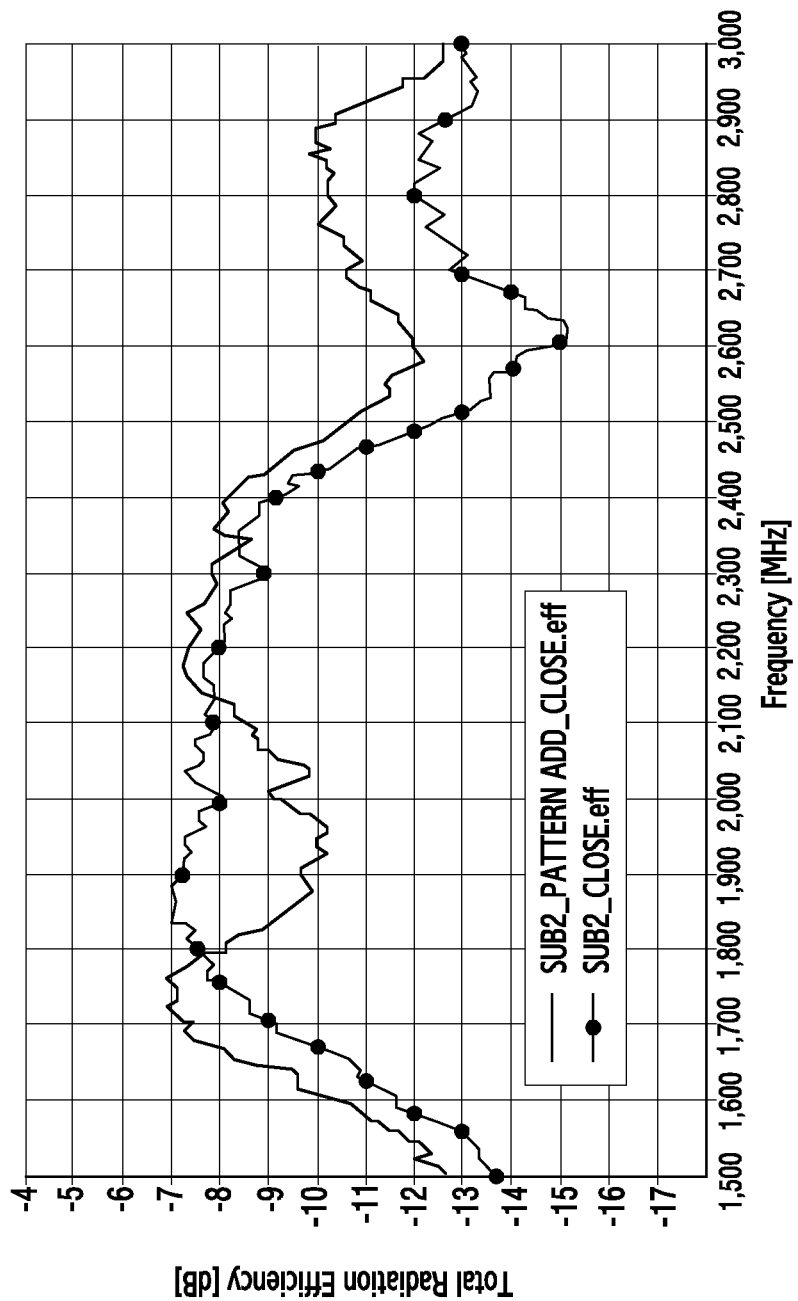
FIG. 23 is a graph illustrating a resonance characteristic for a case where an electronic device having three slot antennas is in a closed mode in comparison with a case where an electronic device having a slot antenna in which an additional pattern is formed in a first slot is in a closed mode according to an embodiment of the present disclosure.

FIG. 23 is a graph illustrating a resonance characteristic for a case where an electronic device having three slot antennas is in a closed mode in comparison with a case where an electronic device having a slot antenna in which an additional pattern is formed in a first slot is in a closed mode according to an embodiment of the present disclosure.

Figure 24:
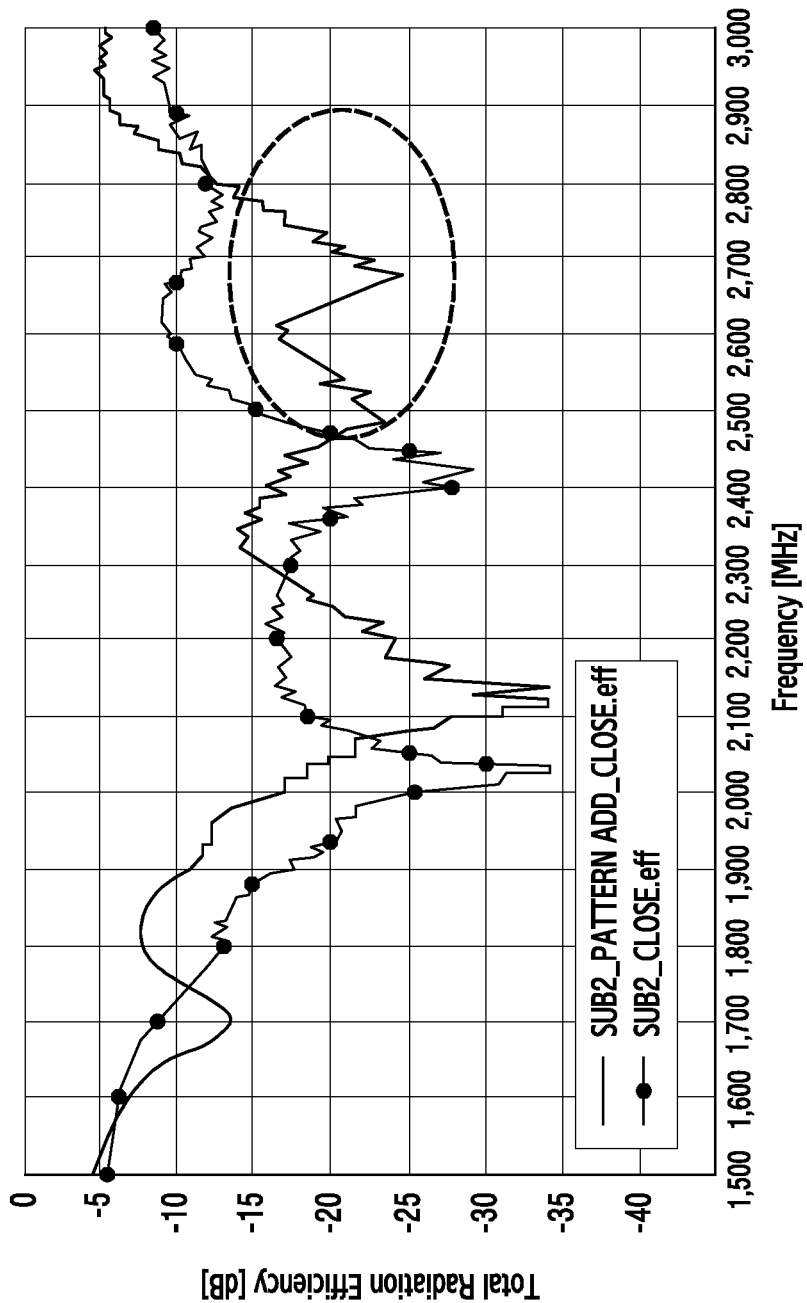
FIG. 24 is a graph illustrating an efficiency characteristic for a case where an electronic device having three slot antennas is in a closed mode in comparison with a case where an electronic device having a slot antenna in which an additional pattern is formed in a first slot is in a closed mode according to an embodiment of the present disclosure.

FIG. 24 is a graph illustrating an efficiency characteristic for a case where an electronic device having three slot antennas is in a closed mode in comparison with a case where an electronic device having a slot antenna in which an additional pattern is formed in a first slot is in a closed mode according to an embodiment of the present disclosure.

Referring to FIG. 23 and FIG. 24, it may be seen that a parasitic resonance occurs at a 2.6 GHz band in a closed mode (curve labeled SUB2_CLOSE.eff), and thus performance drops sharply in the vicinity of the 2.6 GHz band in the electronic device according to an embodiment of the present disclosure. However, if a slot antenna is configured by forming an additional pattern in the slot, the performance degradation of the slot antenna may be mitigated as shown in the curve labeled SUB2_PATTERN ADD_CLOSE.eff.

Figure 25A:
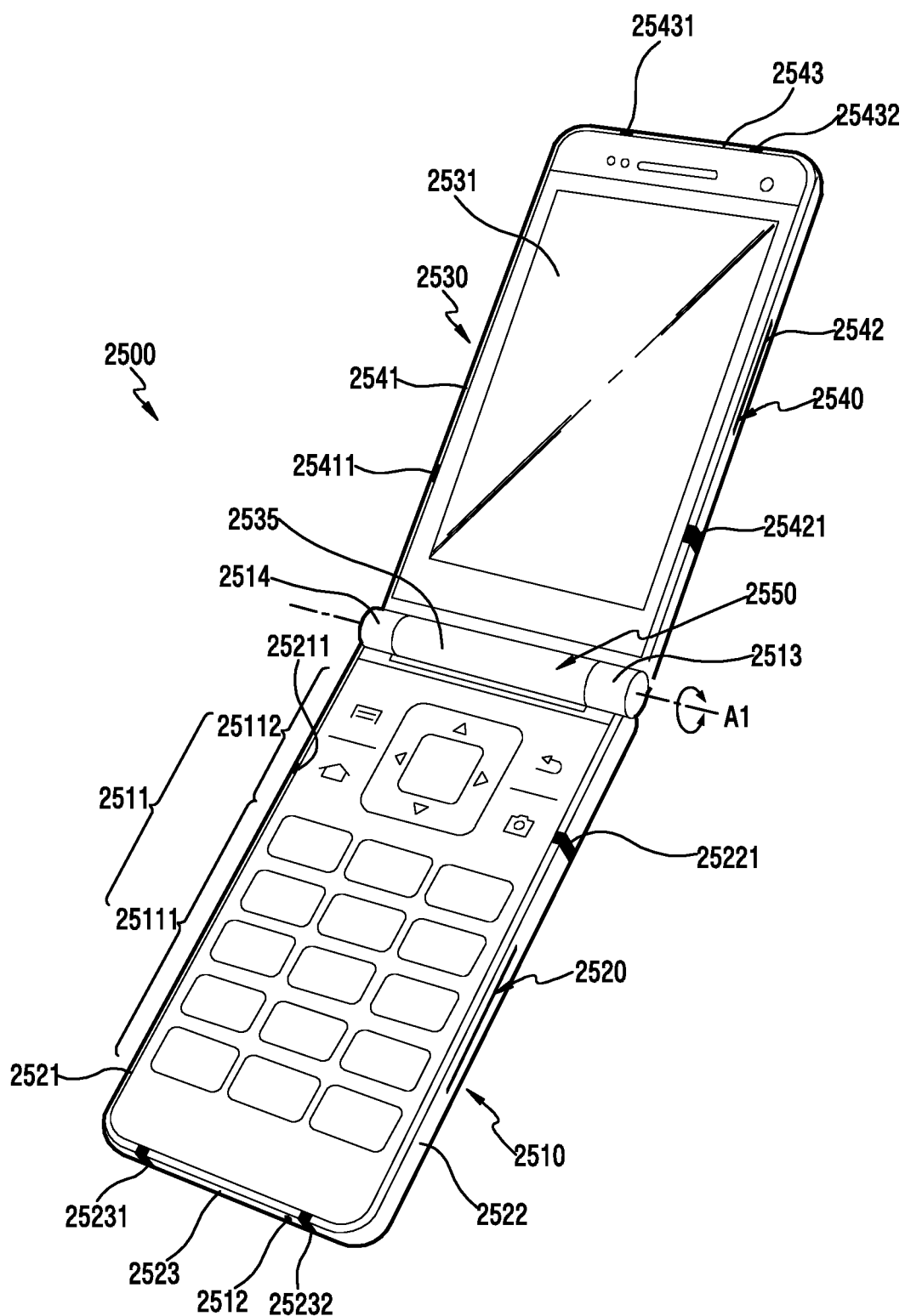
FIG. 25A is a perspective view illustrating a folding-type electronic device having a multi-slot antenna in an unfolded state where first and second electronic devices overlap according to an embodiment of the present disclosure.

FIG. 25A is a perspective view illustrating a folding-type electronic device having a multi-slot antenna in an unfolded state where first and second electronic devices overlap according to an embodiment of the present disclosure.

Figure 25B:
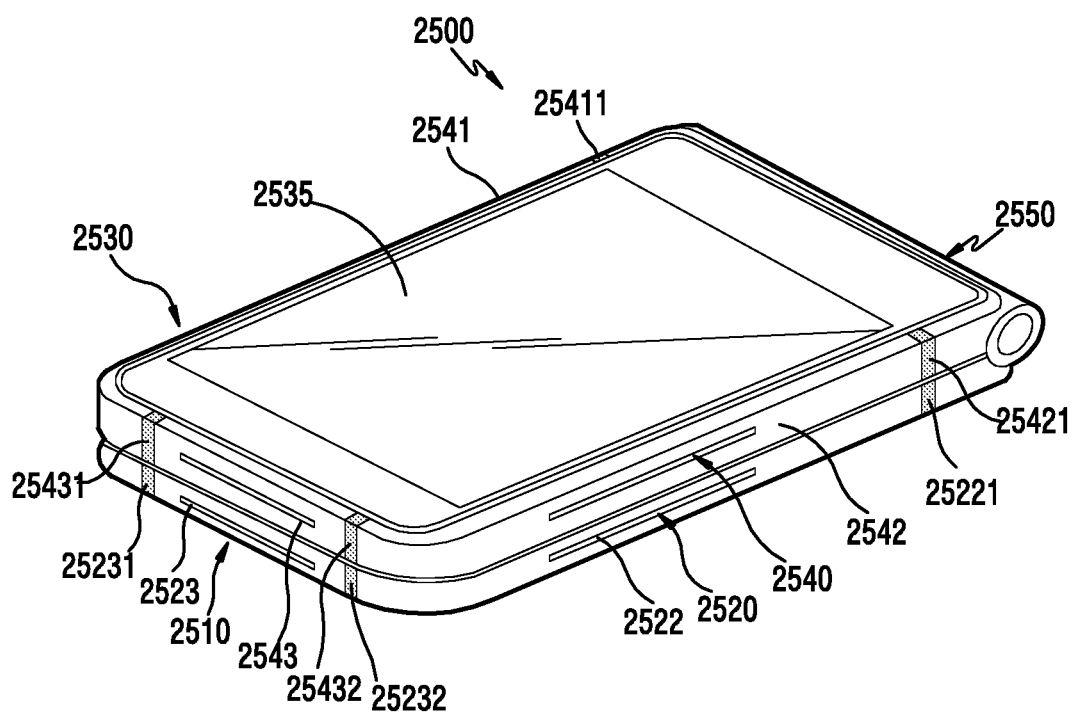
FIG. 25B is a perspective view illustrating a folding-type electronic device having a multi-slot antenna in a folded state according to an embodiment of the present disclosure.

FIG. 25B is a perspective view illustrating a folding-type electronic device having a multi-slot antenna in a folded state according to an embodiment of the present disclosure.

Referring to FIG. 25A and FIG. 25B, an electronic device 2500 according to an embodiment of the present disclosure is a folding-type electronic device, and includes a first electronic device 2510 and a second electronic device 2530 which is foldable in a rotatable manner about a connection device 2550 (e.g., a hinge device) in the first electronic device 2510.

The first electronic device 2510 according to an embodiment of the present disclosure may be the same electronic device as the electronic device 1100 of FIG. 11A to FIG. 11D, the electronic device 1600 of FIG. 16, and the electronic device 1700 of FIG. 17. The second electronic device 2530 may be the same electronic device as the electronic device 1100 of FIG. 11A to FIG. 11D, the electronic device 1600 of FIG. 16, and the electronic device 1700 of FIG. 17.

The second electronic device 2530 is foldable by rotating about an axis A1 as a rotation axis by means of the connection device 2550, and when it is folded, the first electronic device 2510 and the second electronic device 2530 may overlap with each other.

A front side of the first electronic device 2510 includes a key input unit 2511 including a plurality of key buttons 25111 (e.g., key buttons for numeric, character, and/or symbolic input) and a navigation key button 25112. A microphone device 2512 may be disposed below the first electronic device 2510.

The first electronic device 2510 includes a first housing 2520. At least a portion of the first housing 2520 includes conductive members 2521, 2522, and 2523. The conductive members 2521, 2522, and 2523 may have a shape extended along a boundary of the first electronic device 2510. The conductive members 2521, 2522, and 2523 may be extended to at least a region on a front and/or rear side of the electronic device.

The conductive members 2521, 2522, and 2523 include the first, second, and third conductive members 2521, 2522, and 2523 disposed at left, right, and lower sides of the first electronic device 2510 respectively. The conductive members 2521, 2522, and 2523 may be segmented by non-conductive members 25211, 25221, 25231, and 25232 which are filled in a gap formed in at least one region. The first conductive member 2521 may be divided by the first non-conductive member 25211. The second conductive member 2522 may be divided by the second non-conductive member 25221. The third conductive member 2523 may be divided by the third and fourth non-conductive members 25231 and 25232.

According to an embodiment of the present disclosure, the first electronic device 2510 may include at least one antenna device. The antenna device may include the corresponding conductive member 2521, 2522, and 2523 electrically connected to an RF communication module in the vicinity of the non-conductive members 25211, 25221, 25231, and 25232 to operate as an antenna radiator. In this case, an operating frequency band of the antenna device may be determined by considering an electrical length from the non-conductive members 25211, 25221, 25231, and 25232 to a feeding point of the RF communication module of each of the corresponding conductive member 2521, 2522, and 2523. The antenna device may be disposed around each of the plurality of non-conductive members 25211, 25221, 25231, and 25232. However, the present disclosure is not limited thereto, and thus the antenna device may also be disposed separately inside the electronic device. The antenna device may include an antenna radiator disposed in a patterned manner on a substrate included in the electronic device, or may include an antenna radiator mounted on an antenna carrier.

According to an embodiment of the present disclosure, a first display 2531 may be disposed at a front side of the second electronic device 2530, and a speaker device 2532 may be disposed at an upper side of the first display 2531. Components for performing various functions of the electronic device 2500 may be disposed at a surrounding area where the speaker device 2532 is installed. The components include at least one sensor module 2533. The sensor module 2533 may include at least one of an illumination sensor (e.g., a light sensor), a proximity sensor (e.g., a light sensor), an infrared sensor, and an ultrasonic sensor. The components include a camera device 2534. The components may include an LED indicator for informing the user of status information of the electronic device 2500. A second display 2535 may be disposed at a rear side of the second electronic device 2530. The second display 2535 may be allowed to manipulate the electronic device 2500 even in a state where the second electronic device 2530 of the electronic device 2500 overlaps with the first electronic device 2510. The first and second displays 2531 and 2535 may be a touch screen device including a touch sensor.

According to an embodiment of the present disclosure, the second electronic device 2530 includes a second housing 2540. At least a portion of the second housing 2540 includes conductive members 2541, 2542, and 2543. The conductive members 2541, 2542, and 2543 may be extended along a boundary of the second electronic device 2530. The conductive members 2541, 2542, and 2543 may be extended to at least a portion of the front side and/or rear side of the electronic device 2500.

The conductive members 2541, 2542, and 2543 according to an embodiment of the present disclosure may be disposed at left, right, and lower sides of the second electronic device 2530. The conductive members 2541, 2542, and 2543 may be segmented by non-conductive members 25411, 25421, 25431, and 25432 which are filled in a gap formed in at least one region. The first conductive member 2541 may be divided by the first non-conductive member 25411. The second conductive member 2542 may be divided by the second non-conductive member 25421. The third conductive member 2543 may be divided by the third and fourth non-conductive members 25431 and 25432, respectively.

According to an embodiment of the present disclosure, when the first electronic device 2510 and the second electronic device 2530 overlap, the first non-conductive member 25211 of the first housing 2520 may be disposed at a position facing the first non-conductive member 25411 of the second housing 2540. The second non-conductive member 25221 of the first housing 2520 may be disposed at a position facing the second non-conductive member 25421 of the second housing 2540. The third non-conductive member 25231 of the first housing 2520 may be disposed at a position facing the third non-conductive member 25431 of the second housing 2540. The fourth non-conductive member 25232 of the first housing 2520 may be disposed at a position facing the fourth non-conductive member 25432 of the second housing 2540. According to an embodiment of the present disclosure, a slot having a length is provided in proximity to a region of the conductive members 2541, 2542, and 2543 of the second housing 2540 corresponding to a region in which the antenna device of the first housing 2520 is disposed. The slot includes non-conductive members 25411, 25421, 25431, and 25432. The non-conductive members 25411, 25421, 25431, and 25432 included in the slot may serve as an opening through which the slot is exposed in an outward direction of the electronic device. Therefore, when the first electronic device 2510 and the second electronic device 2530 overlap, the antenna device may radiate through the corresponding slot.

According to an embodiment of the present disclosure, the connecting device 2550 includes a hinge device. The hinge device includes a pair of side hinge arms 2513 and 2514 spaced apart from an upper end of the first electronic device 2510 and a center hinge arm 2535 of the second electronic device 2530, which is disposed at a center of the side hinge arms 1513 and 1513 in a rotatable manner. A hinge module coupled to the side hinge arms 2513 and 2514 may be disposed at the center hinge arm 2535 to adjust a rotation angle of the second electronic device 2530 or to create a rotational force around axis A1.

Non-conductive members disposed at each electronic device may be greater or lesser in number, and may be located at various locations in the electronic device.

The first electronic device 2510 according to an embodiment of the present disclosure includes the slot antennas 1140 and 1142 of FIG. 11A to FIG. 11D. For example, the slot antenna 1140 and 1142 of FIG. 11A to FIG. 11D may be disposed at the first conductive member of the first electronic device 2510, disposed at the second conductive member, or disposed at the third conductive member. As another example, the slot antennas 1140 and 1142 of FIG. 11A to FIG. 11D may be disposed at the first and second conductive members of the first electronic device, disposed at the second and third conductive members, or disposed at the first and third conductive members. As another example, the slot antennas 1140 and 1142 of FIG. 11A to FIG. 11D may be disposed at all of the first, second, and third conductive members of the first electronic device. The second electronic device 2530 according to an embodiment of the present disclosure includes the slot antennas 1140 and 1142 of FIG. 11A to FIG. 11D. For example, the slot antennas 1140 and 1142 of FIG. 11A to FIG. 11D may be disposed at the first conductive member of the second electronic device, disposed at the second conductive member, or disposed at the third conductive member. As another example, the slot antennas 1140 and 1142 of FIG. 11A to FIG. 11D may be disposed at the first and second conductive members of the second electronic device, disposed at the second and third conductive members, or disposed at the first and third conductive members. As another example, the slot antennas 1140 and 1142 of FIG. 11A to FIG. 11D may be disposed at all of the first, second, and third conductive members of the second electronic device.

In a state where the first and second electronic devices overlap (as shown in FIG. 25B), at least one slot antenna provided in the first electronic device may be disposed to face each of at least one slot antenna provided in the second electronic device, or may be disposed in an overlapping manner.

The first conductive member of the first electronic device according to an embodiment of the present disclosure may include a first slot, the second conductive member may include a second slot, and the third conductive member may include a third slot. As another example, it may be configured such that only one conductive member includes a slot among the first to third conductive members of the first electronic device. A non-conductive material may be filled in each of the first to third slots of the first electronic device.

The first conductive member of the second electronic device according to an embodiment of the present disclosure may include a first slot, the second conductive member may include a second slot, and the third conductive member may include a third slot. As another example, it may be configured such that only one conductive member includes a slot among the first to third conductive members of the second electronic device. A non-conductive material may be filled in each of the first to third slots of the second electronic device.

Figure 26A:
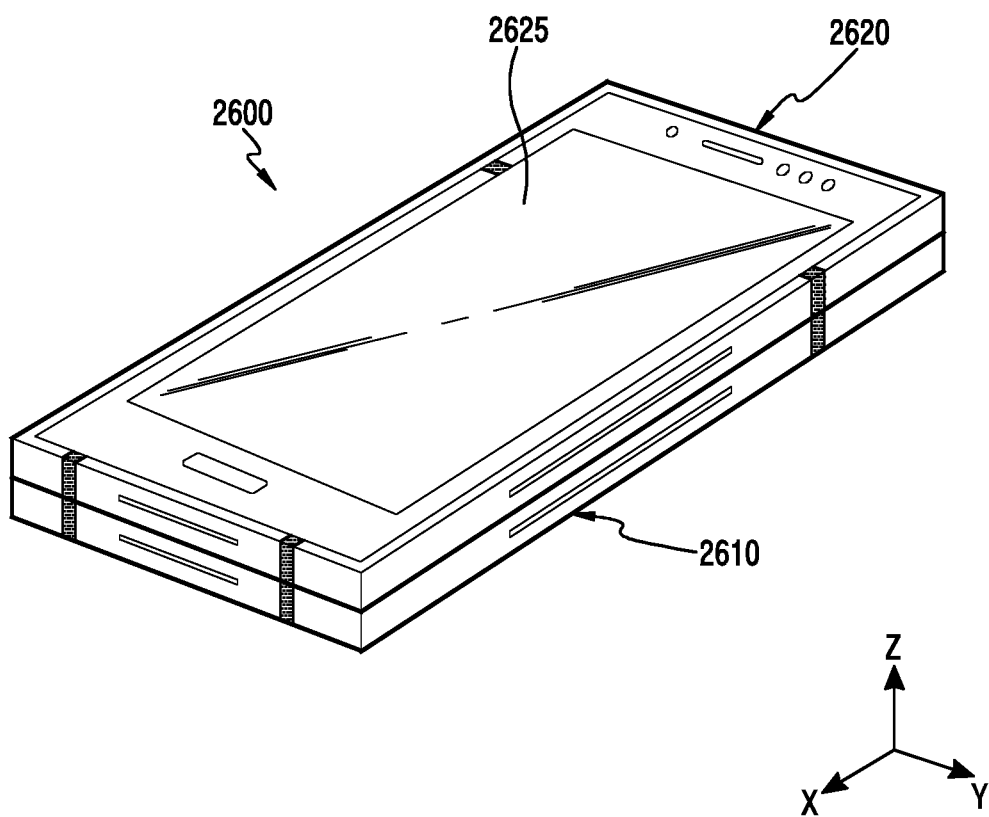
FIG. 26A is a perspective view illustrating a sliding-type electronic device having a multi-slot antenna in an unfolded state where first and second electronic devices overlap according to an embodiment of the present disclosure.

The electronic device according to an embodiment of the present disclosure may improve antenna performance even in an overlapping state of the first and second electronic devices since the first and second electronic devices have respective slot antennas. FIG. 26A is a perspective view illustrating a sliding-type electronic device having a multi-slot antenna in an unfolded state where first and second electronic devices overlap according to an embodiment of the present disclosure.

Figure 26B:
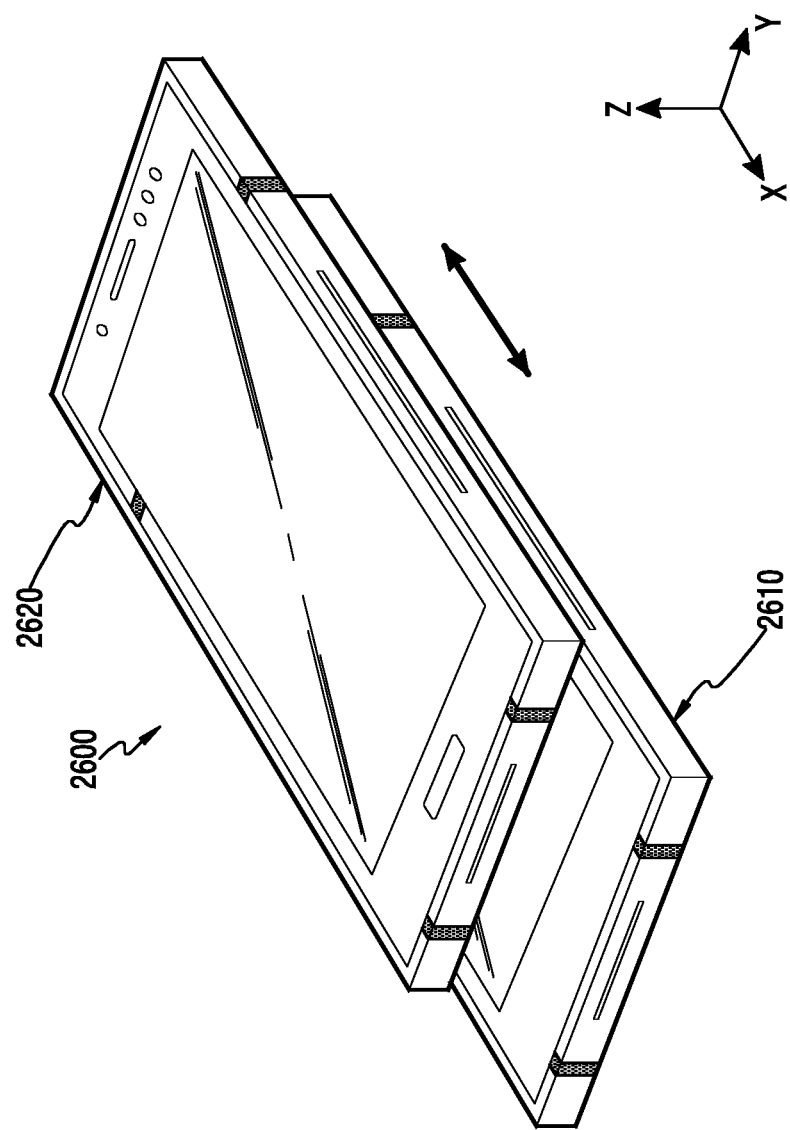
FIG. 26B is a perspective view illustrating a sliding-type electronic device having a multi-slot antenna where a second electronic device is slid in a vertical direction with respect to a first electronic device according to an embodiment of the present disclosure.

FIG. 26B is a perspective view illustrating a sliding-type electronic device having a multi-slot antenna where a second electronic device is slid in a vertical direction with respect to a first electronic device according to an embodiment of the present disclosure.

Figure 26C:
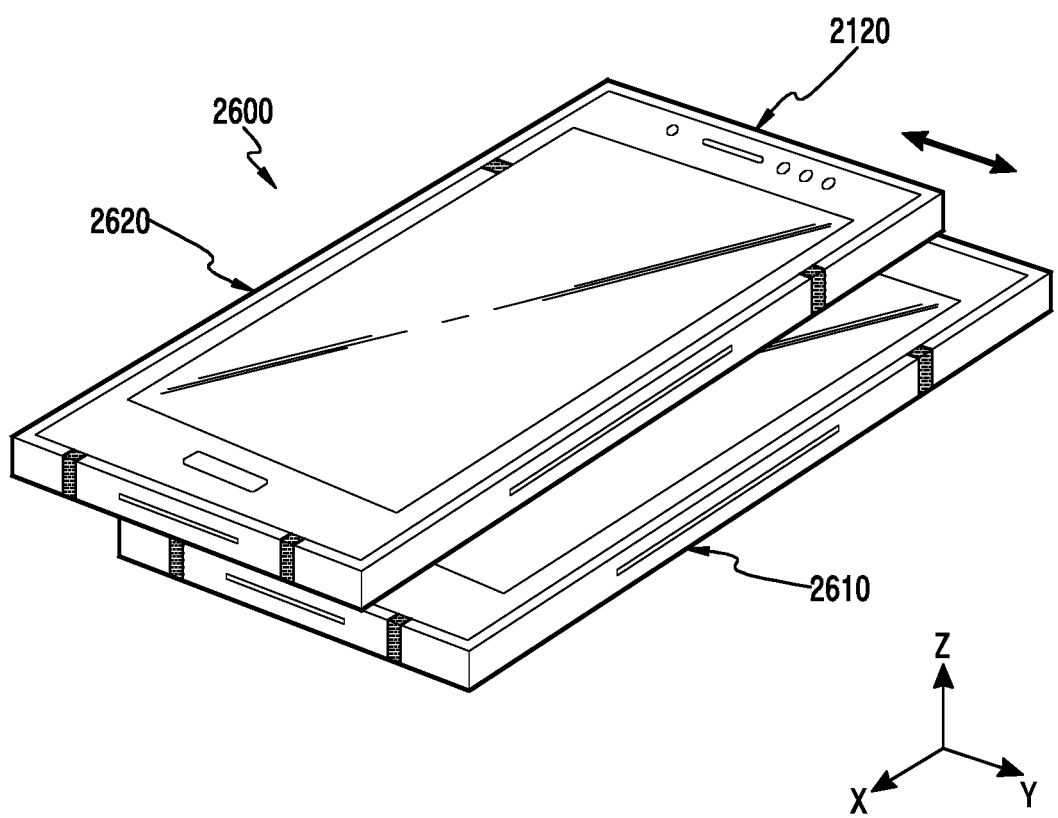
FIG. 26C is a perspective view illustrating a sliding-type electronic device having a multi-slot antenna where a second electronic device is slid in a horizontal direction with respect to a first electronic device according to an embodiment of the present disclosure.

FIG. 26C is a perspective view illustrating a sliding-type electronic device having a multi-slot antenna where a second electronic device is slid in a horizontal direction with respect to a first electronic device according to an embodiment of the present disclosure.

Referring to FIG. 26A to FIG. 26C, an electronic device 2600 according to an embodiment of the present disclosure may have the same configuration as electronic device 2500 of FIG. 25A and FIG. 25B except that first and second electronic devices 2610 and 2620 are configured in a sliding type rather than a rotating type. A sliding module physically connects the first and second electronic devices 2610 and. The second electronic device 2620 may slide in a state of facing in a vertical direction to the first electronic device 2610 as shown in FIG. 26B, or may slide in a state of facing in a horizontal direction as shown in FIG. 26C. Depending on the sliding of the second electronic device 2620, at least a portion of a front side of the first electronic device 2610 may be open or closed.

The first electronic device 2610 according to an embodiment of the present disclosure may have the same configuration as the first electronic device 2510 of FIG. 25A and FIG. 25B. The second electronic device 2620 may have the same configuration as the second electronic device 2530 of FIG. 25A and FIG. 25B.

Figure 27A:
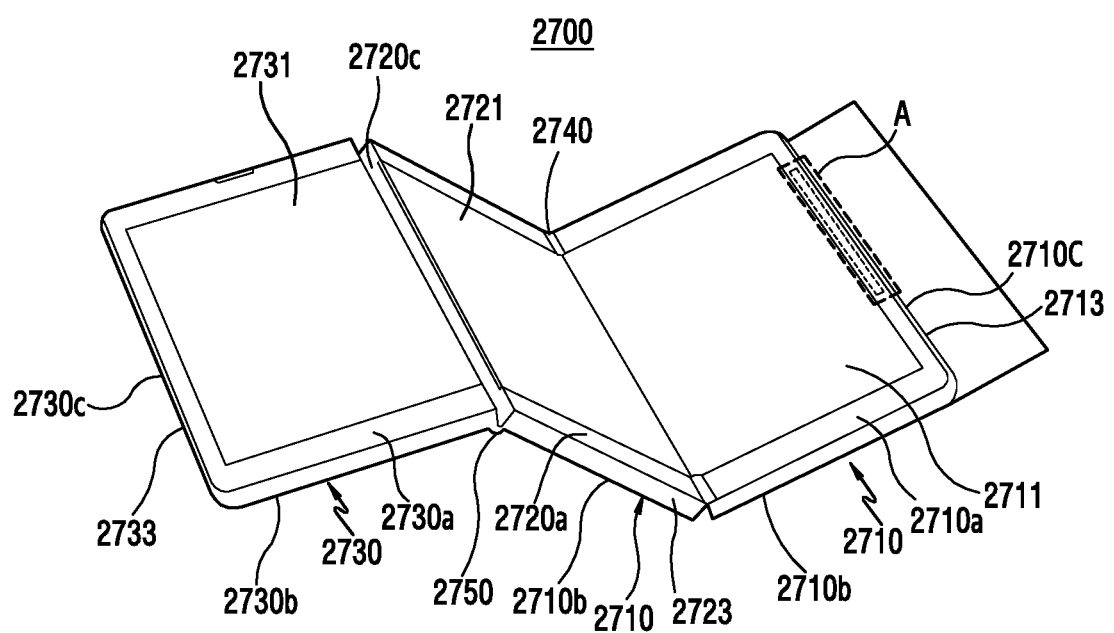
FIG. 27A is a perspective view illustrating a triple folding-type electronic device according to an embodiment of the present disclosure.

FIG. 27A is a perspective view illustrating a triple folding-type electronic device according to an embodiment of the present disclosure.

Figure 27B:
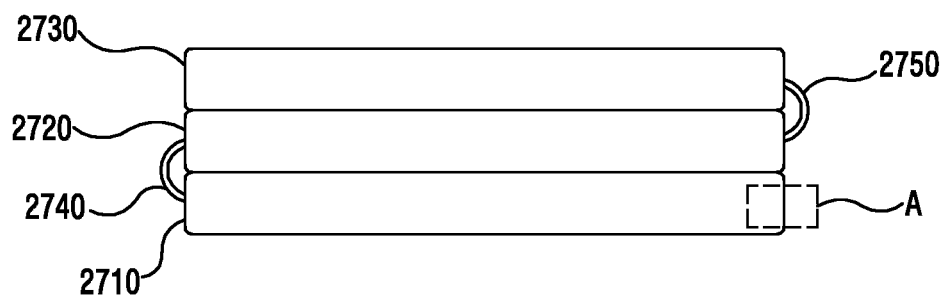
FIG. 27B is a lateral view illustrating a triple folding-type electronic device in a closed mode according to an embodiment of the present disclosure.

FIG. 27B is a lateral view illustrating a triple folding-type electronic device in a closed mode according to an embodiment of the present disclosure.

Figure 27C:
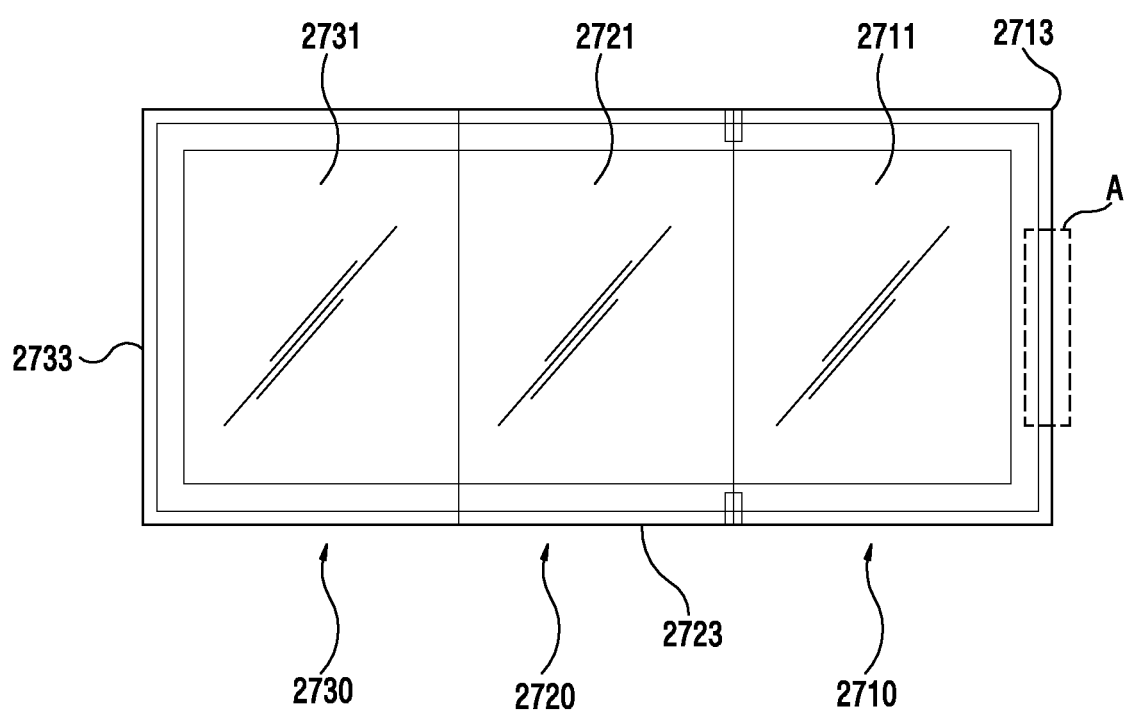
FIG. 27C is a front view illustrating a triple folding-type electronic device in an open mode according to an embodiment of the present disclosure.

FIG. 27C is a front view illustrating a triple folding-type electronic device in an open mode according to an embodiment of the present disclosure. Referring to FIG. 27A to FIG. 27C, an electronic device 2700 according to an embodiment of the present disclosure is a triple folding-type electronic device, and includes a first housing 2710, a second housing 2720, a third housing 2730, and first and second connecting members 2740 and 2750. The first connecting member 2740 may physically and/or electrically connect the first and second housings 2710 and 2720, and the second connecting member 2750 may physically and/or electrically connect the second and third housings 2720 and 2730. For example, each of the first and second connecting members 2740 and 2750 may be a flexible material or a hinge device.

The first to third housings 2710, 2720, and 2730 include first to third exterior metal frames 2713, 2723, and 2733, respectively. The first to third exterior metal frames 2713, 2723, and 2733 may be disposed at an outer boundary of the first to third housings 2710, 2720, and 2730, respectively, so as to be a portion of an external appearance of the electronic device 2700, and may operate as a portion of an antenna radiator.

The first housing 2710 includes a first side 2710a facing in a first direction, a second side 2710b facing in a second direction opposite to the first direction, and a first lateral side 2710c located between the first and second directions and facing in a direction perpendicular to the first and second directions. The second housing 2720 includes a third side 2720a facing in a third direction, a fourth side 2720b facing in a fourth direction opposite to the third direction, and a second lateral side 2720c located between the first and second directions and facing in a direction perpendicular to the third and fourth directions. The third housing 2730 includes a fifth side 2730a facing in a fifth direction, a sixth side 2730b facing in a sixth direction opposite to the fifth direction, and a third lateral side 2730c located between the fifth and sixth direction and facing in a direction perpendicular to the fifth and sixth directions.

Each of the first to third housings 2710, 2720, and 2730 may have first to third displays 2711, 2721, and 2731 disposed at the respective first sides 2710a, 2720a, and 2730a. In an electronic device which is fully unfolded as shown in FIG. 27C, the first to third displays 2711, 2721, and 2731 may provide a single display screen.

The electronic device 2700 may include a multi-slot antenna in a first portion A of the first exterior metal frame 2713. The multi-slot antenna mounted on the first portion A may have the same configuration as the slot antenna of FIG. 11A to FIG. 11D. The electronic device 2700 having such a multi-slot antenna may prevent performance degradation of the antenna in a closed state as shown in FIG. 27B.

The multi-slot antenna disposed at the electronic device 2700 according to an embodiment of the present disclosure is not necessarily limited to being disposed at the first portion A. For example, the multi-slot antenna may be disposed at the first exterior metal frame 2713 which is not the first portion of the first housing 2710, disposed at the second exterior metal frame 2723 of the second housing 2720, or disposed at the third exterior metal frame 2733 of the third housing 2730. Further, the multi-slot antenna may be disposed at each of the first and second exterior metal frames 2713 and 2723, disposed at each of the second and third exterior metal frames 2723 and 2733, or disposed at each of the first and third exterior metal frames 2713 and 2733. Furthermore, the multi-slot antenna may be disposed at all of the first, second, and third exterior metal frames 2713, 2723, and 2733.

When the respective multi-slot antennas disposed at the first to third exterior metal frames 2713, 2723, and 2733 are disposed in an overlapping manner, antenna performance of the electronic device may be improved.

Figure 28A:
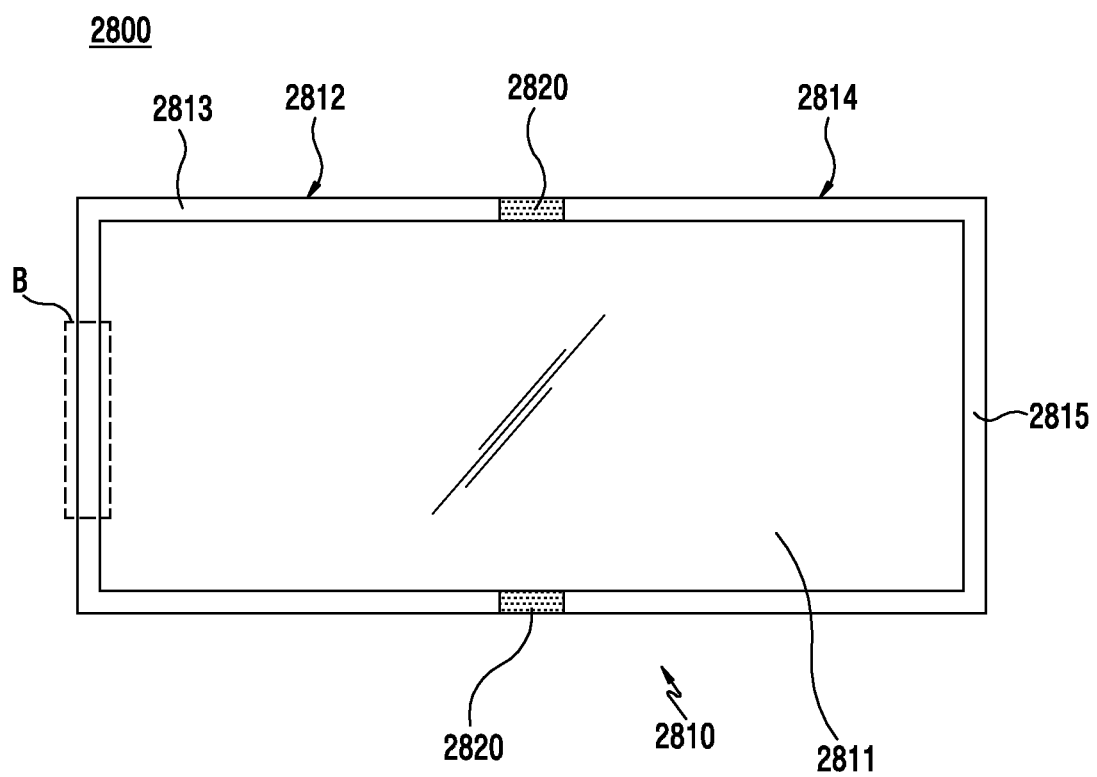
FIG. 28A is a front view illustrating a flexible electronic device in an open mode according to an embodiment of the present disclosure.

FIG. 28A is a front view illustrating a flexible electronic device in an open mode according to an embodiment of the present disclosure.

Figure 28B:
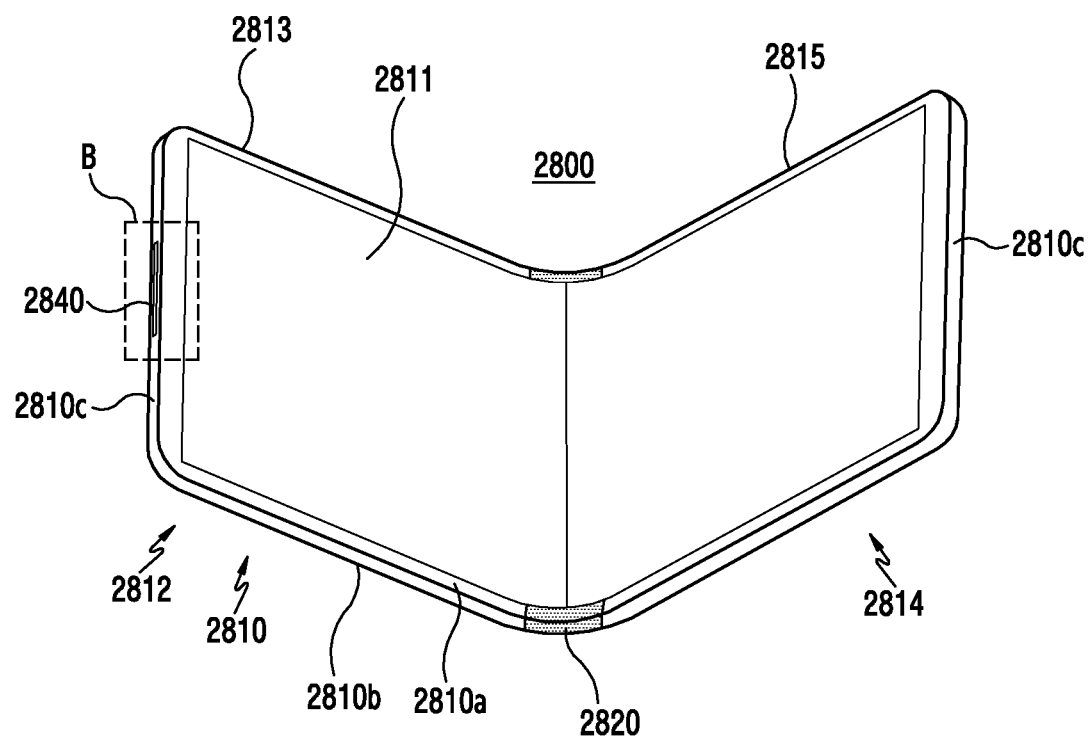
FIG. 28B is a perspective view illustrating a flexible electronic device in a folded mode according to an embodiment of the present disclosure.

FIG. 28B is a perspective view illustrating a flexible electronic device in a folding mode according to an embodiment of the present disclosure.

Figure 28C:
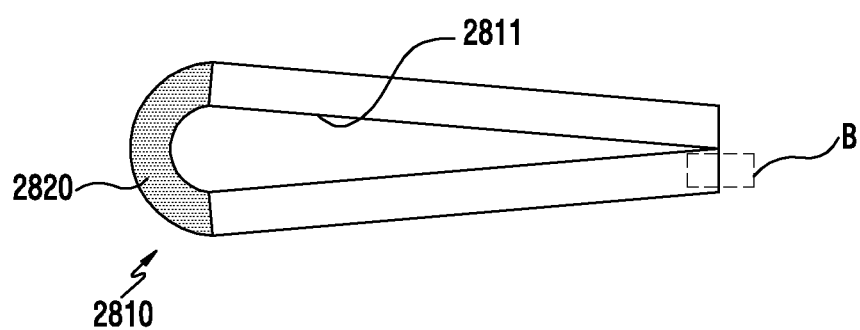
FIG. 28C is a lateral view illustrating a flexible electronic device in a closed mode according to an embodiment of the present disclosure.

FIG. 28C is a lateral view illustrating a flexible electronic device in a closed mode according to an embodiment of the present disclosure.

Referring to FIG. 28A to FIG. 28C, a flexible electronic device 2800 according to an embodiment of the present disclosure is a folding-type flexible electronic device, and includes a housing 2810, a folding device 2820, and a flexible display 2811. The housing 2810 is folded by the folding device 2820, and thus may be divided into first and second housing portions 2812 and 2814. The folding device 2820 may be a flexible material.

The first and second housing portions 2812 and 2814 according to an embodiment of the present disclosure include first and second exterior metal frames 2813 and 2815, respectively. The first and second exterior metal frames 2813 and 2815 may be disposed at an outer boundary of the first and second housing portions 2812 and 2814, respectively, so as to be a portion of an exterior appearance of the electronic device 2800, and may operate as a portion of an antenna.

The housing 2810 according to an embodiment of the present disclosure includes a first side 2810a facing in a first direction, a second side 2810b facing in a second direction opposite to the first direction, and a first lateral side 2810c located between the first and second directions and facing in a direction perpendicular to the first and second directions.

The housing 2810 includes a flexible display 2811 disposed at the first side 2810a. In the electronic device 2800 which is fully unfolded as shown in FIG. 28A, the flexible display 2811 may provide a large screen of a single display.

The electronic device 2800 includes a multi-slot antenna in a first portion B of the first exterior metal frame 2812. The multi-slot antenna mounted on the first portion B may have the same configuration as the slot antenna of FIG. 11A to FIG. 11D. The electronic device 2800 having such a multi-slot antenna may prevent performance degradation of the antenna in a state of being folded as shown in FIG. 28B. Reference numeral 2840 denotes a slot disposed at the first exterior metal frame.

According to an embodiment of the present disclosure, an electronic device includes a first housing including a first side facing in a first direction, a second side facing in a second direction opposite to the first direction, and a first lateral side surrounded by at least a portion of a space between the first and second sides, a second housing including a third side facing in a third direction and a fourth side facing in a fourth direction opposite to the third direction, a first display located in the first housing and exposed through the first side, a connecting member for coupling the first and second housings to fold the first and second housings together, and for allowing the first and third sides or the second and fourth sides to face each other when the first and second housings are folded together, a first conductive member forming at least a portion of the first lateral side and including a slot facing in a fifth direction substantially perpendicular to the first or second direction, an intermediate plate located inside the first housing and including a portion adjacent to a slot of the first conductive member, wherein the portion comprises or forms an opening facing in the first or second direction, and a wireless communication circuit electrically coupled to a portion of the first conductive member.

According to an embodiment of the present disclosure, the slot of the first conductive member has a first elongated shape, and the opening has a second elongated shape parallel to the slot. According to an embodiment of the present disclosure, the slot of the first conductive member and the opening have the same length.

According to an embodiment of the present disclosure, the slot of the first conductive member may be disposed at a region adjacent to the connecting member.

According to an embodiment of the present disclosure, an electronic device may include a housing including a first side and a second side opposite to the first side, a rear case coupled to face the second side, a first display exposed at the first side, a ground plane disposed parallel to the first display, a first conductive housing structure disposed to surround at least a portion of a lateral boundary of the housing, a first slot formed in the first conductive housing structure to operate as an antenna, a second slot formed between the first conductive housing structure and the ground plane to operate as an antenna, a third slot disposed at the rear case to face the second slot to operate as an antenna, a feeding portion formed in the first conductive housing structure to feed each of the first slot, the second slot, and the third slot, and an impedance matching circuit connected to the feeding portion.

According to an embodiment of the present disclosure, the electronic device may further include a second display coupled to the first display. The first display and the second display overlap by being folded.

According to an embodiment of the present disclosure, an electronic device may include a first display disposed to face in a first direction, a second display disposed to face in a second direction, a ground plane disposed parallel to the first display, a first conductive housing structure surrounding at least a portion of the first display, a first slot formed in a first side of at least a portion of the first conductive housing structure, a second slot formed in a second side having a specific angle with respect to the first side on which the first slot is formed, a feeding portion for feeding each of the first slot and the second slot, and an impedance matching circuit connected to the feeding portion. The first display and the second display may be connected to each other, and may be disposed to overlap with each other.

According to an embodiment of the present disclosure, the first conductive housing structure may be an exterior metal frame, and may operate as a slot antenna by forming the first slot in a lateral side exposed to the outside.

According to an embodiment of the present disclosure, the second slot may be formed between the first conductive housing structure and the ground plane.

According to an embodiment of the present disclosure, an electronic device may include a first housing including a first side facing in a first direction, a second side facing in a second direction opposite to the first direction, and a first lateral side surrounded by at least a portion of a space between the first and second sides and facing in a third direction perpendicular to each of the first and second directions, a metal frame disposed to surround at least a portion of the first lateral side, and at least one slot antenna formed in at least a portion of the metal frame facing the first lateral side, and facing the third direction.

According to an embodiment of the present disclosure, the metal frame may be an exterior metal frame exposed to the outside and surrounding at least a portion of a boundary of the electronic device.

According to an embodiment of the present disclosure, the slot antenna may have a first length extended along the metal frame and a first thickness.

According to an embodiment of the present disclosure, at least a portion of the metal frame may be configured at a position spaced apart from the slot antenna to operate as an antenna radiator. According to an embodiment of the present disclosure, an electronic device may include a housing including a first side facing in a first direction, a second side facing in a second direction opposite to the first direction, a first lateral side surrounded by at least a portion of a space between the first and second sides and facing in a third direction perpendicular to each of the first and second side, and a substrate disposed between the first and second sides and having a ground plane disposed to face each of the first and second side, a rear case coupled to a second side of the housing, a metal frame disposed to surround at least a portion of the first side of the housing, a first slot antenna disposed between the substrate and the metal frame and having a first length and a first thickness, and a second slot disposed adjacent to the first slot antenna, formed in at least a region of the external metal frame facing the first side, facing the third direction, and having a second length and a second thickness.

According to an embodiment of the present disclosure, the first and second lengths may be approximately the same.

According to an embodiment of the present disclosure, the second slot antenna may be utilized as a hole through which a connecting member connected to another housing passes.

According to an embodiment of the present disclosure, the first and second slot antennas are fed by a feeding flange. According to an embodiment of the present disclosure, a third slot having a third length and a third thickness may be disposed at the rear case, and a third slot antenna may be disposed to substantially face the first slot antenna and may be disposed adjacent to the second slot antenna.

According to an embodiment of the present disclosure, at least a portion of the metal frame may be configured at a position spaced apart from the second slot antenna to operate as an antenna radiator.

According to an embodiment of the present disclosure, the second slot antenna may be filled with an insulating material. The term "module," as used herein may represent, for example, a unit including a combination of one or two or more of hardware, software, or firmware. The term "module" may be, for example, used interchangeably with the terms "unit", "logic", "logical block", "component", or "circuit" etc. The "module" may be the minimum unit of an integrally constructed component or a part thereof. The "module" may be also the minimum unit performing one or more functions or a part thereof. The "module" may be implemented mechanically or electronically. For example, the "module" may include at least one of an application-specific integrated circuit (ASIC) chip, field-programmable gate arrays (FPGAs) and a programmable-logic device performing some operations known in the art or to be developed in the future.

At least a part of an apparatus (e.g., modules or functions thereof) or method (e.g., operations) according to an embodiment of the present disclosure may be, for example, implemented as instructions stored in a computer-readable storage medium in a form of a programming module. In this case the instruction is executed by a processor, and the processor may perform functions corresponding to the instructions. The computer-readable storage media may be the memory 130, for instance.

The computer-readable recording medium may include a hard disk, a floppy disk, and a magnetic medium (e.g., a magnetic tape), an optical medium (e.g., a compact disc read only memory (CD-ROM) and a digital versatile disc (DVD)), a magneto-optical medium (e.g., a floptical disk), and a hardware device (e.g., a read only memory (ROM), a random access memory (RAM), a flash memory, etc.). Also, the program instruction may include not only a mechanical language code such as a code made by a compiler but also a high-level language code executable by a computer using an interpreter, etc. The aforementioned hardware device may be constructed to operate as one or more software modules in order to perform operations of the present disclosure, and vice versa.

The module or programming module according to an embodiment of the present disclosure may include at least one or more of the aforementioned constituent elements, or omit some of the aforementioned constituent elements, or further include additional other constituent elements. Operations carried out by the module, the programming module or the other constituent elements may be executed in a sequential, parallel, repeated or heuristic method. Also, some operations may be executed in a different order or may be omitted, or other operations may be added.

While the present disclosure has been shown and described with reference to certain embodiments thereof, it will be apparent to those skilled in the art that the multi-slot antenna according to the present disclosure is not limited to these embodiments, and various changes in form and details may be made therein without departing from the spirit and scope of the present disclosure as defined by the appended claims and their equivalents.

What is claimed is:
1. An electronic device comprising:
a housing comprising a first side facing in a first direction, a second side facing in a second direction opposite to the first direction, and a first lateral side surrounded by at least a portion of a space between the first and second sides and facing in a third direction perpendicular to each of the first and second directions;

a metal frame disposed to surround at least a portion of the first lateral side;

at least one slot antenna formed in at least a portion of the metal frame facing the first lateral side, and facing the third direction; and a feeding flange having a protruding shape configured to feed the at least one slot antenna.

2. The electronic device of claim 1, wherein the metal frame is an exterior metal frame and surrounding at least a portion of a boundary of the electronic device.

3. The electronic device of claim 1, wherein the slot antenna has a first length extended along the metal frame and a first thickness.

4. The electronic device of claim 1, wherein at least a portion of the metal frame is configured at a position spaced apart from the slot antenna to operate as an antenna radiator.

5. An electronic device comprising:

a housing comprising a first side facing in a first direction, a second side facing in a second direction opposite to the first direction, a first lateral side surrounded by at least a portion of a space between the first and second sides and facing in a third direction perpendicular to each of the first and second side, and a substrate disposed between the first and second sides and having a ground plane disposed to face each of the first and second side;

a rear case coupled to a second side of the housing;

a metal frame disposed to surround at least a portion of the first side of the housing;

a first slot antenna disposed between the substrate and the metal frame and having a first length and a first thickness; and a second slot antenna disposed adjacent to the first slot antenna, formed in at least a region of the external metal frame facing the first side, facing in the third direction, and having a second length and a second thickness.

6. The electronic device of claim 5, wherein the first and second lengths are approximately the same.

7. The electronic device of claim 5, wherein the second slot antenna is utilized as a hole through which a connecting member connected to another housing passes.

8. The electronic device of claim 5, wherein the first and second slot antennas are fed by a feeding flange.

9. The electronic device of claim 5, wherein a third slot having a third length and a third thickness is disposed at the rear case, and a third slot antenna is disposed to substantially face the first slot antenna and is disposed adjacent to the second slot antenna.

10. The electronic device of claim 5, wherein at least a portion of the metal frame is configured at a position spaced apart from the second slot antenna to operate as an antenna radiator.

11. The electronic device of claim 5, wherein the second slot antenna is filled with an insulating material.

* * * * *